United States Patent [19]
Deb

[11] Patent Number: 5,933,355
[45] Date of Patent: Aug. 3, 1999

[54] OBJECT ORIENTED EXPERT POWER LINE AMPACITY SYSTEM

[76] Inventor: Anjan Kumar Deb, 5911 Cypress Point Dr., Livermore, Calif. 94550

[21] Appl. No.: 08/434,996

[22] Filed: May 4, 1995

[51] Int. Cl.⁶ .................................................... G01R 19/00
[52] U.S. Cl. ........................................... 364/483; 364/495
[58] Field of Search .............................. 364/223.7, 916.3, 364/923, 923.1, 492, 493, 488, 483, 495; 395/118, 155, 161, 920, 932

[56] References Cited

U.S. PATENT DOCUMENTS 5,140,257  8/1992  Davis ....................................... 324/106

OTHER PUBLICATIONS

"Prediction of Overhead Transmission Line Ampacity by Stochastic and Deterministic Models", IEEE Transactions on Power Delivery, vol. 3, No. 2, Apr. 1988, pp. 789–797, J.F. Hall and A.K. Deb.

"Dynamic Line Rating in the Operating Environment", 89 TD 431–8 PWRD, IEEE/PES 1989 Transmission and Distribution Conference, New Orleans, Louisiana, Apr. 2–7, 1989, made available for printing Jan. 19, 1989, Stephen D. Foss and Robert A. Maraio.

"Economic Evaluation of Dynamic Thermal Rating by Adaptive Forecasting", 87 SM 556–4, IEEE/PES 1987 Summer Meeting, San Francisco CA, Jul. 12–17, 1987, available for printing May 1, 1987, J.F. Hall and A.K. Deb.

"Weather–Dependent Versus Static Thermal Line Ratings", 86 T&D 503–7, IEEE Transactions on Power Delivery, vol. 3, No. 2, Apr. 1988, pp. 742–753, Dale A. Douglass.

"Wind Tunnel Studies of Transmission Line Conductor Temperatures", 86 T&D 500–3, IEEE/PES 1986 Transmission and Distribution Conference, Anaheim, CA, Sep. 14–19, 1986, available for printing Jun. 18, 1986, J.F. Hall and A.K. Deb.

"Real–Time Ampacity Model for Overhead Lines", 83 WM 145–0, IEEE Transactions on Power Apparatus and Systems, vol. PAS–102, No. 2, Jul. 1983, W.Z. Black and W.R. Byrd.

"Ambient Temperature Corrected Dynamic Transmission Line Ratings at Two PG&E Locations", 90 SM 403–6 PWRD, IEEE/PES 1990 Summer Meeting, Minneapolis, Jul. 15–19, 1990, available for printing May 18, 1990, W.J. Steeley and A.K. Deb.

*Primary Examiner*—Emanuel Todd Voeltz
*Assistant Examiner*—Tony M. Cole

[57] ABSTRACT

A power line ampacity system called LINEAMPS is invented by object oriented modeling and expert rules of the power line environment. Ampacity is estimated by the solution of conductor temperature differential equations using synthetic generation of meteorological data adjusted to national weather service forecast. The line ampacity system provides hourly values of present and future power line ampacity up to seven days in advance. The program has steady state, dynamic and transient ampacity models which can accurately respond to any weather condition or line currents. The system does not require real time meteorological data, conductor temperature measurements or new hardware on power lines. In the absence of real time meteorological data the system generates power line ampacity from the stored weather patterns of the region located in the weather station objects. LINEAMPS is applicable to all overhead power lines and is easily implemented in all geographic regions. It is an economical line ampacity system implemented in a standard PC Windows computer system and easily ported to all computer platforms.

15 Claims, 55 Drawing Sheets

Objects and dataflow diagram of LINEAMPS

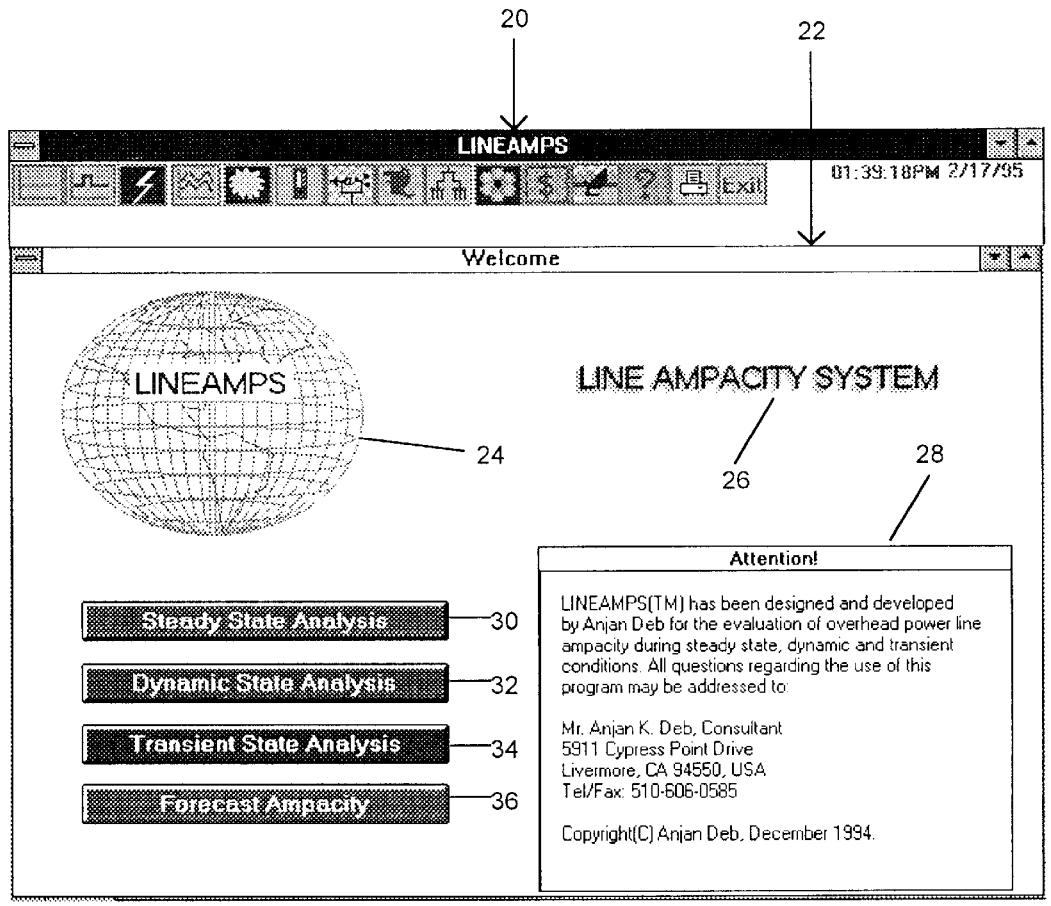
Fig. 1. LINEAMPS, Welcome window.

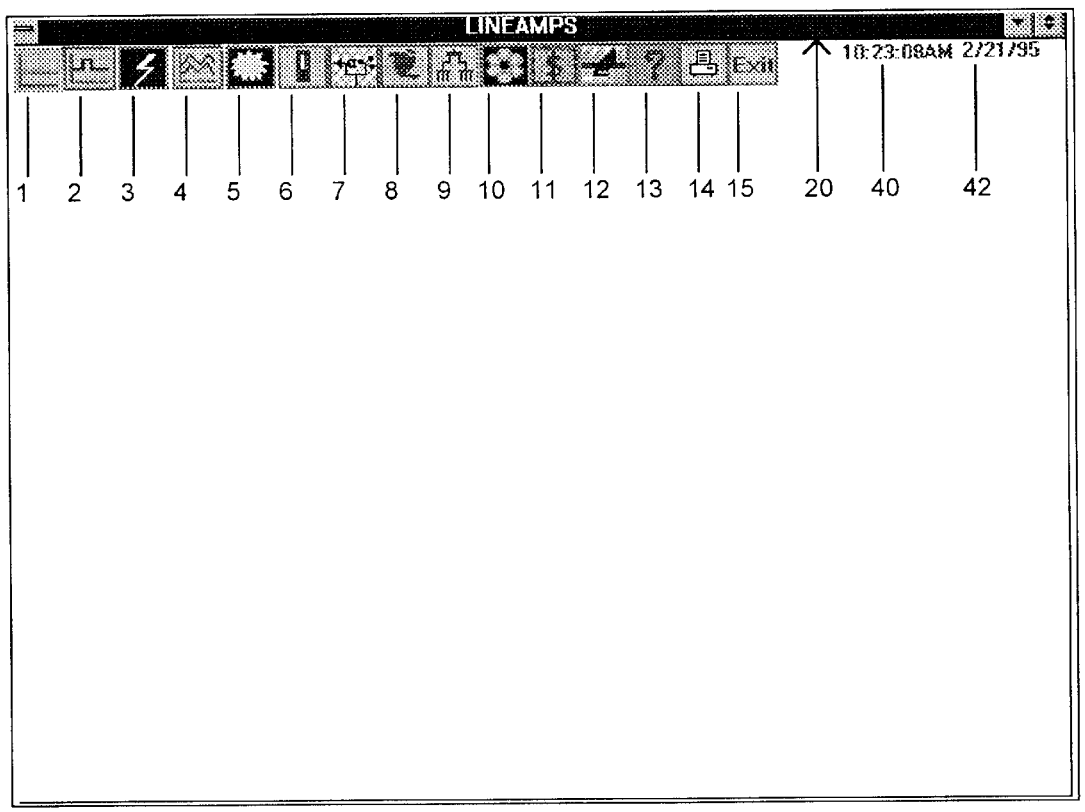
Fig. 2. Icons

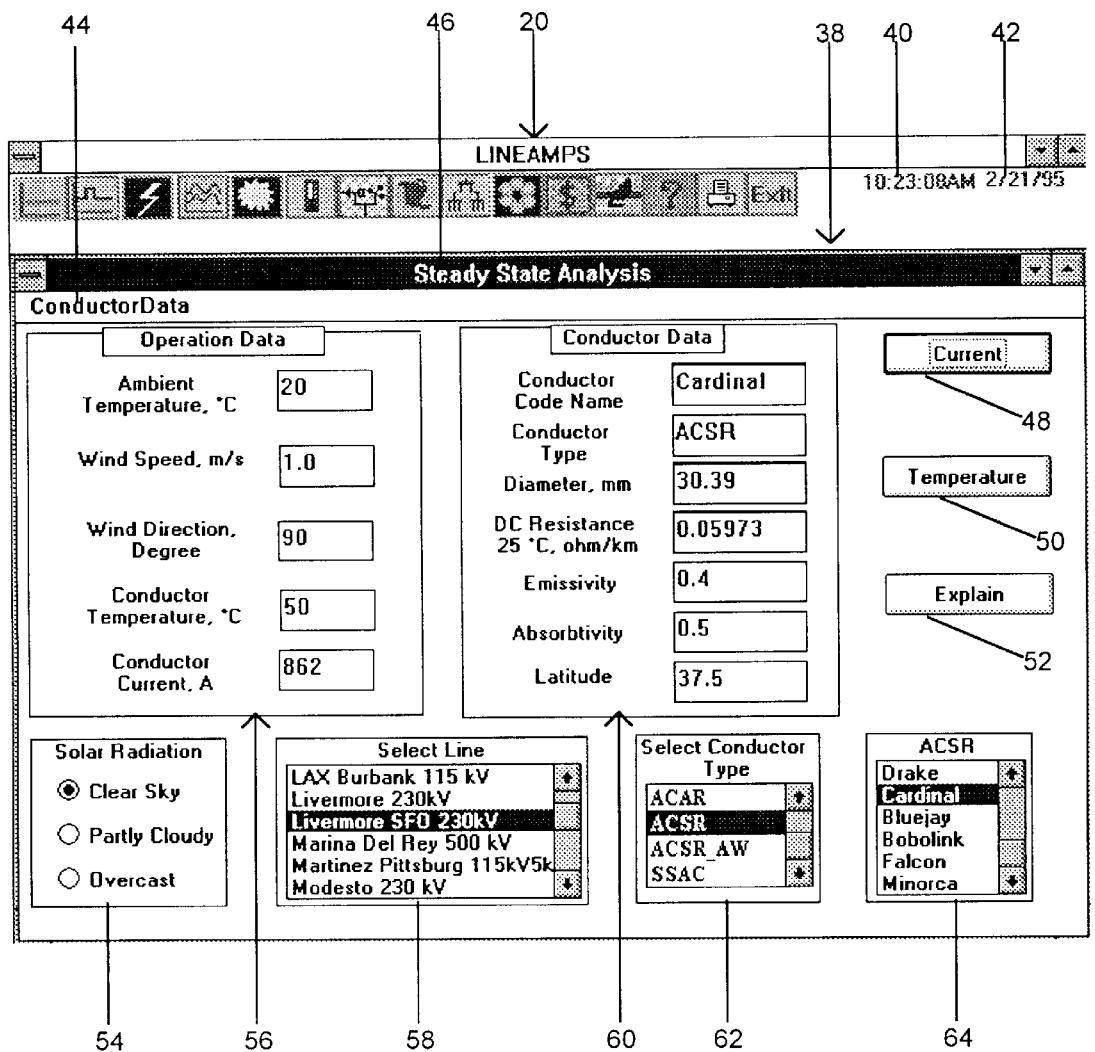
Fig. 3-A.   Steady state analysis window.

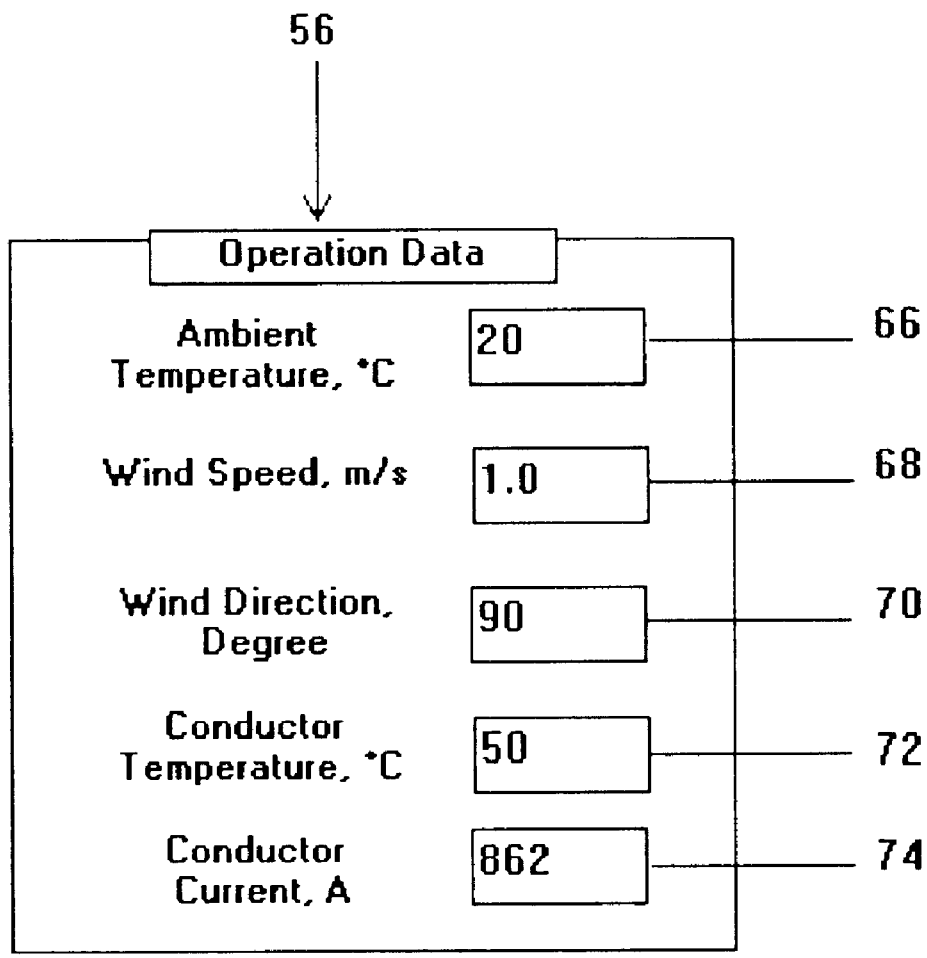
Fig 3-B.    Operation data group.

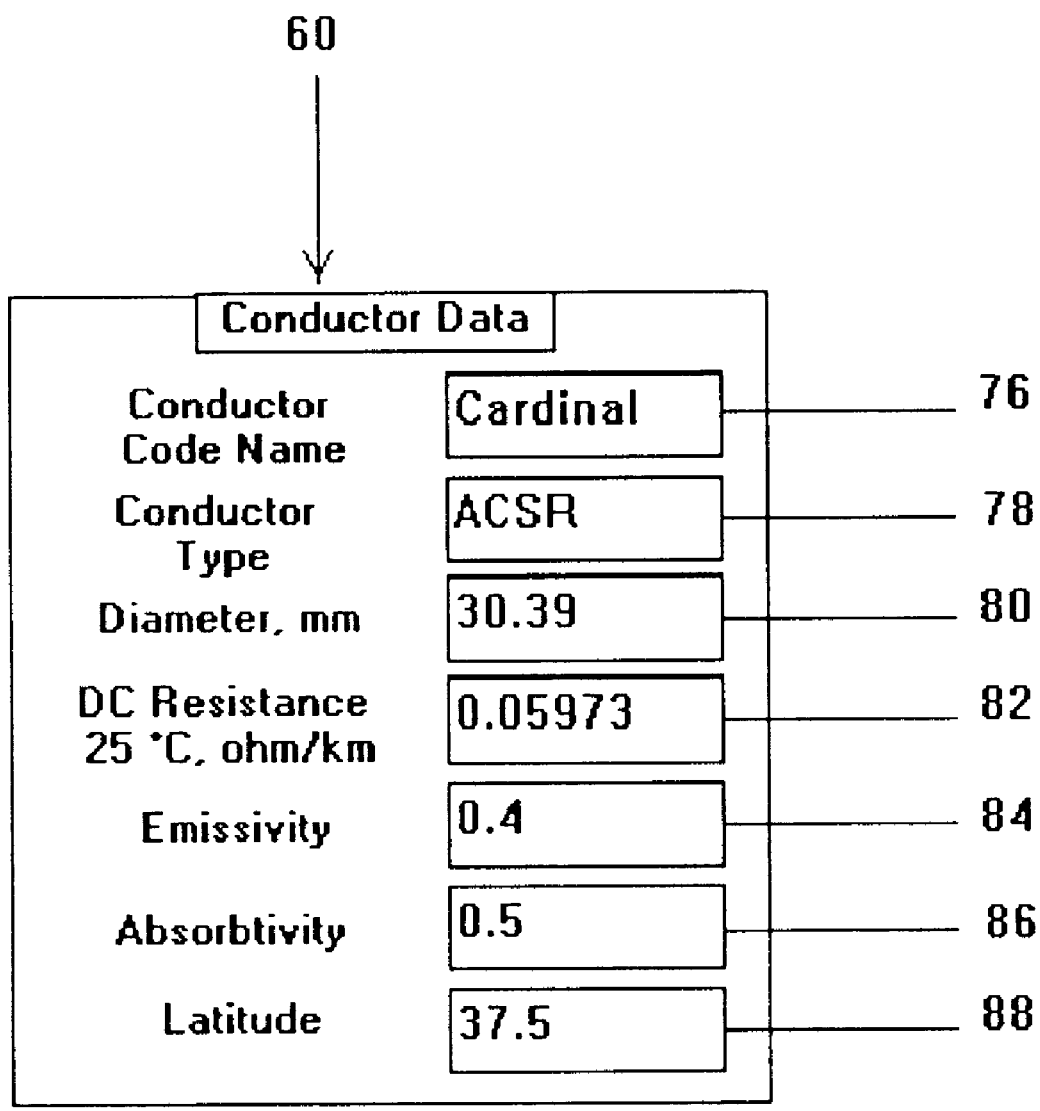
Fig. 3-C. Conductor data group.

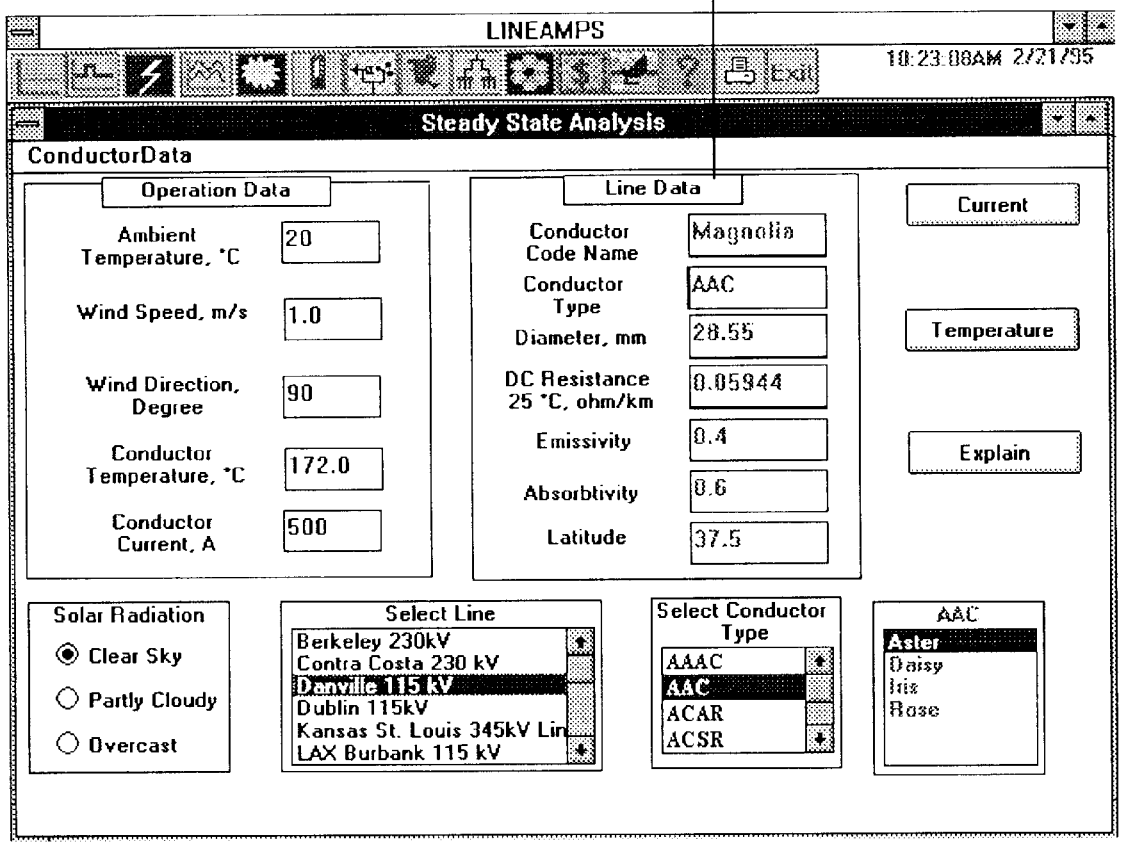
Fig. 3-D.   Steady state analysis, line data.

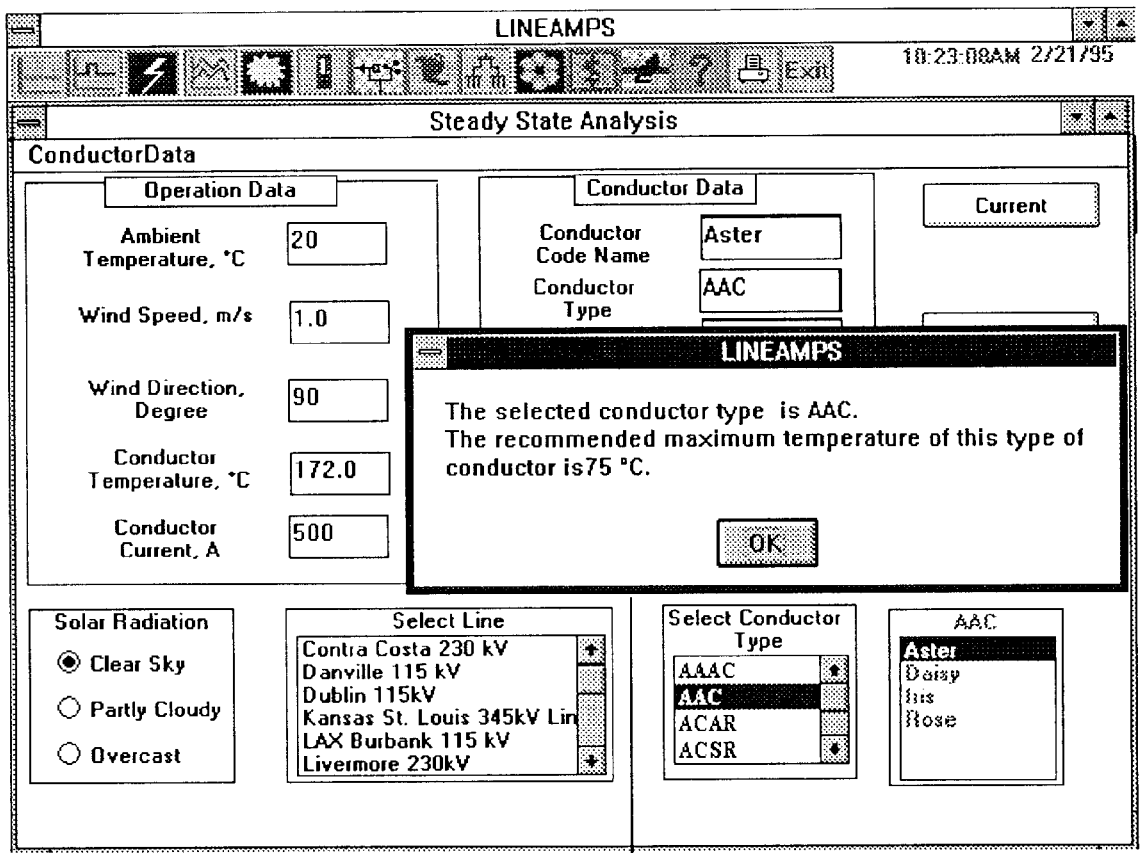
Fig. 3-E.   Rule generated message.

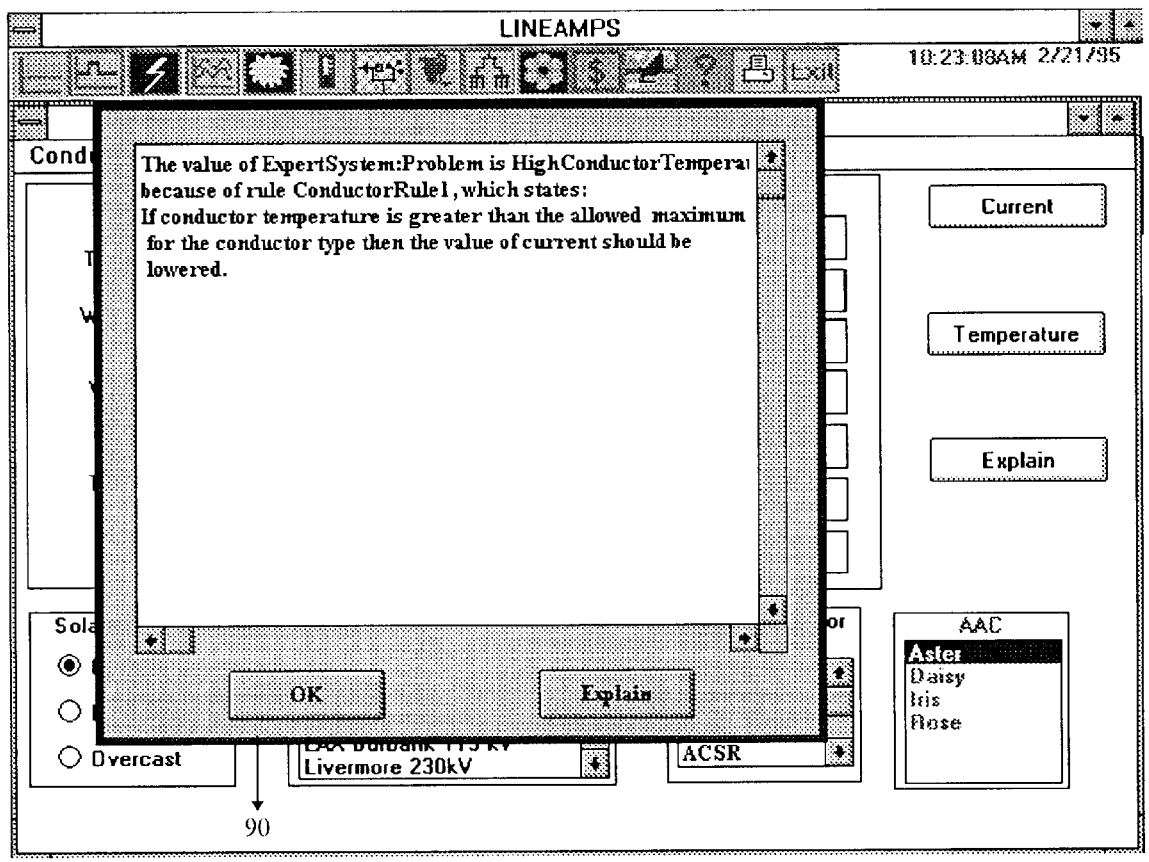
Fig. 3-F.  Steady state explain facility.

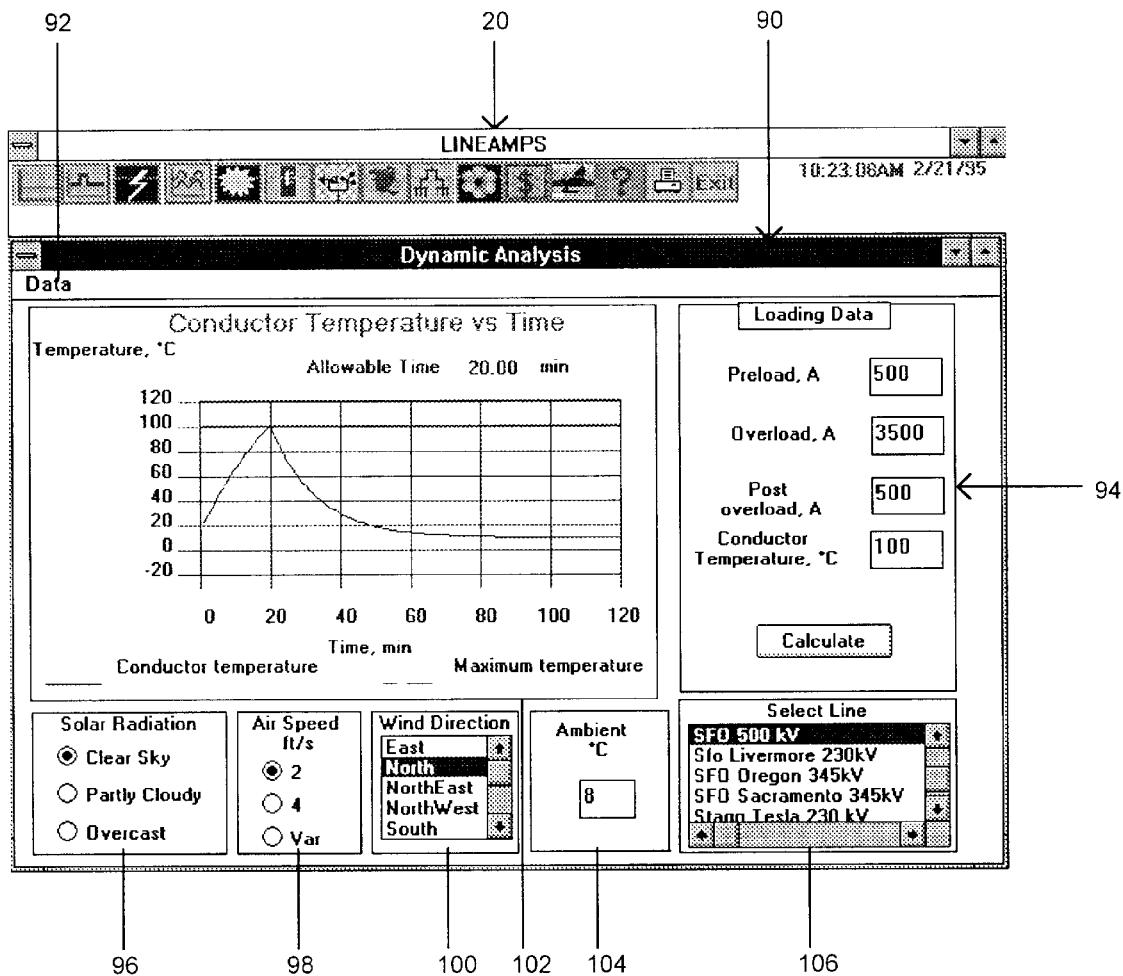
Fig. 4-A. Dynamic analysis window.

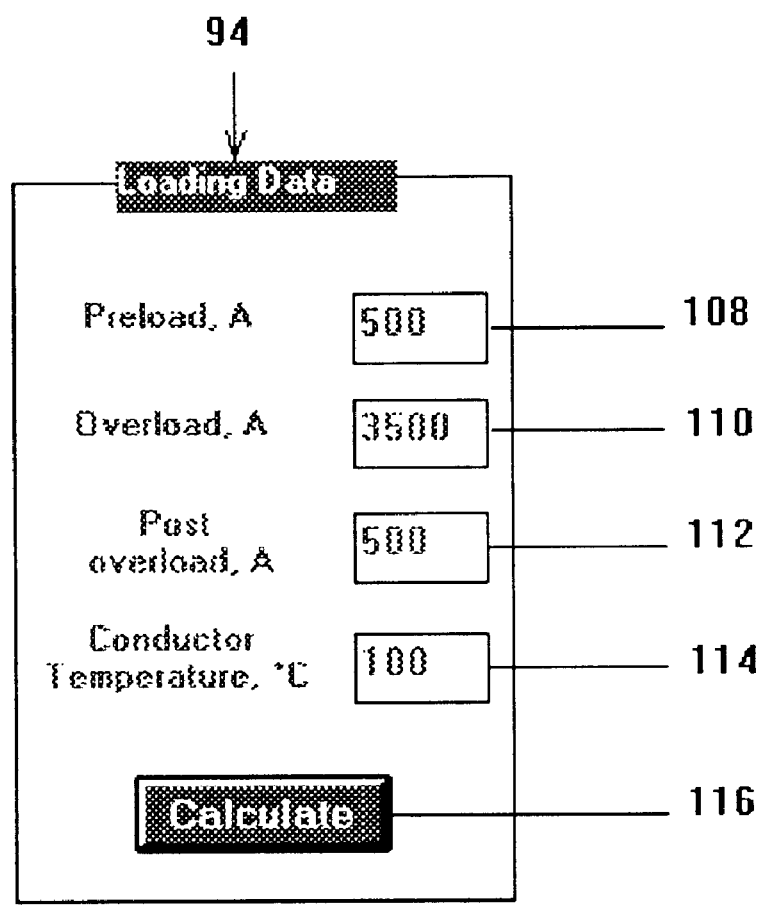
Fig. 4-B.   Dynamic analysis—line loading data.

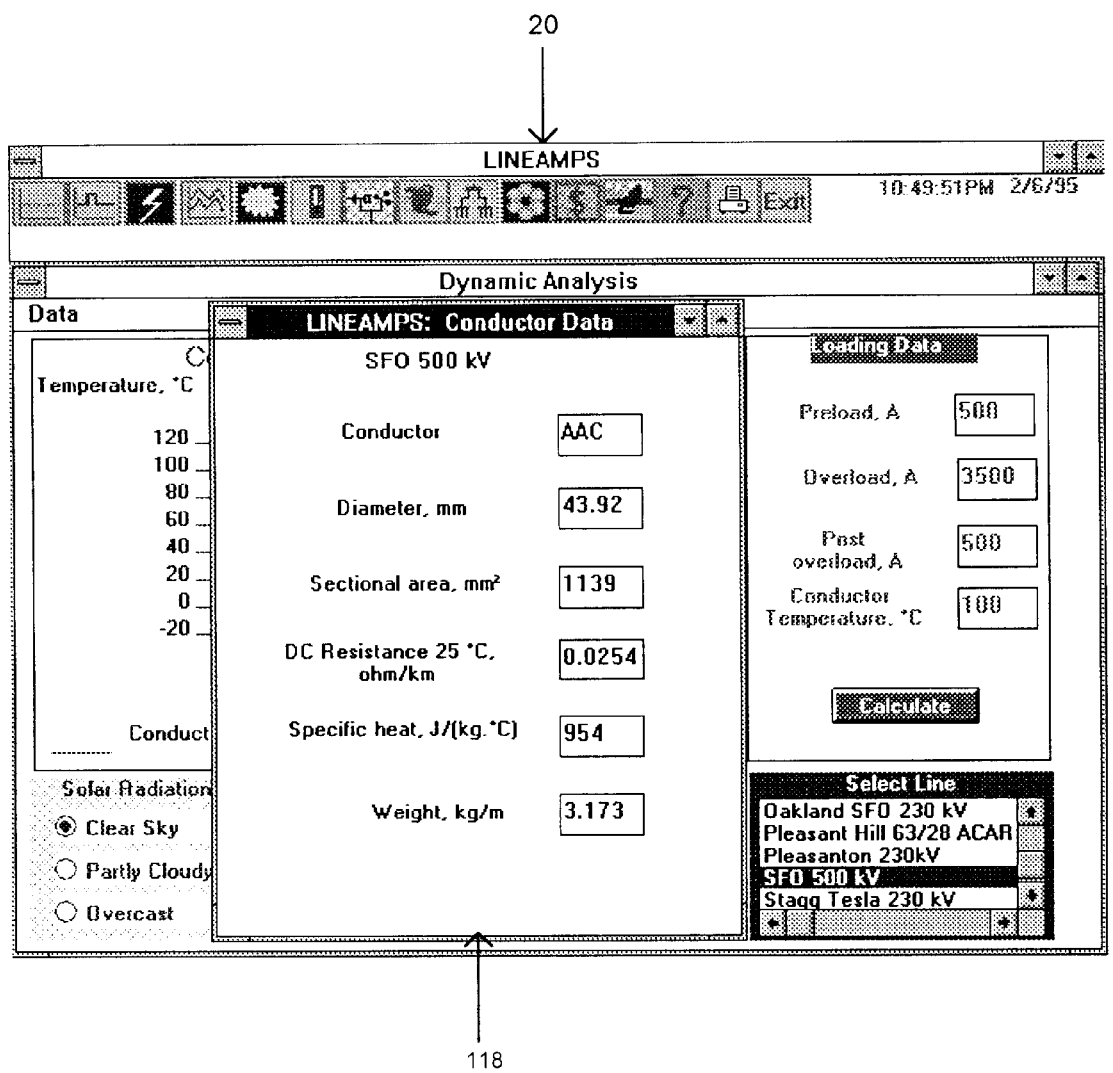
Fig. 4-C.    Dynamic analysis—Conductor data window.

Fig. 4-D.  Dynamic analysis—Conductor data window.

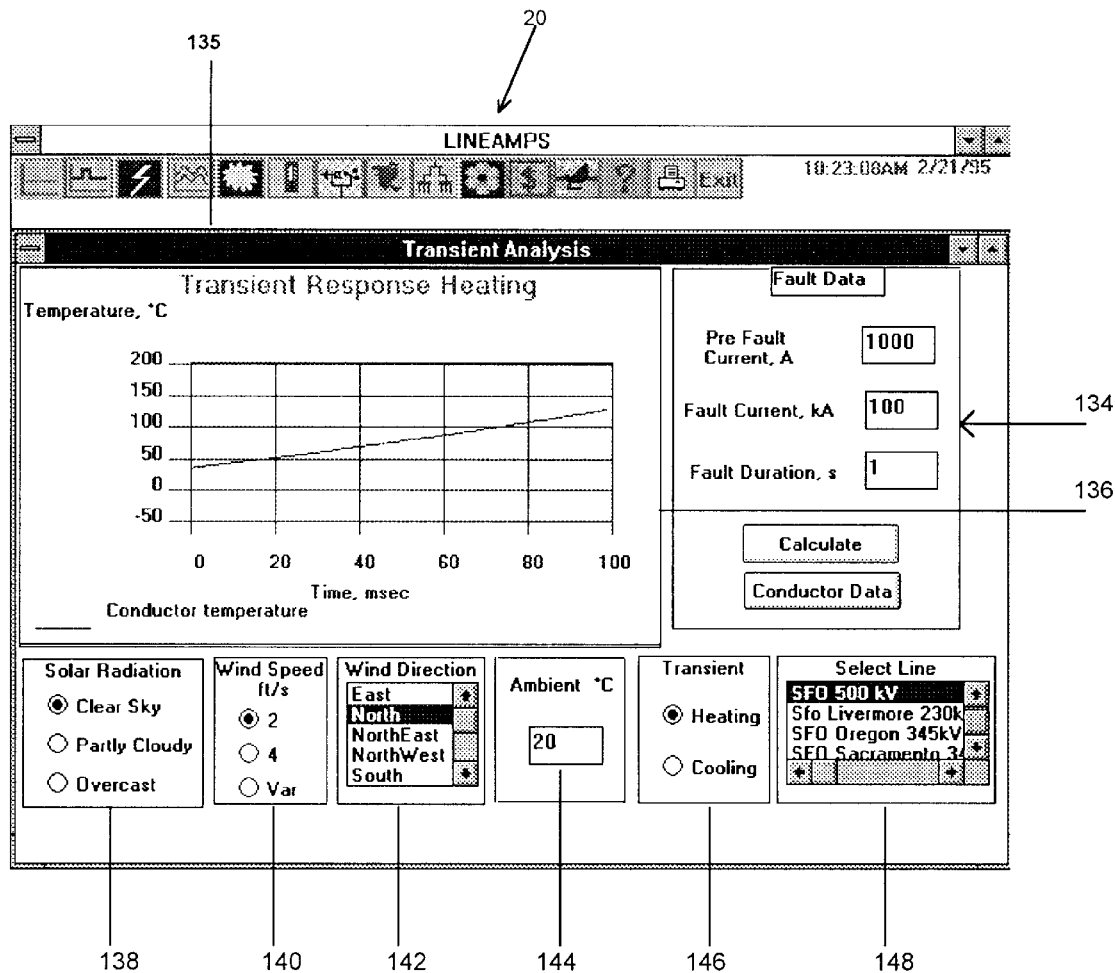
Fig. 5-A. Transient analysis—heating period.

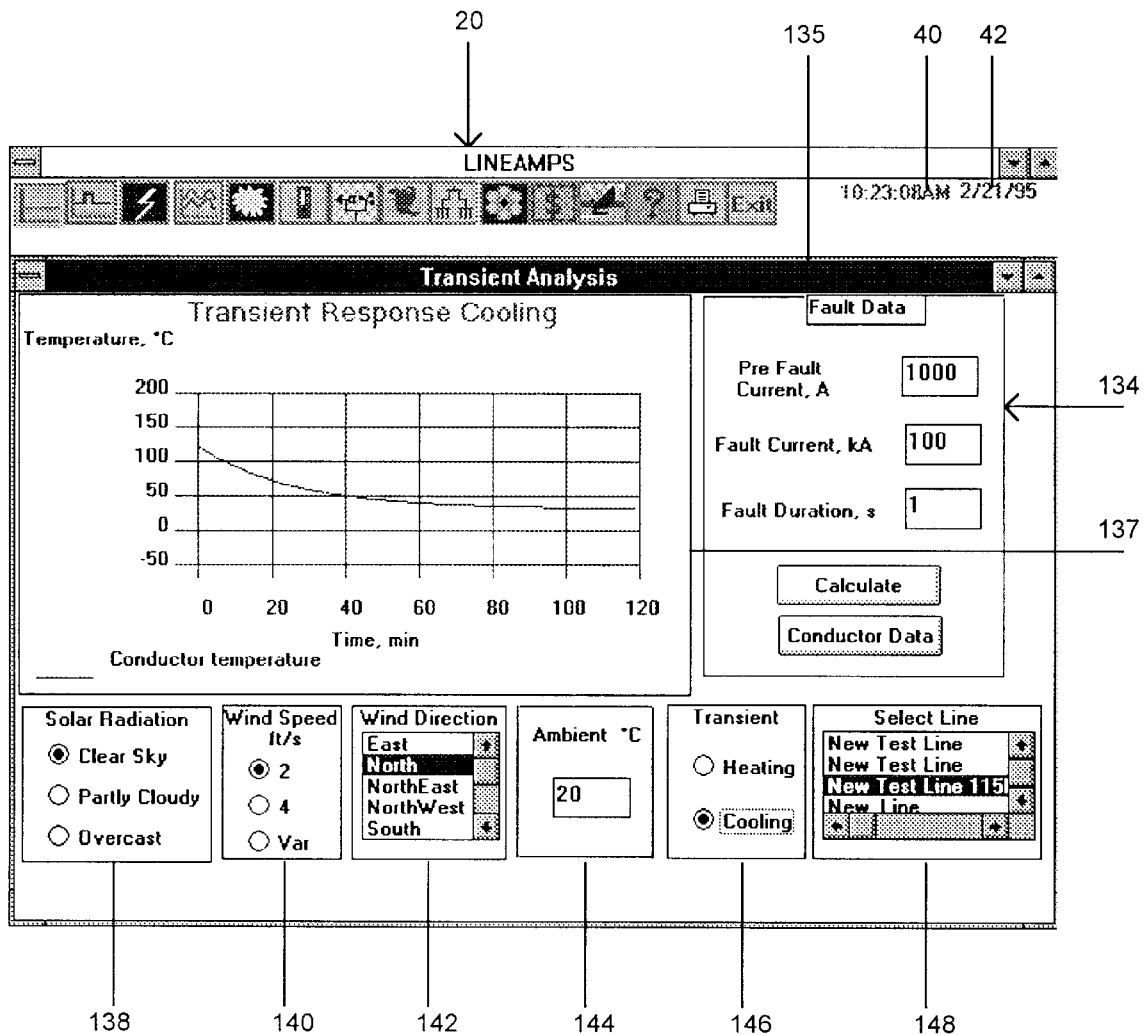
Fig. 5-B. Transient analysis—cooling period.

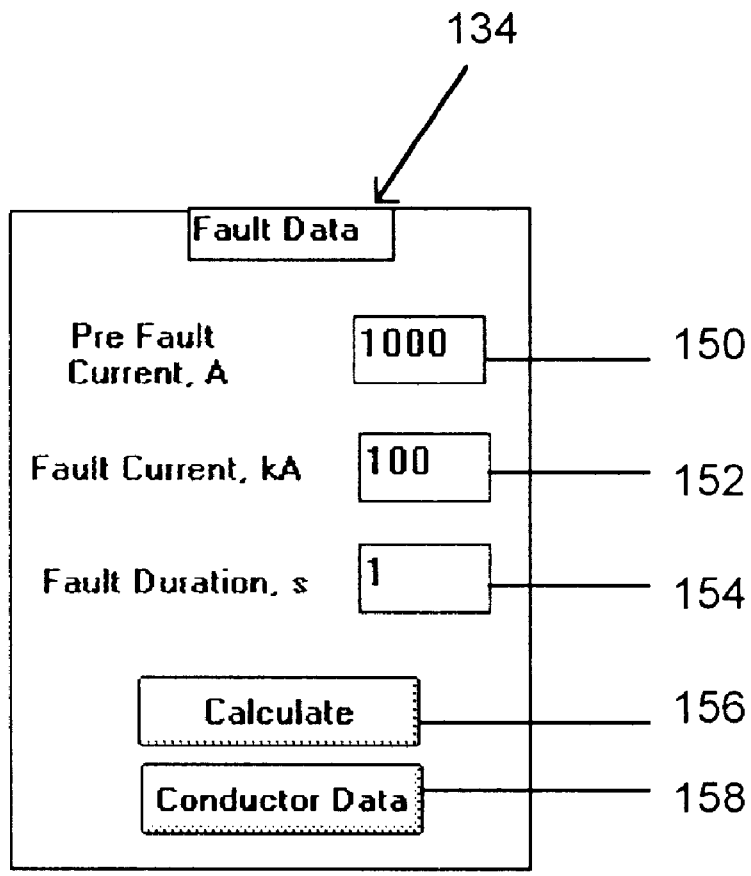
Fig. 5-C.    Transient analysis—fault data.

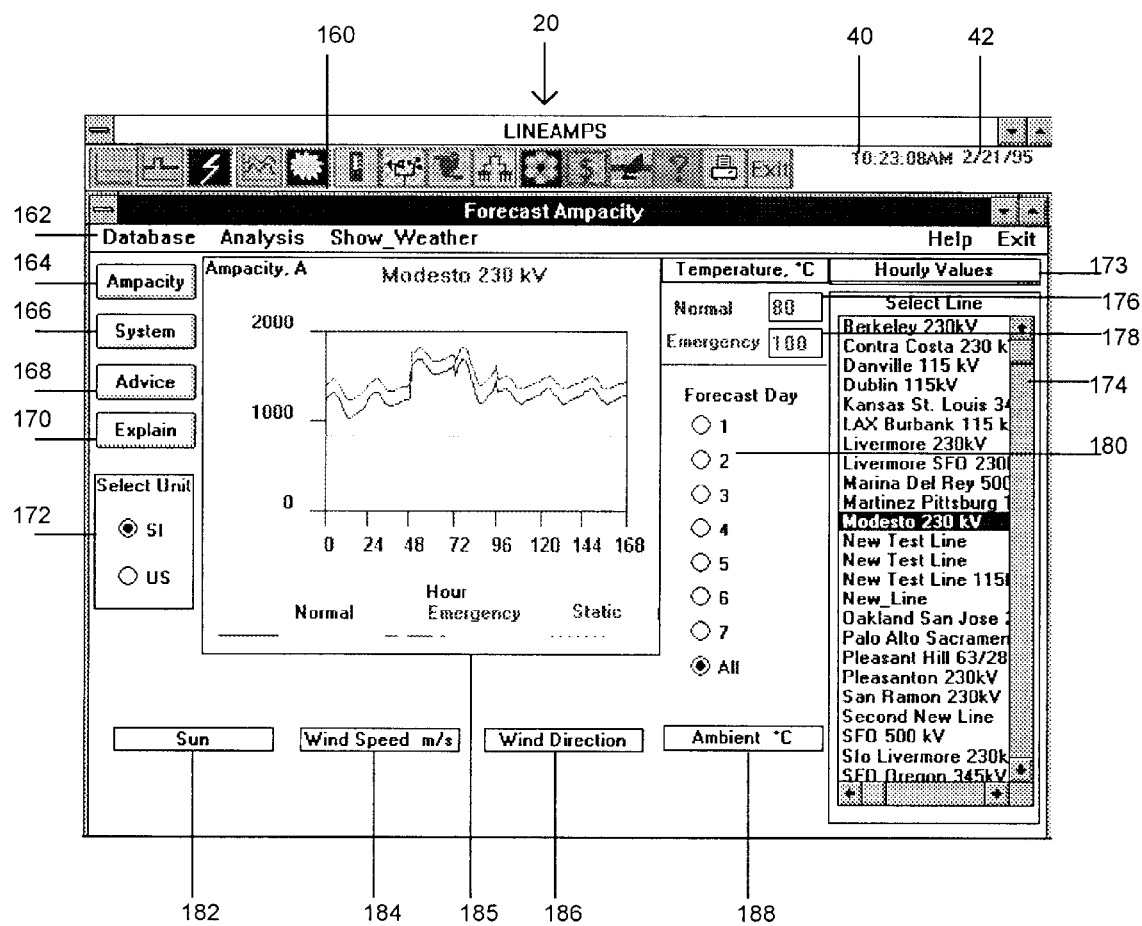
Fig. 6-A. Forecast ampacity—select line.

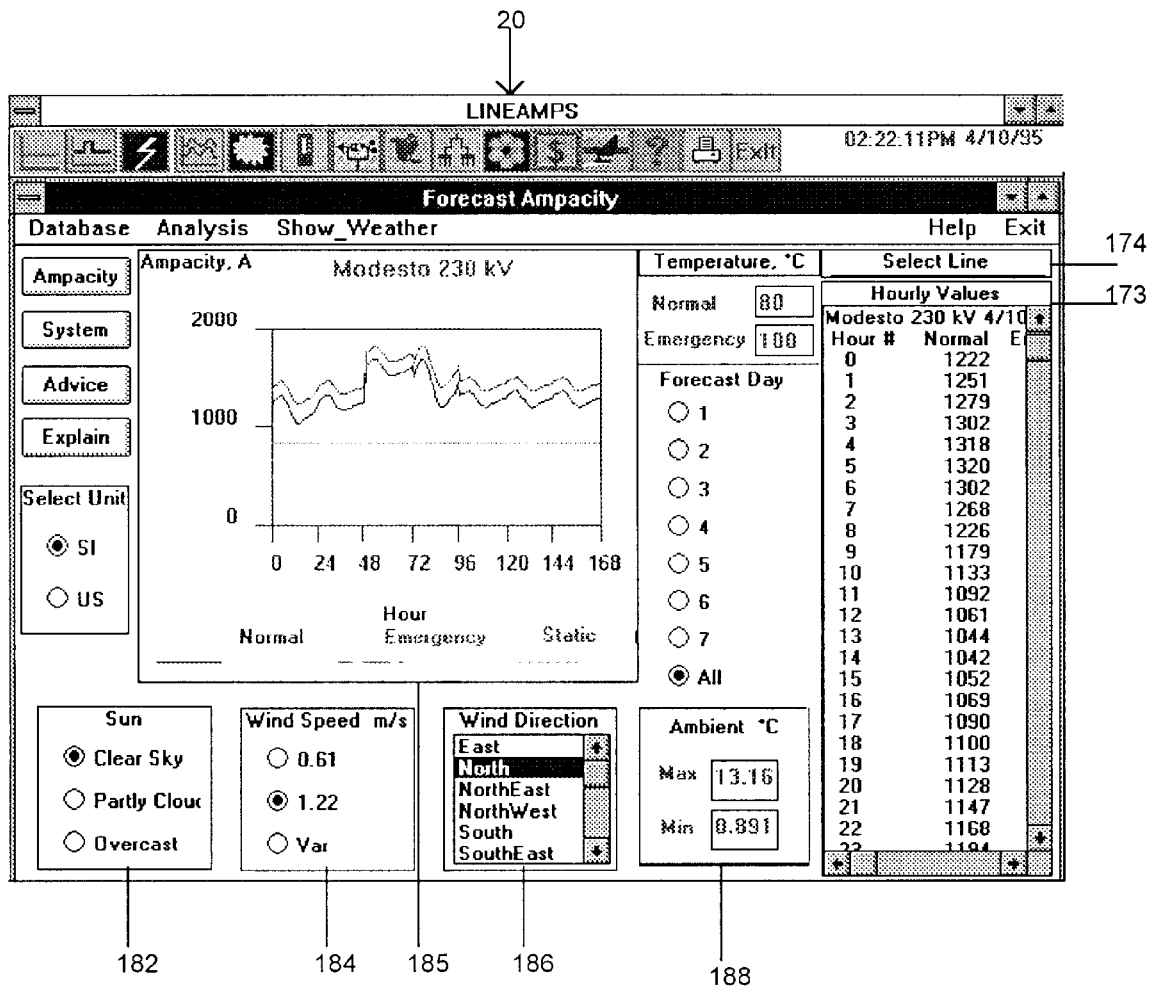
Fig. 6-B.   Forecast ampacity— hourly values.

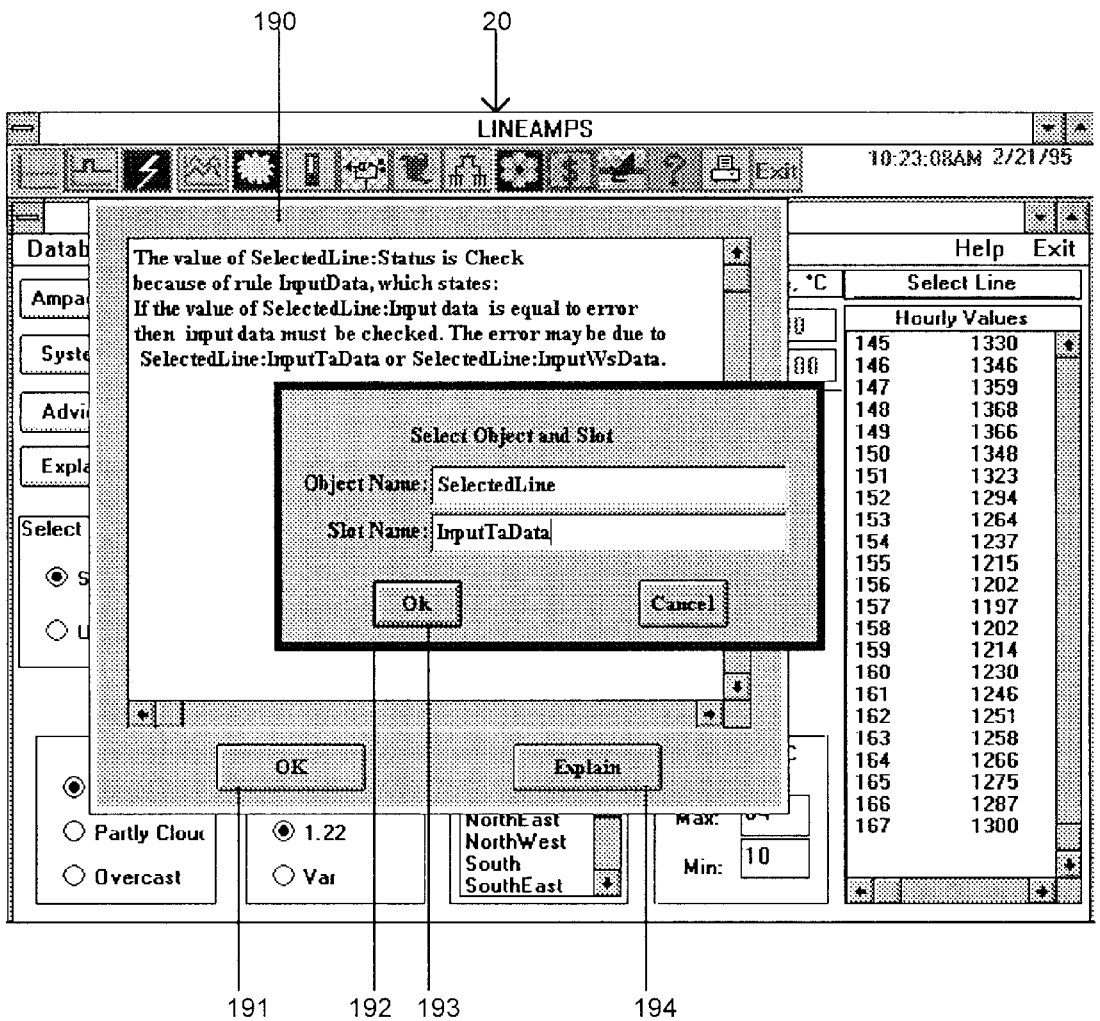
Fig. 6-C.    Forecast ampacity— explanation.

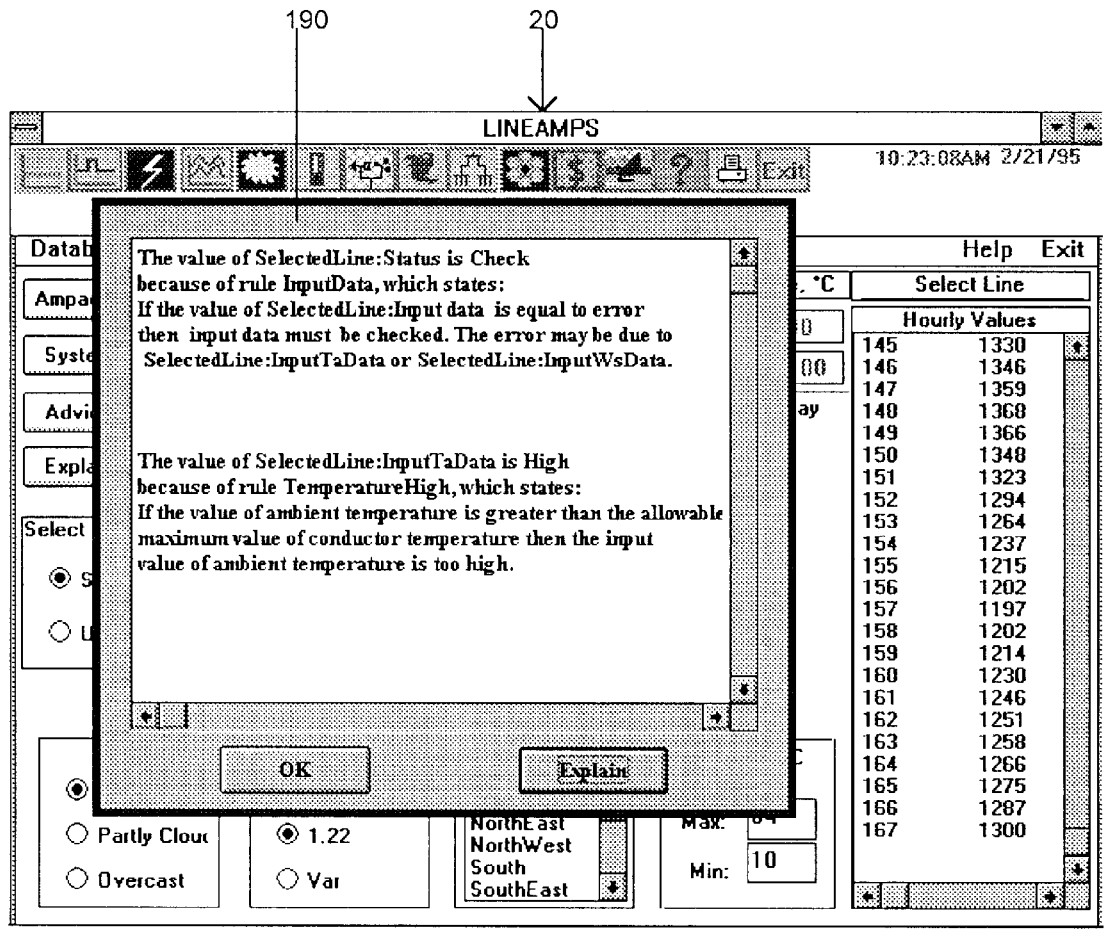
Fig. 6-D.  Forecast ampacity— explanations.

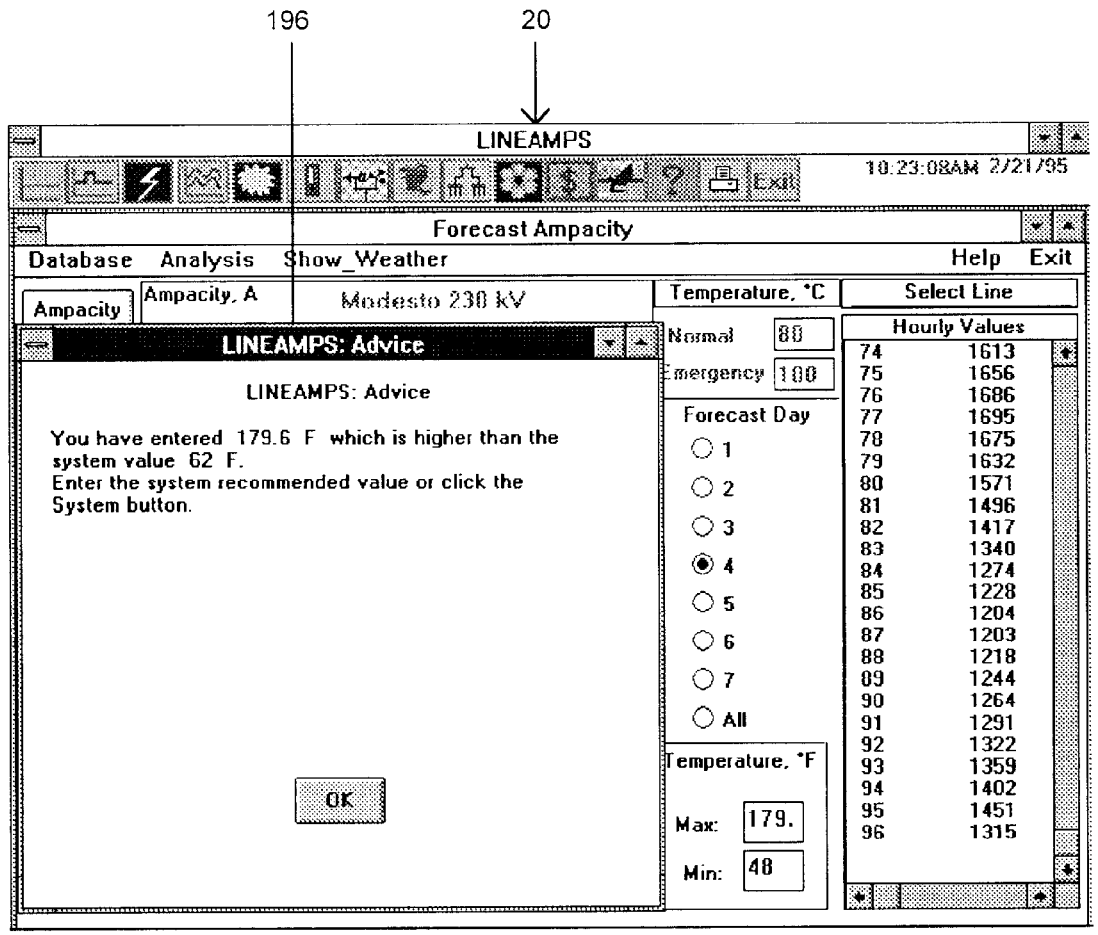
Fig. 6-E. Forecast ampacity— advice.

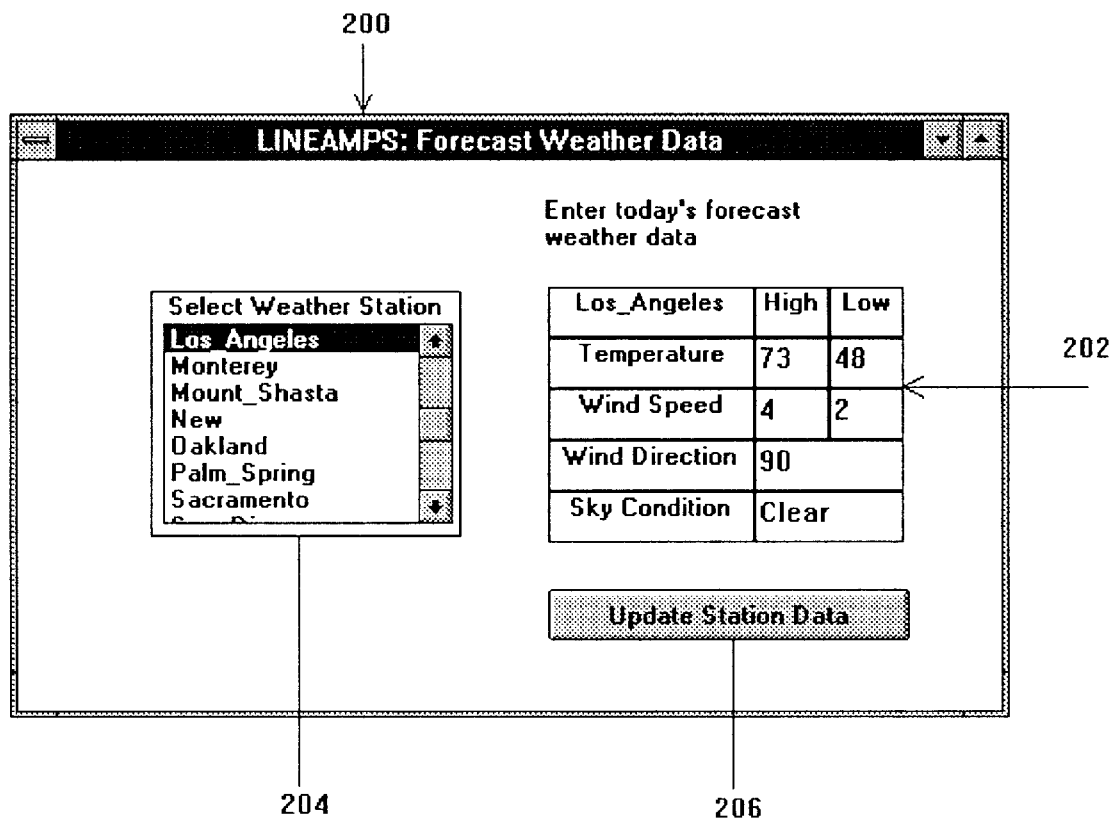
Fig. 7-A.   Daily weather forecast input window.
Fig. 7-B.   Table of forecast weather data.

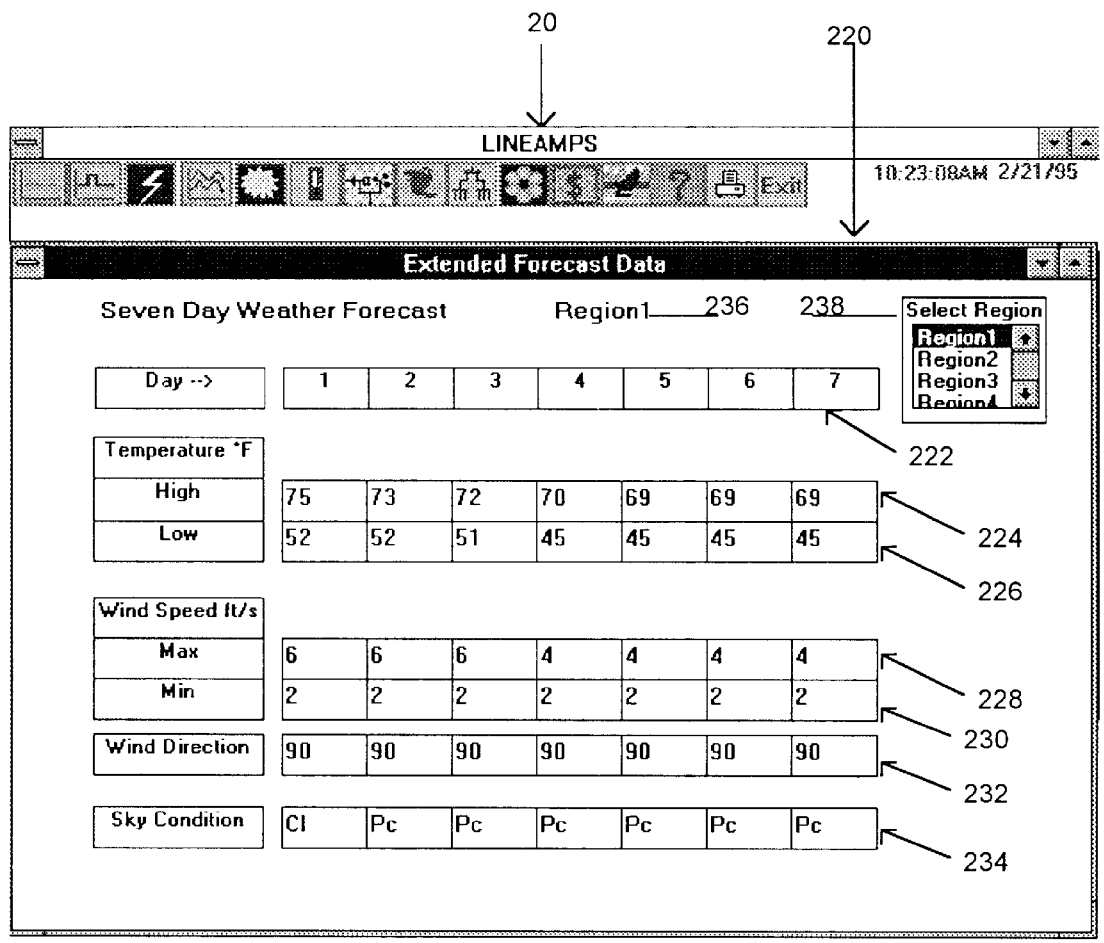
Fig. 8. Seven day input weather forecast data window.

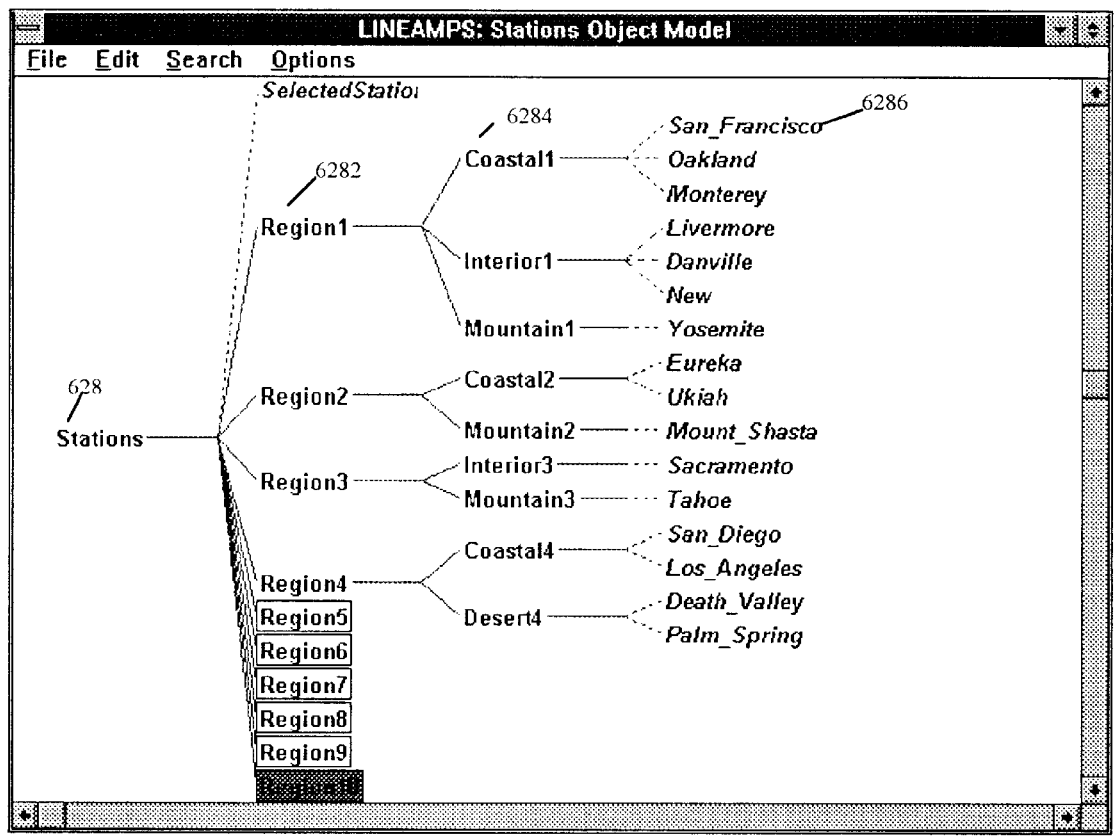
Fig. 9. Weather station object model.

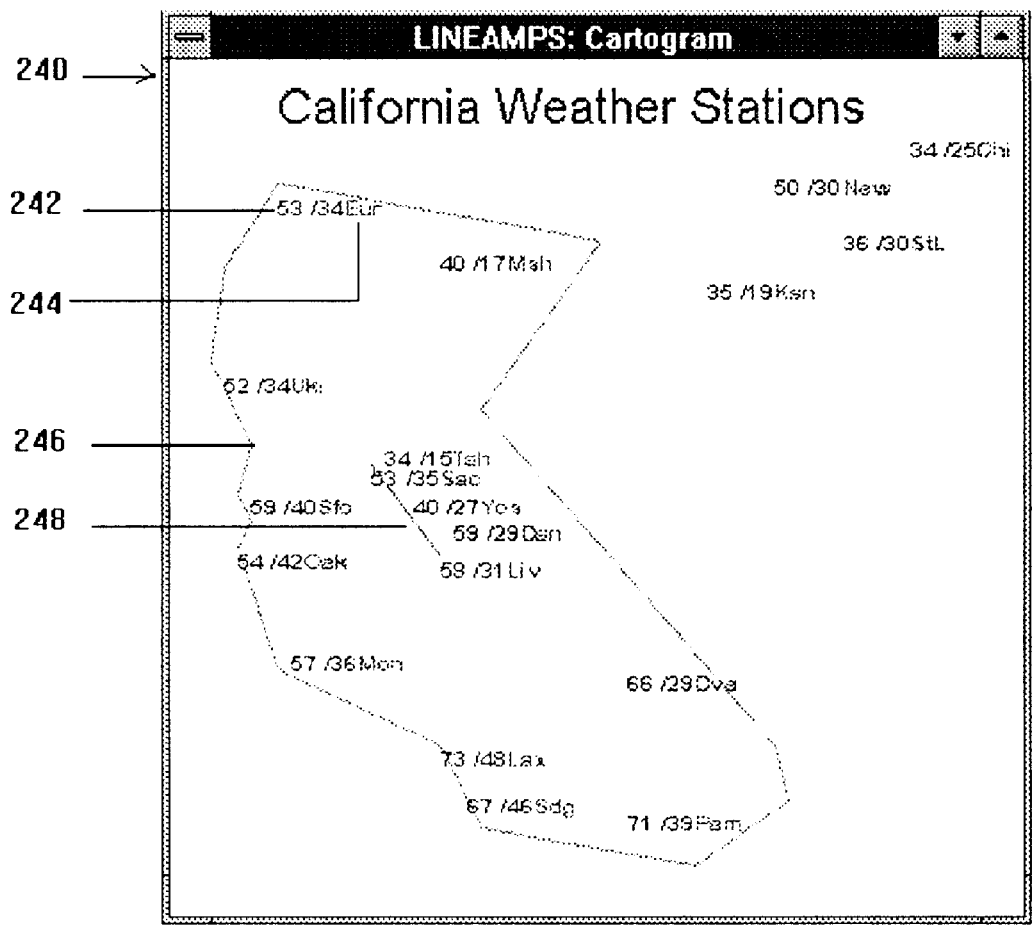
Fig. 10.    Cartogram window.

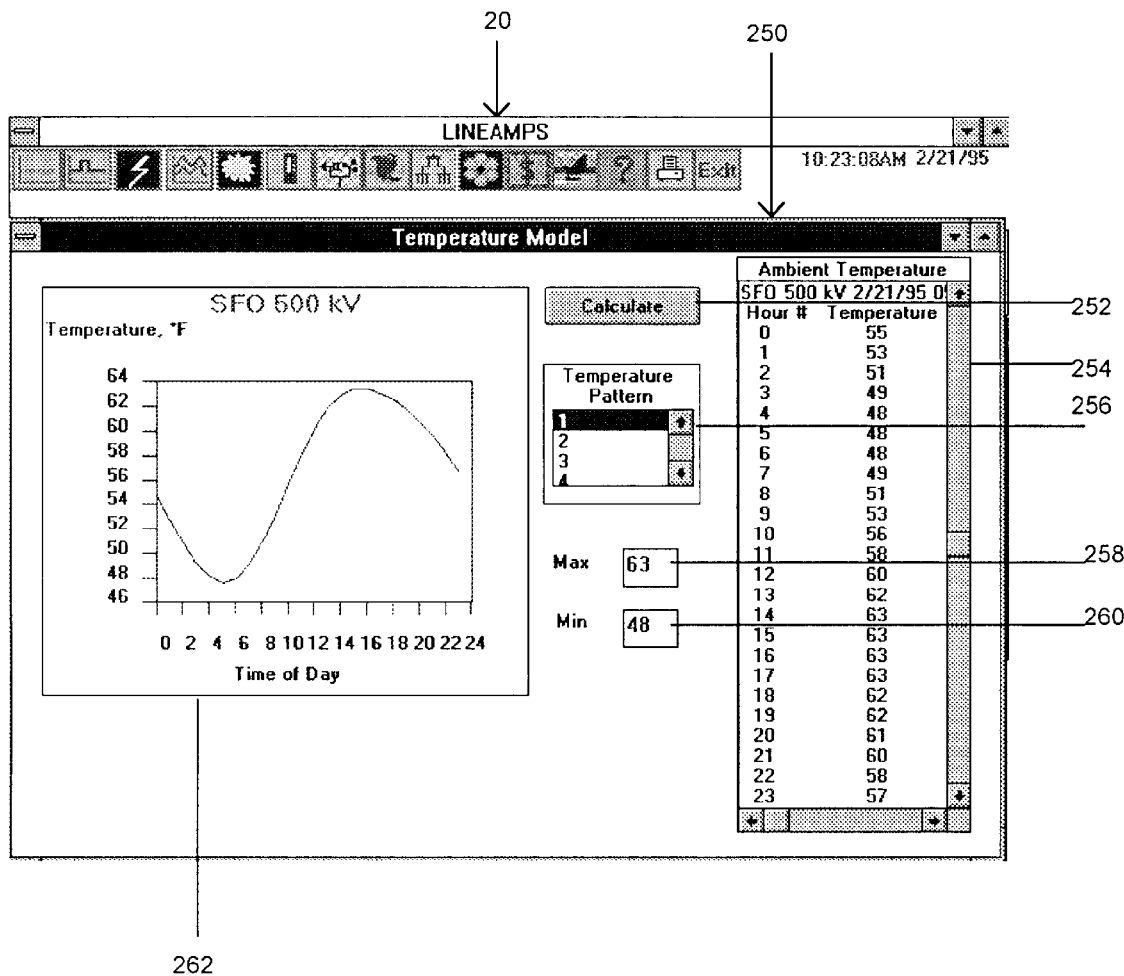
Fig. 11.   Temperature modeling window.

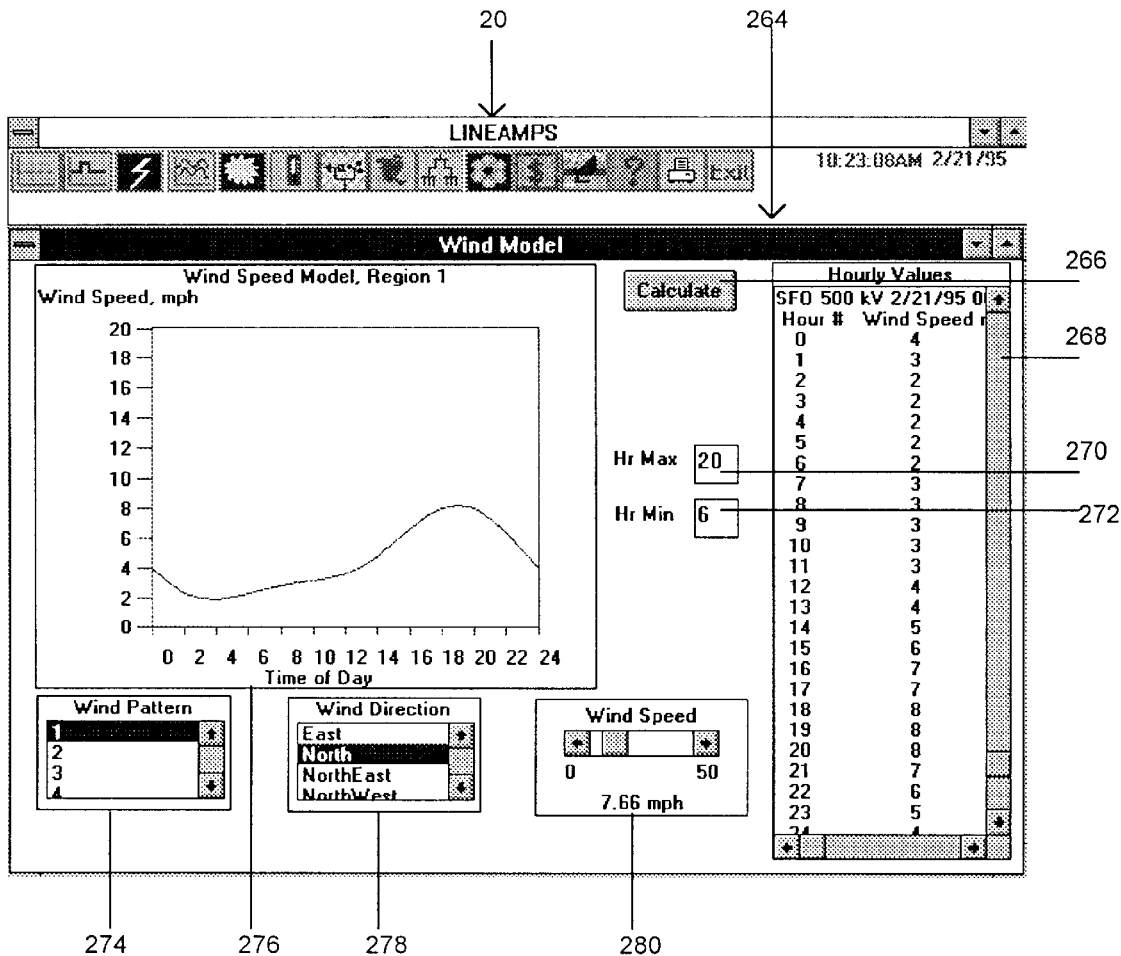
Fig. 12.  Wind modeling window.

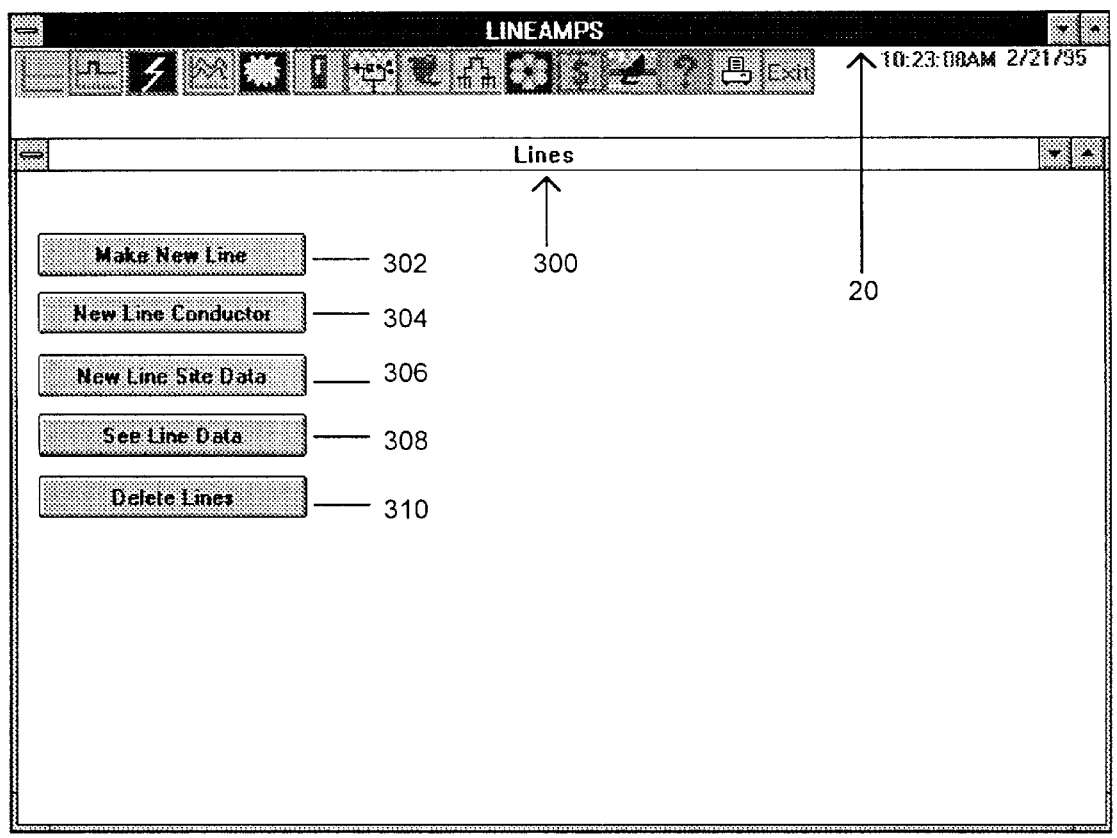
Fig. 13.    Lines window

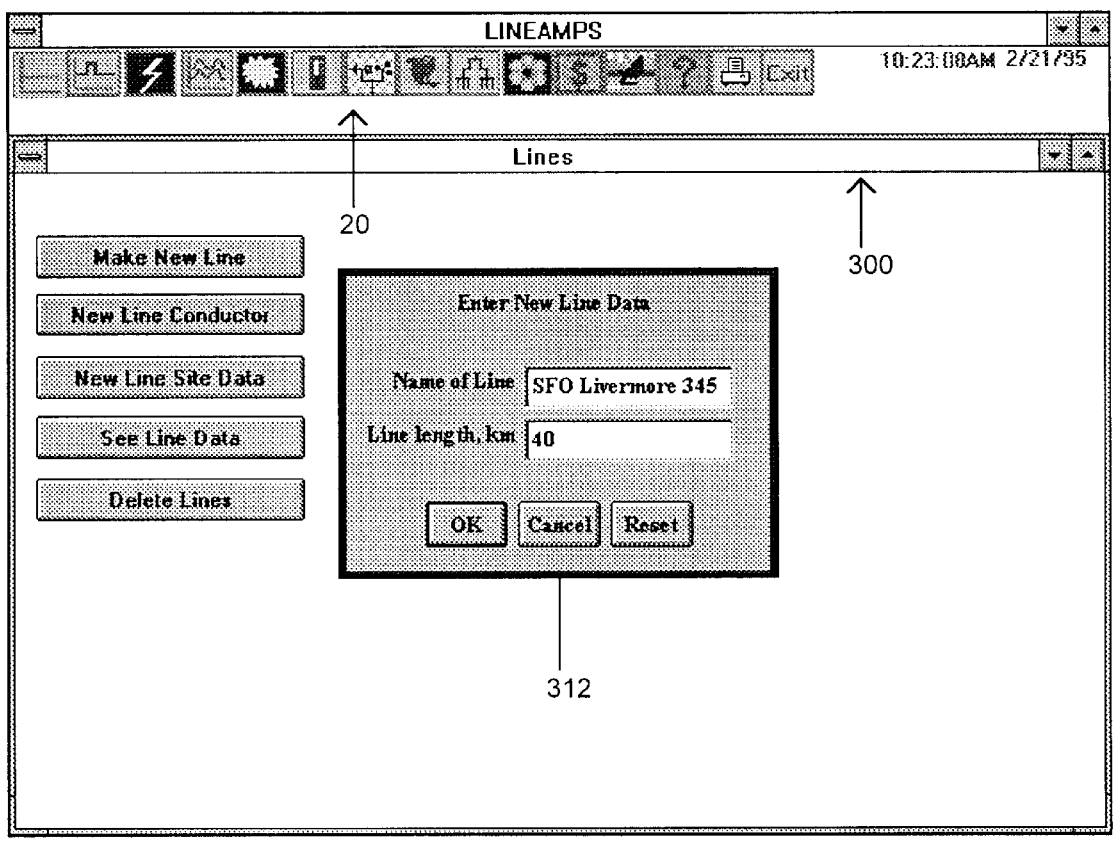
Fig. 14.    Make New Line

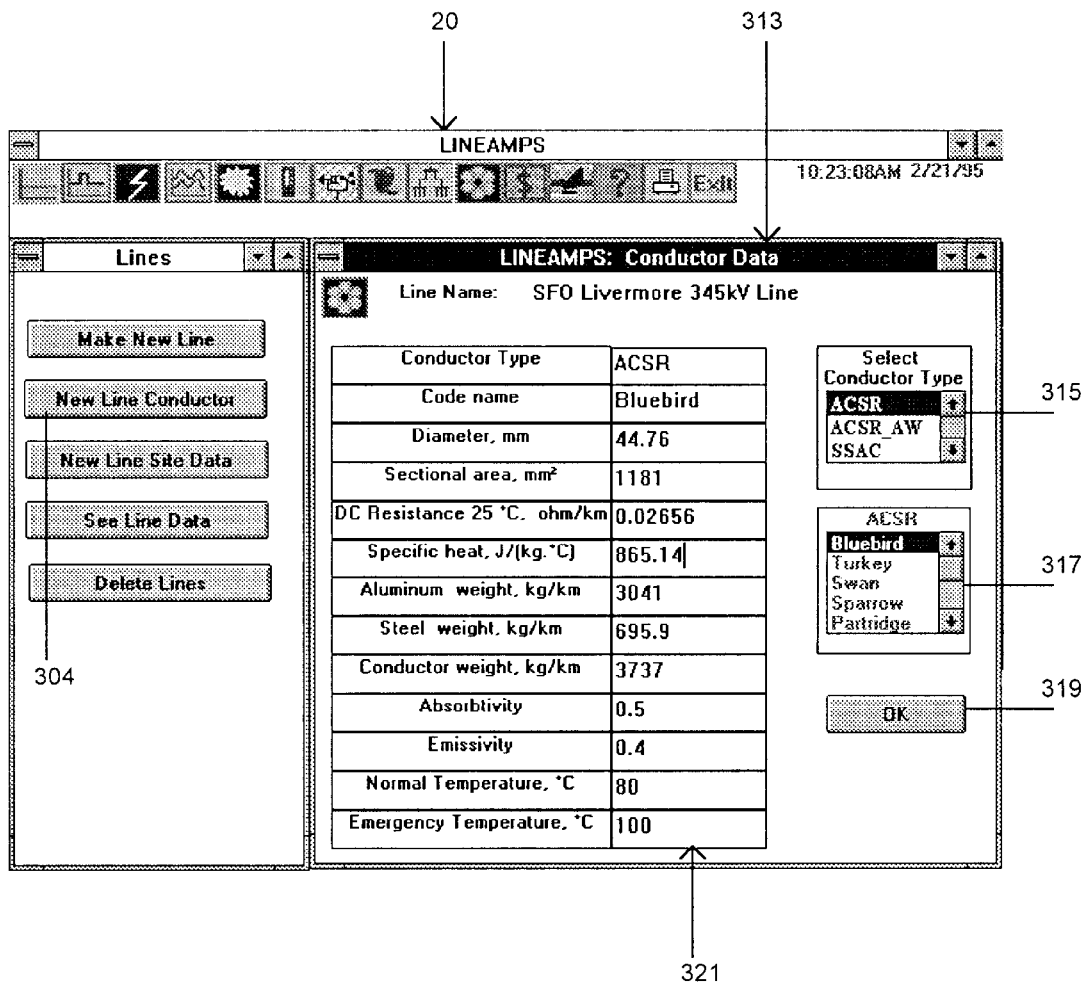
Fig. 15.   New Line Conductor.

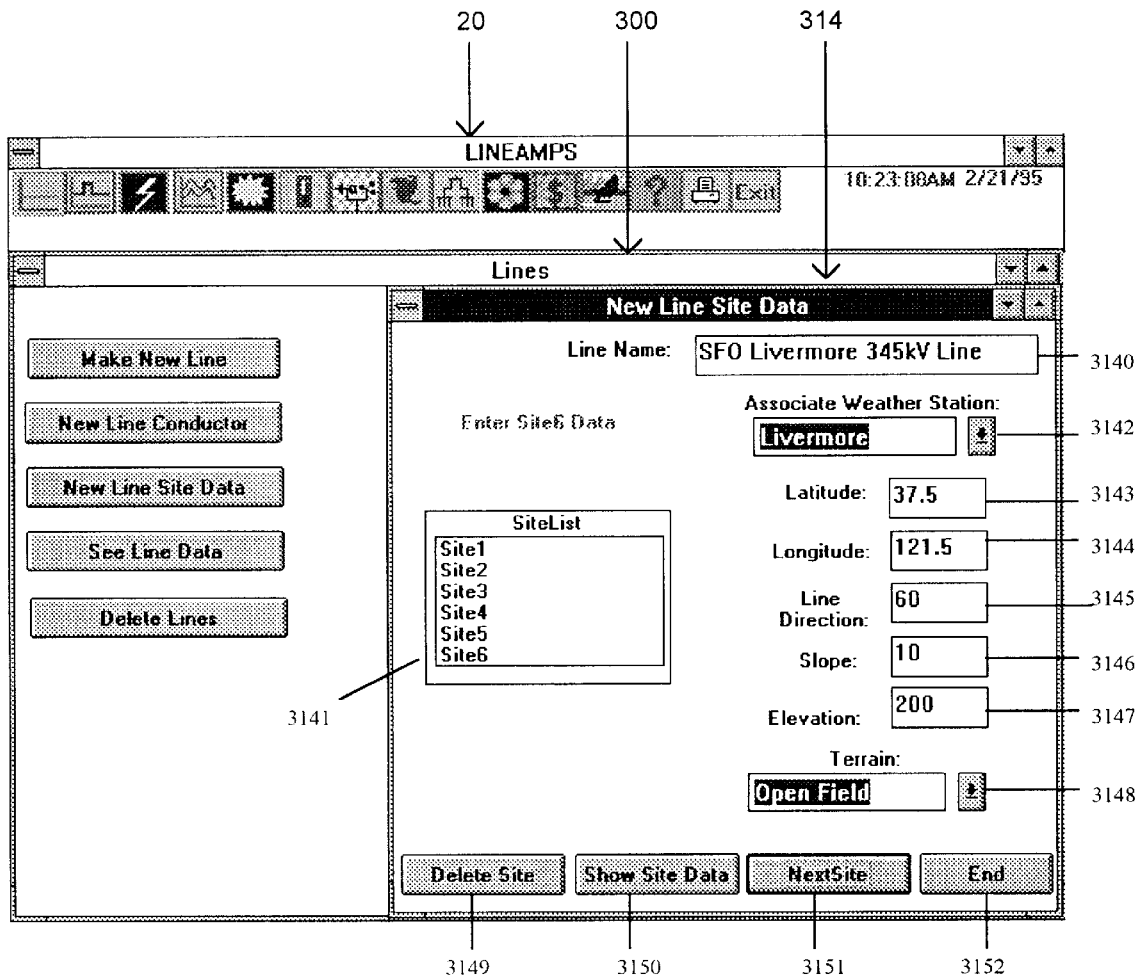
Fig. 16.  New Line Site Data.

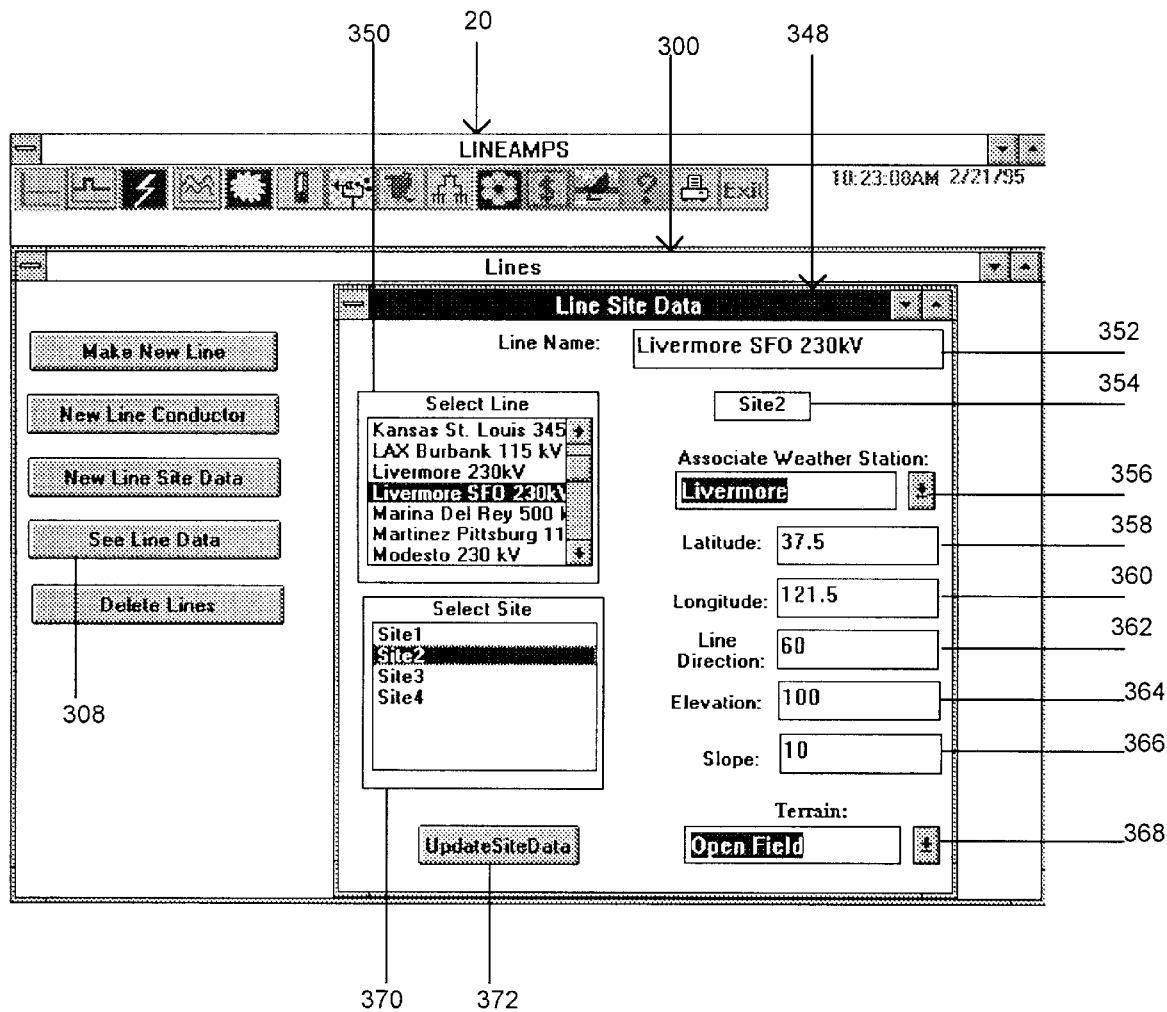
Fig. 17. See Line Data window.

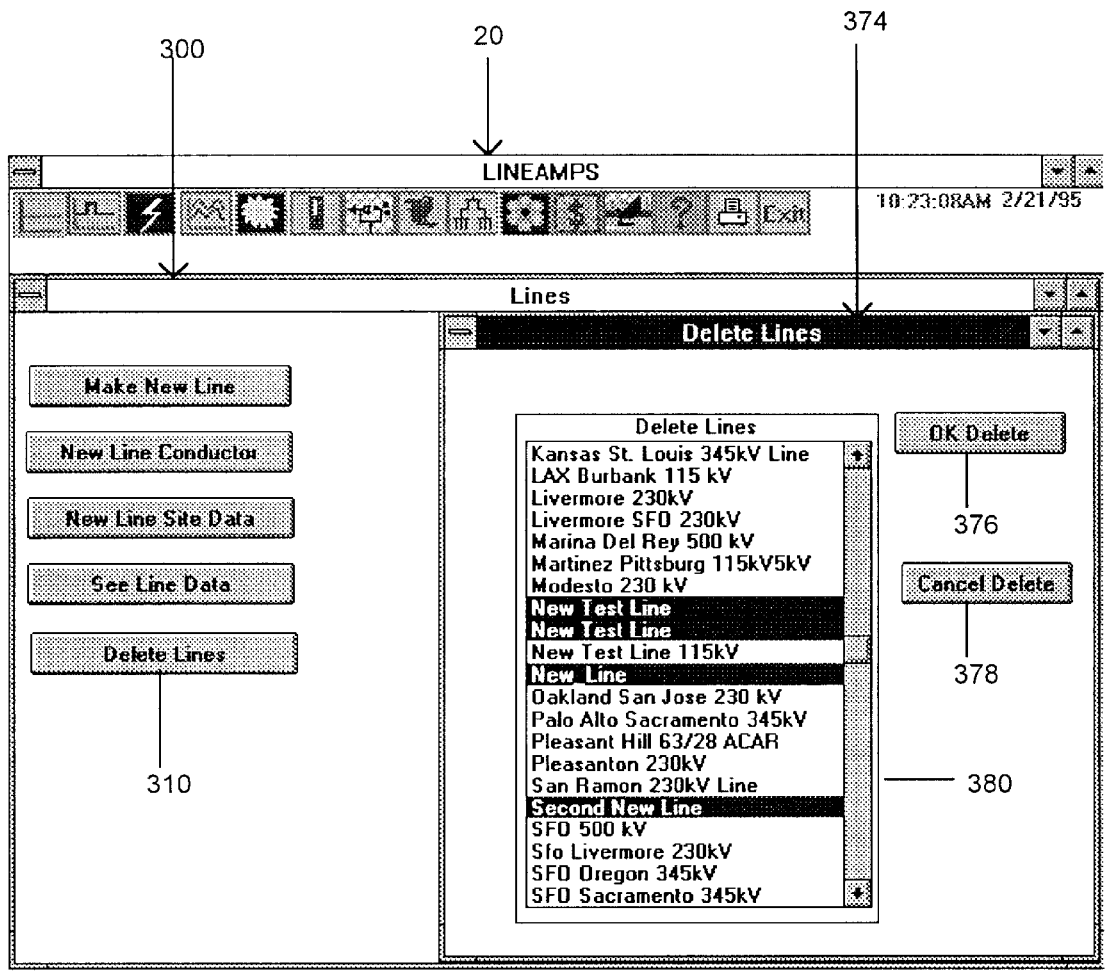
Fig. 18.   Delete Lines

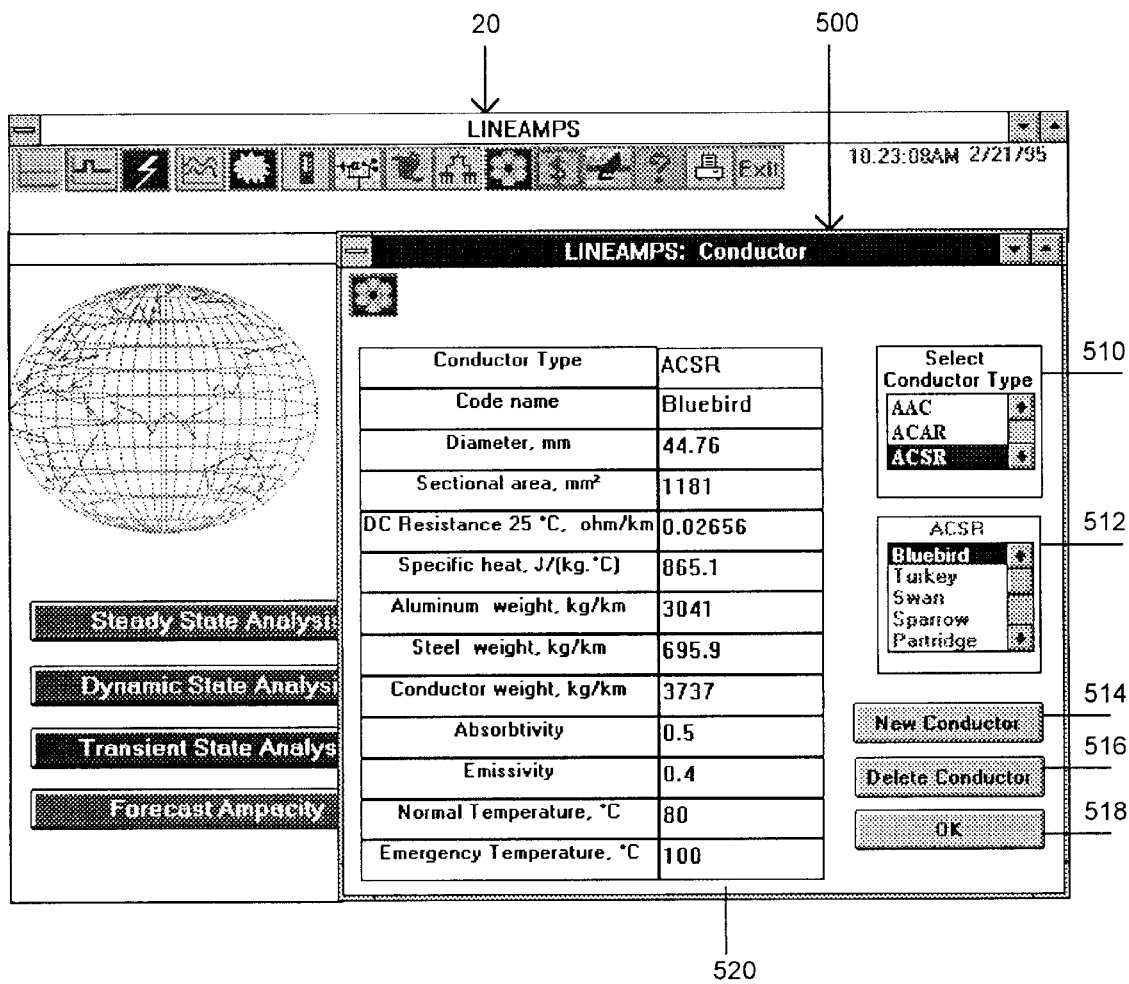
Fig. 19. Conductor window

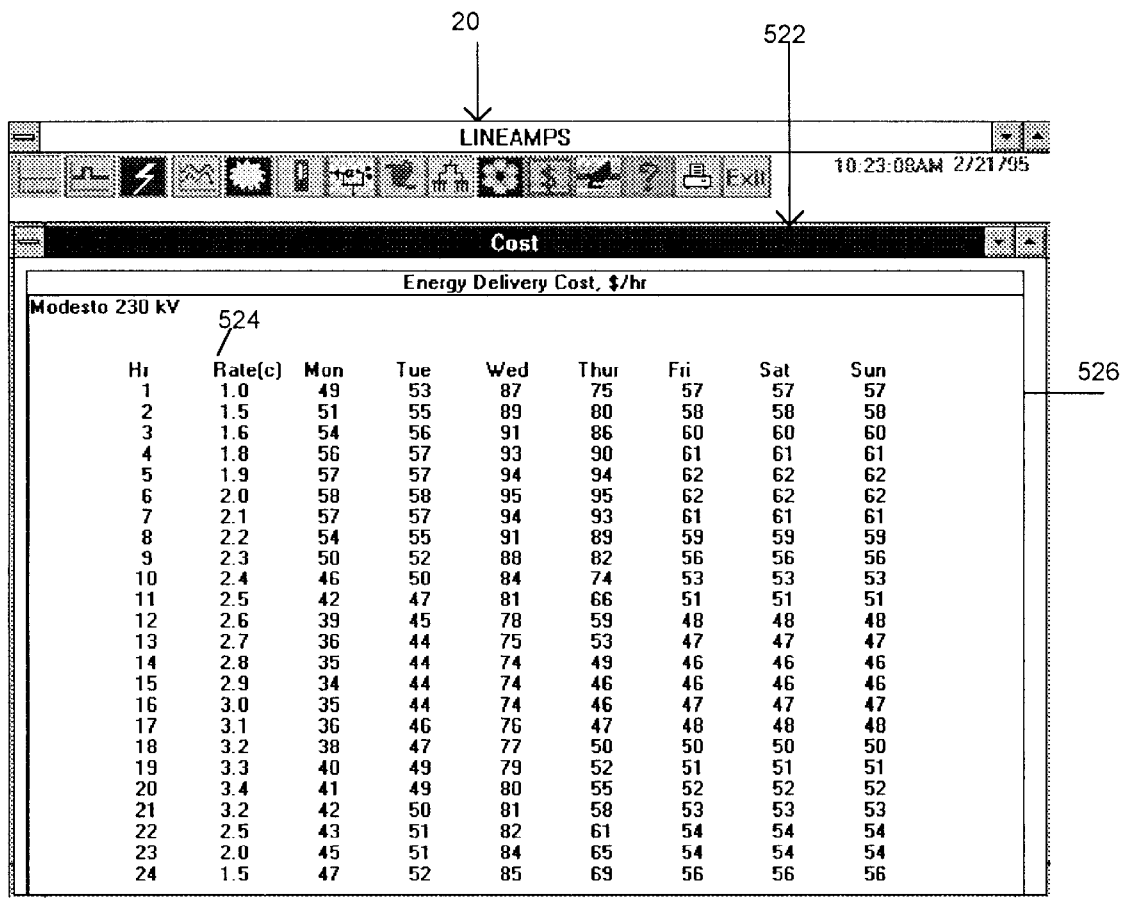
Fig. 20. Energy delivery cost.

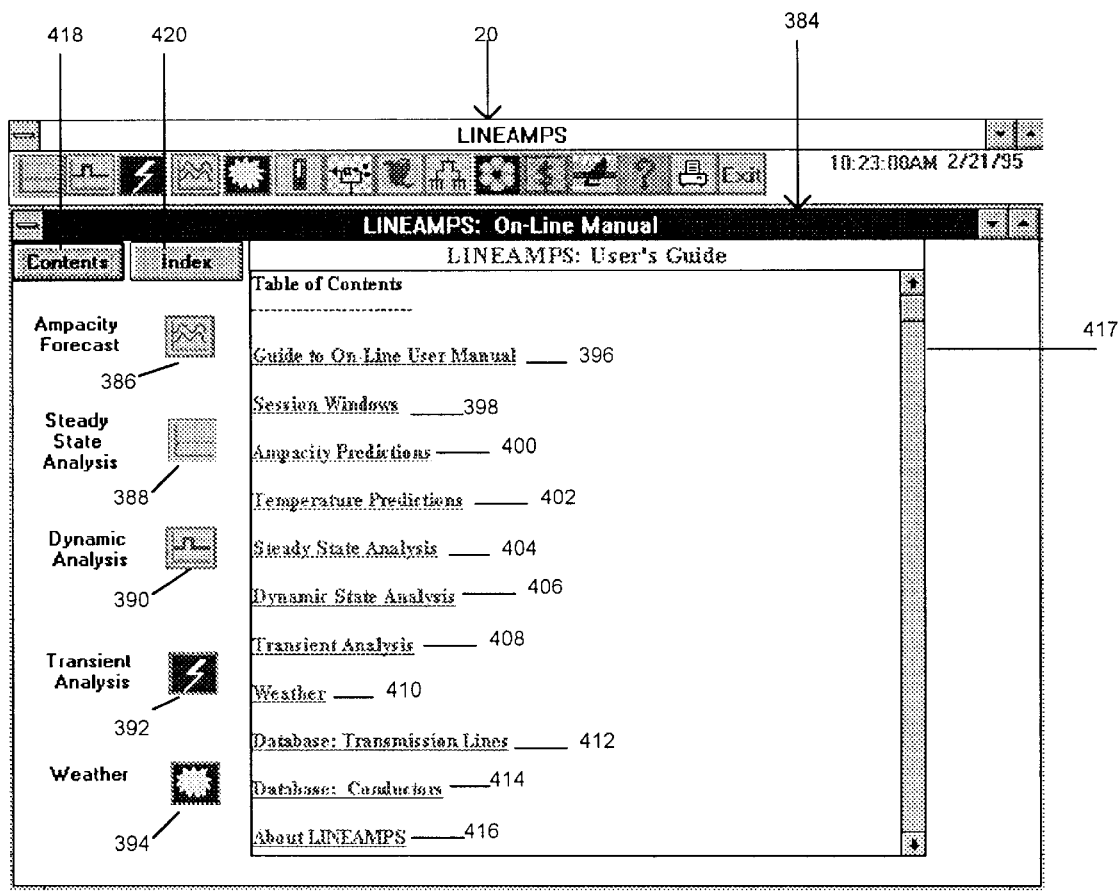
Fig. 21. On-line help window

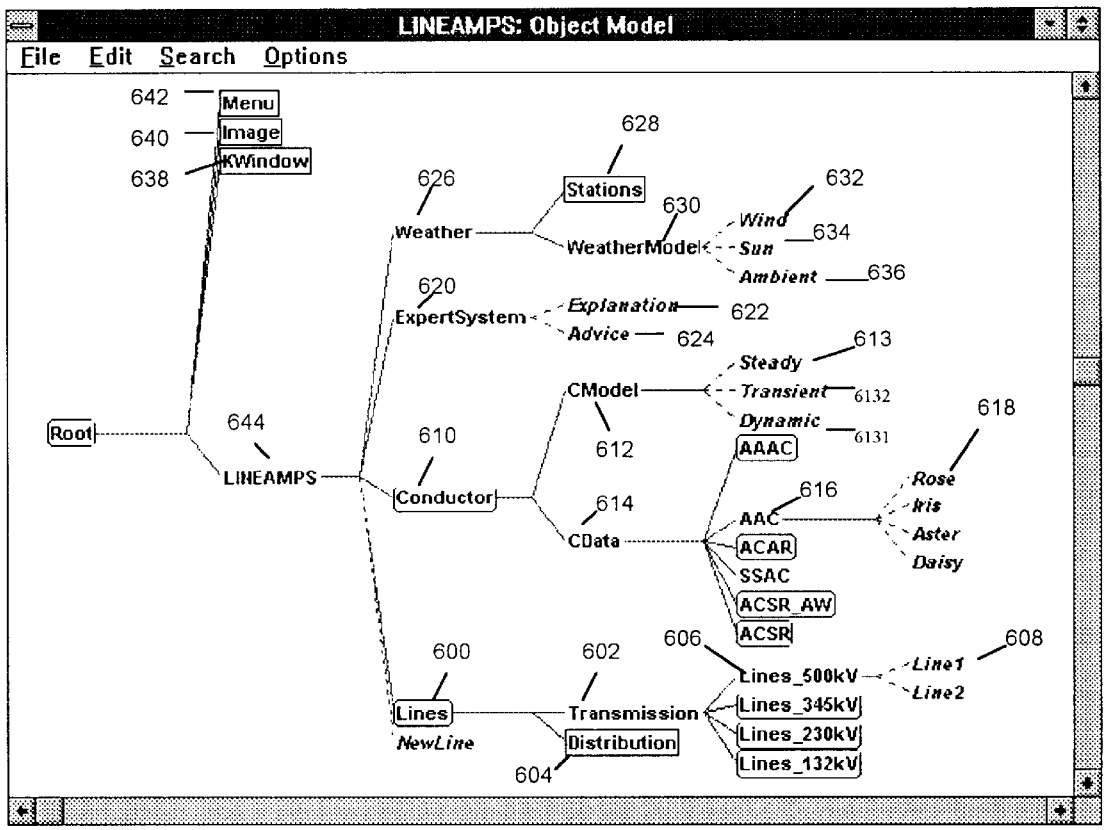
Fig. 22.   Object model of the line ampacity system.

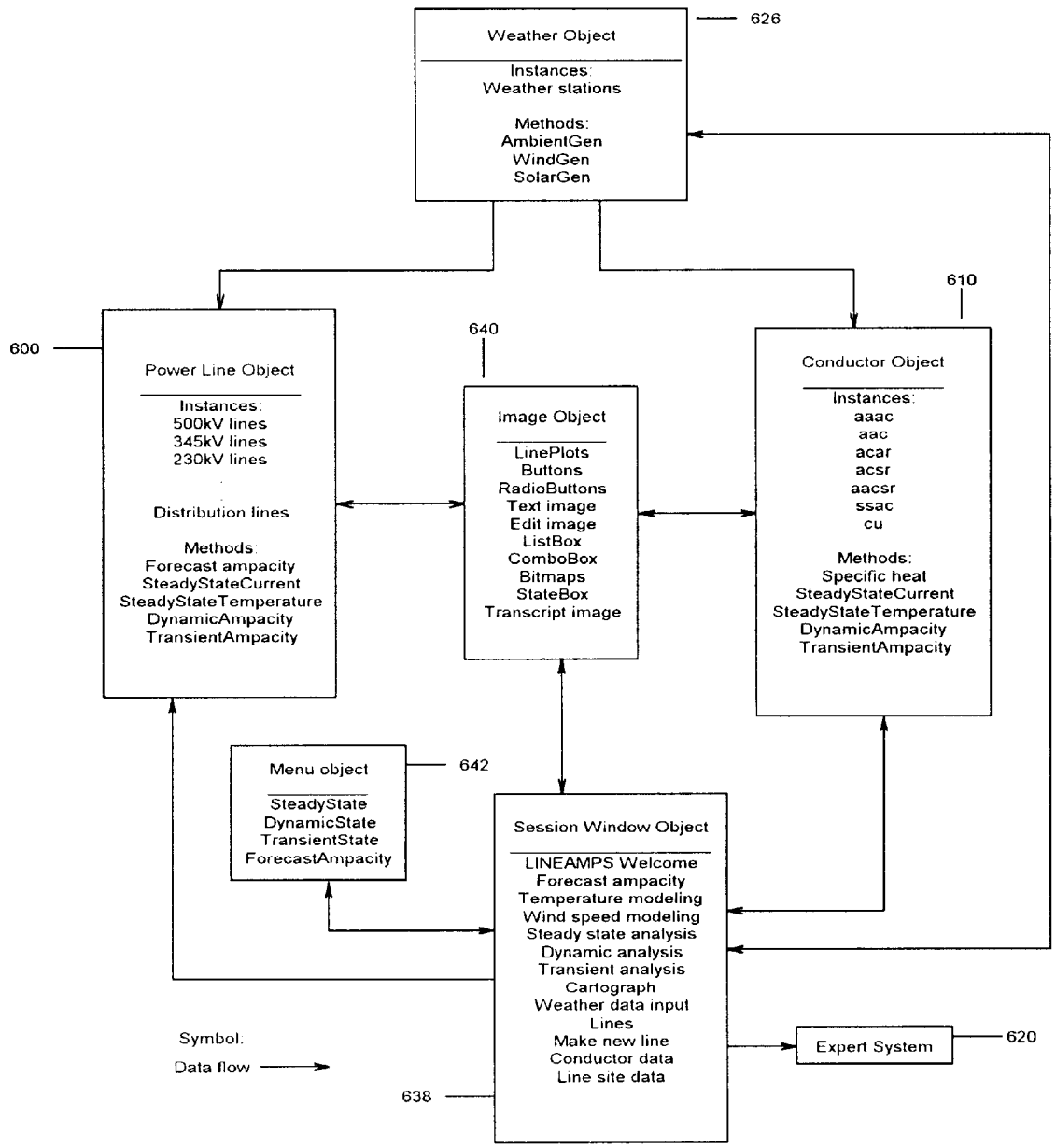
Fig. 23. Objects and dataflow diagram of LINEAMPS

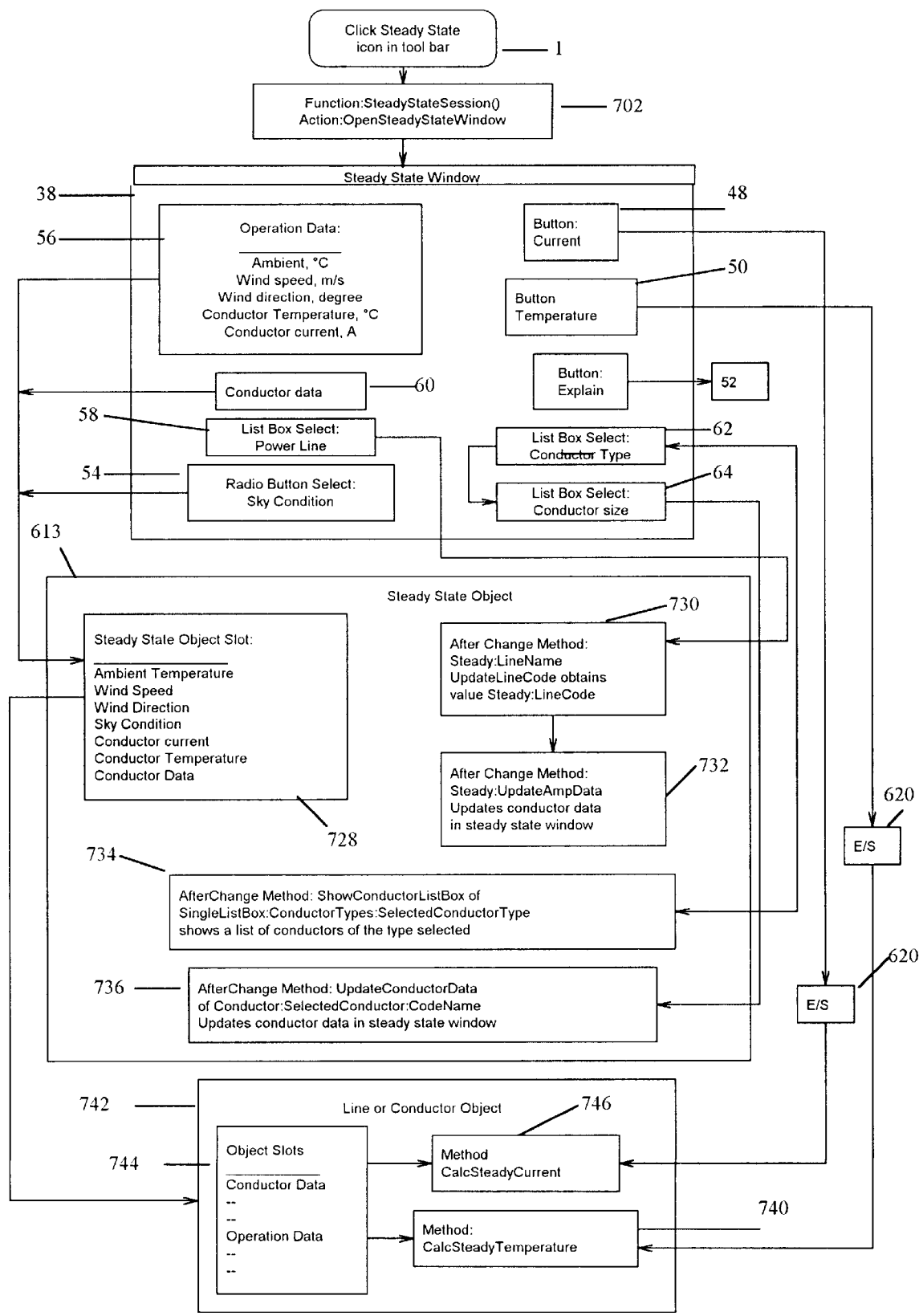
Fig. 24.    Objects and data flow in steady state analysis.

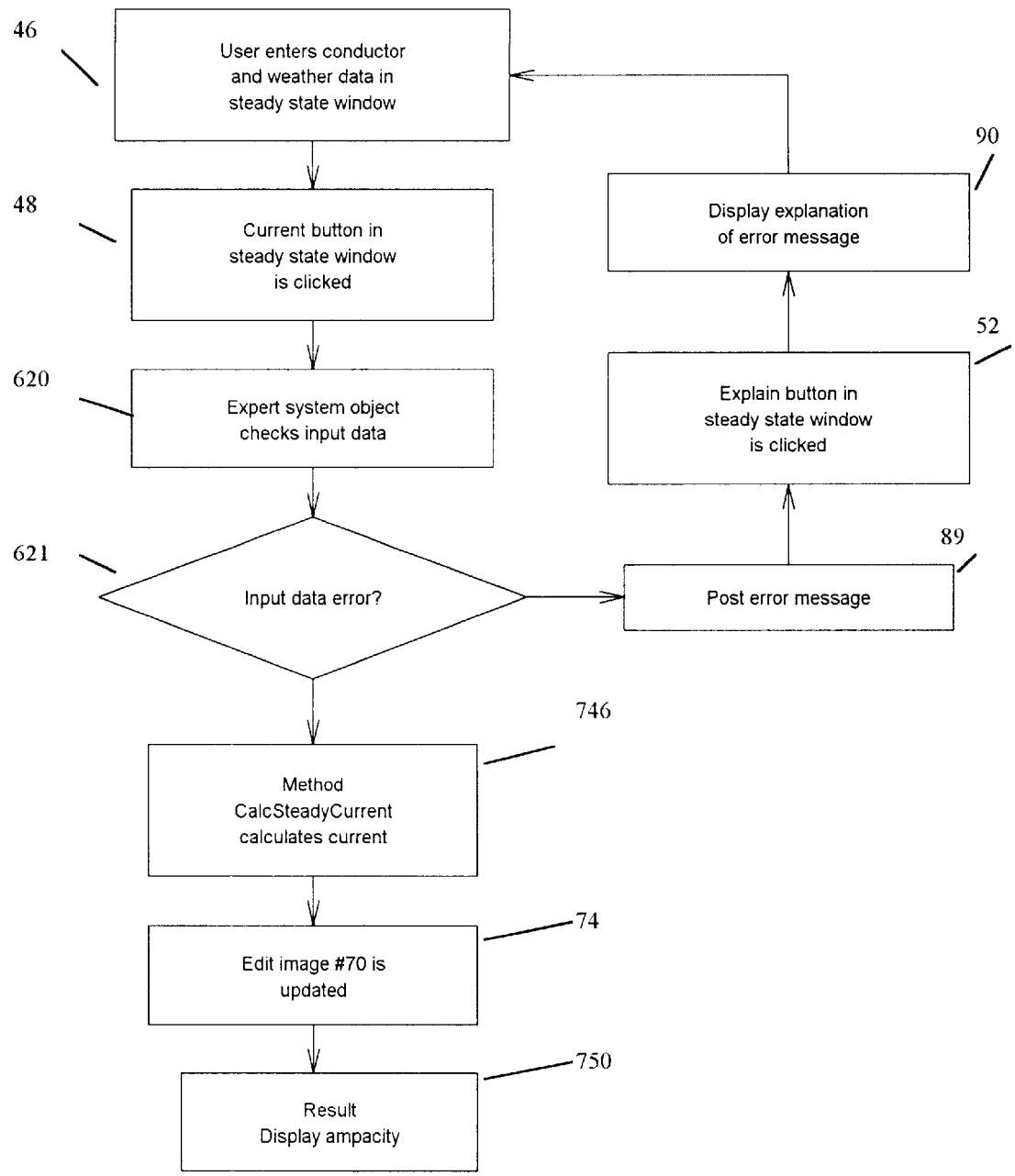
Fig. 25. Steady state current flowchart.

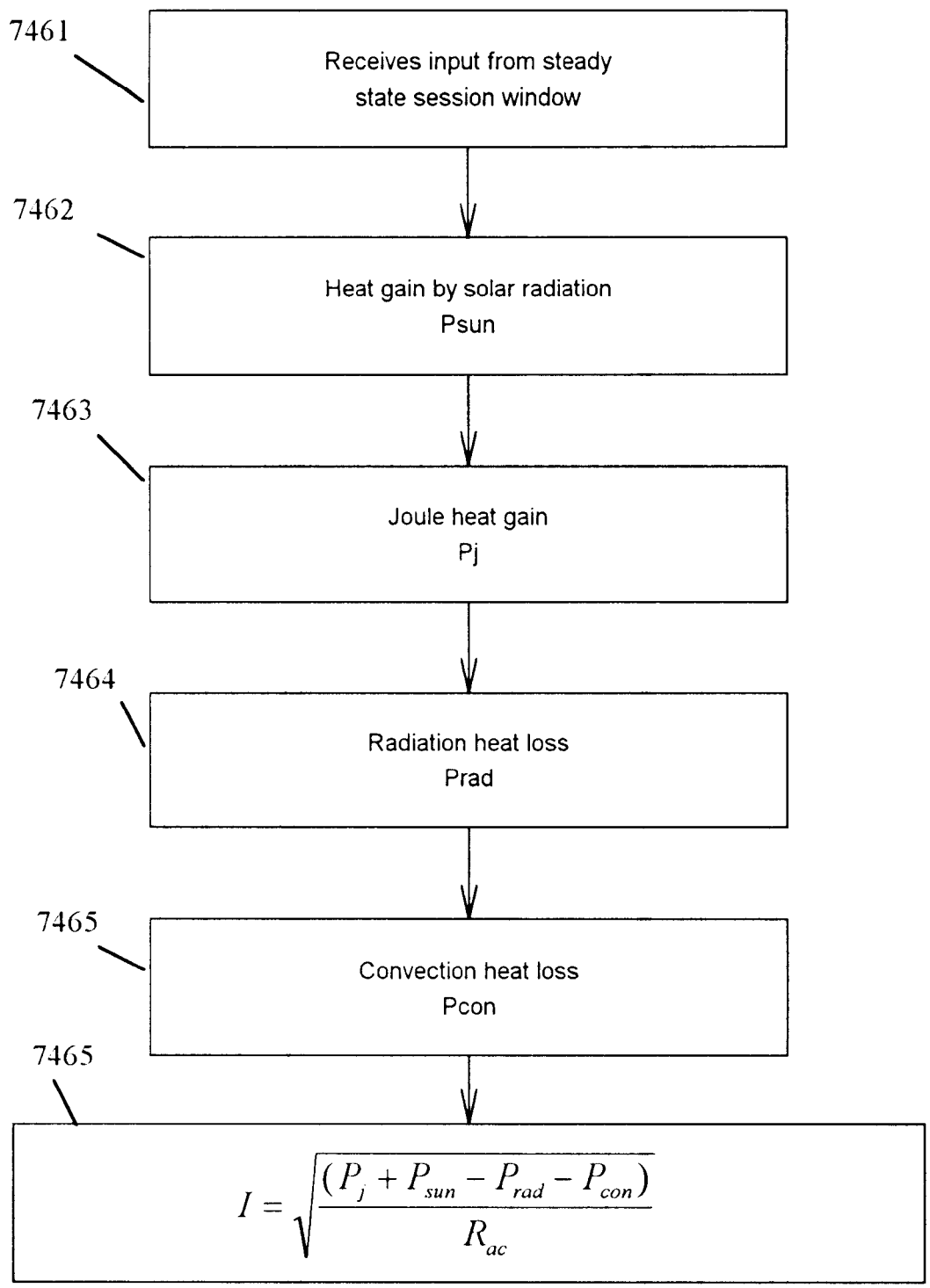
Fig. 26. Flowchart of CalcSteadyCurrent method.

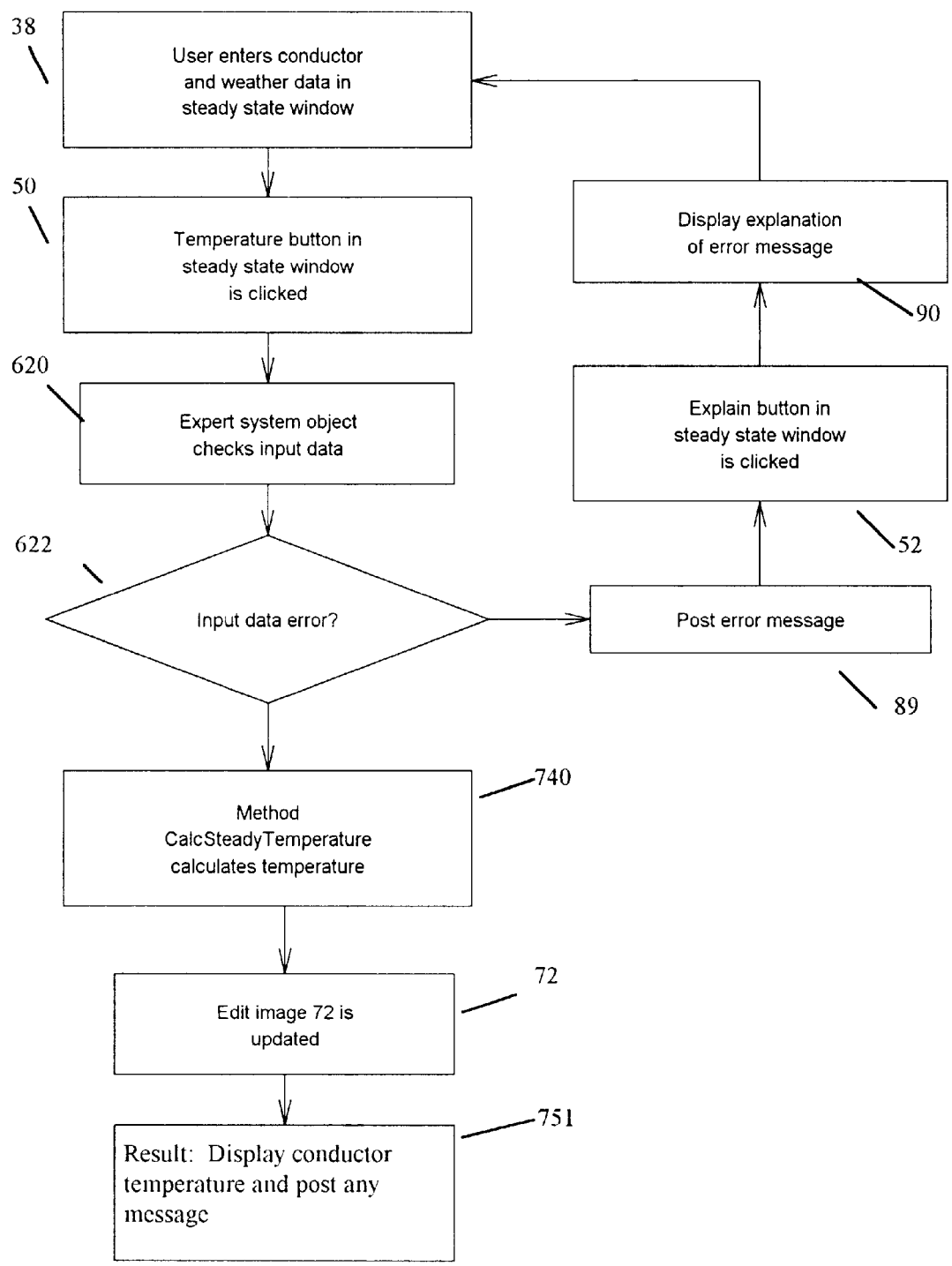
Fig. 27. Flowchart of steady state conductor temperature.

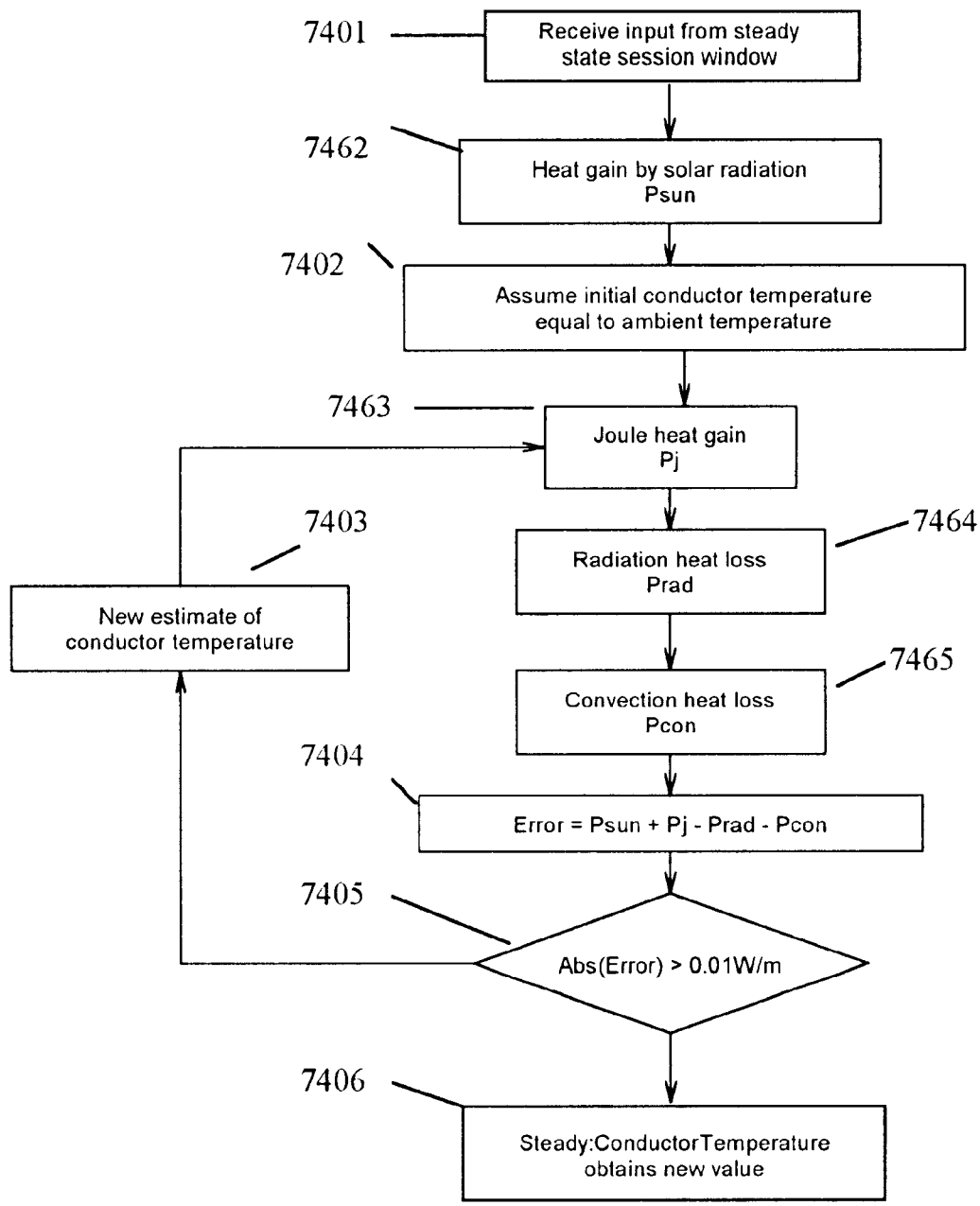
Fig. 28. Flowchart of CalcSteadyTemperature method.

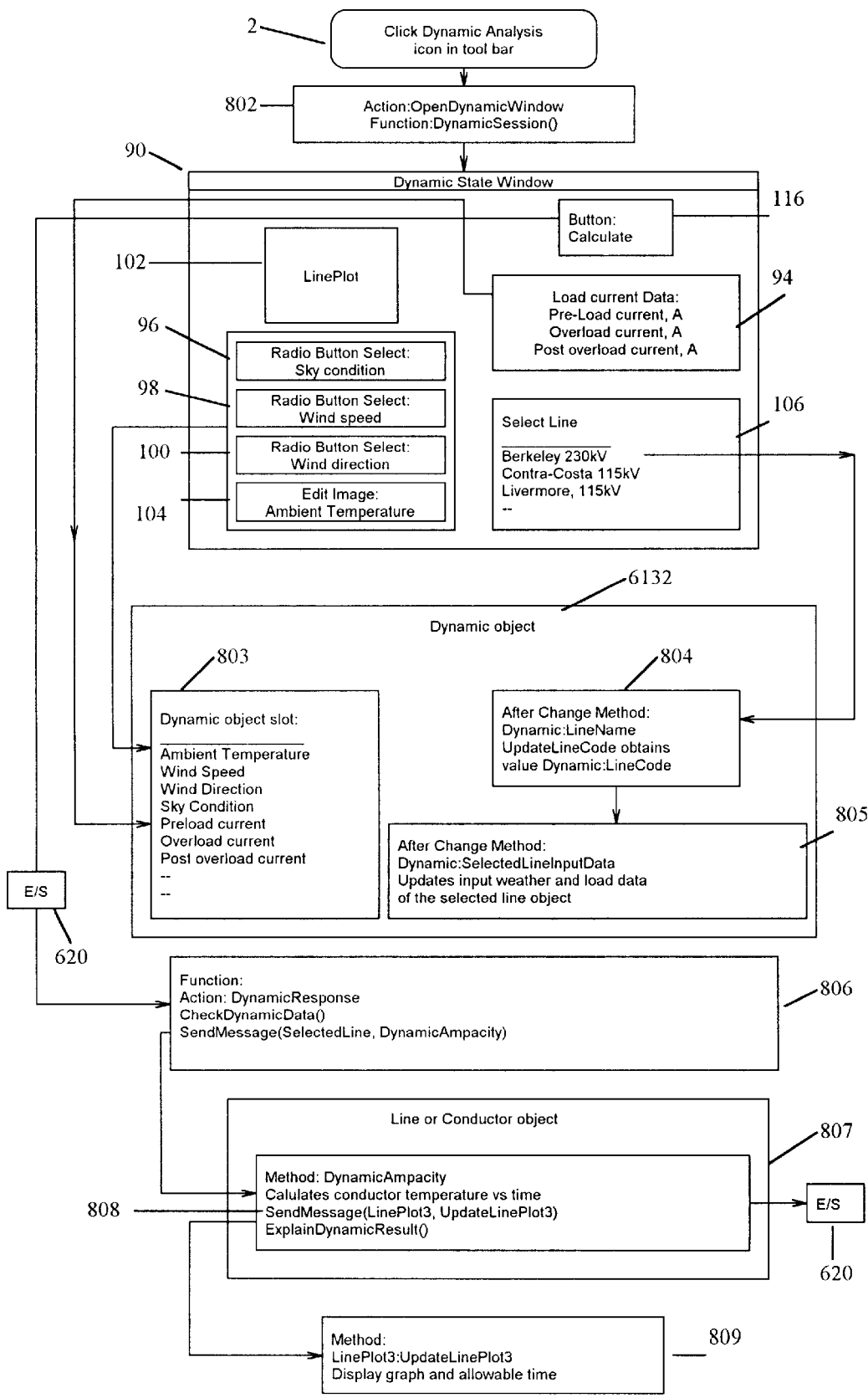
Fig. 29. Objects and dataflow diagram of dynamic analysis.

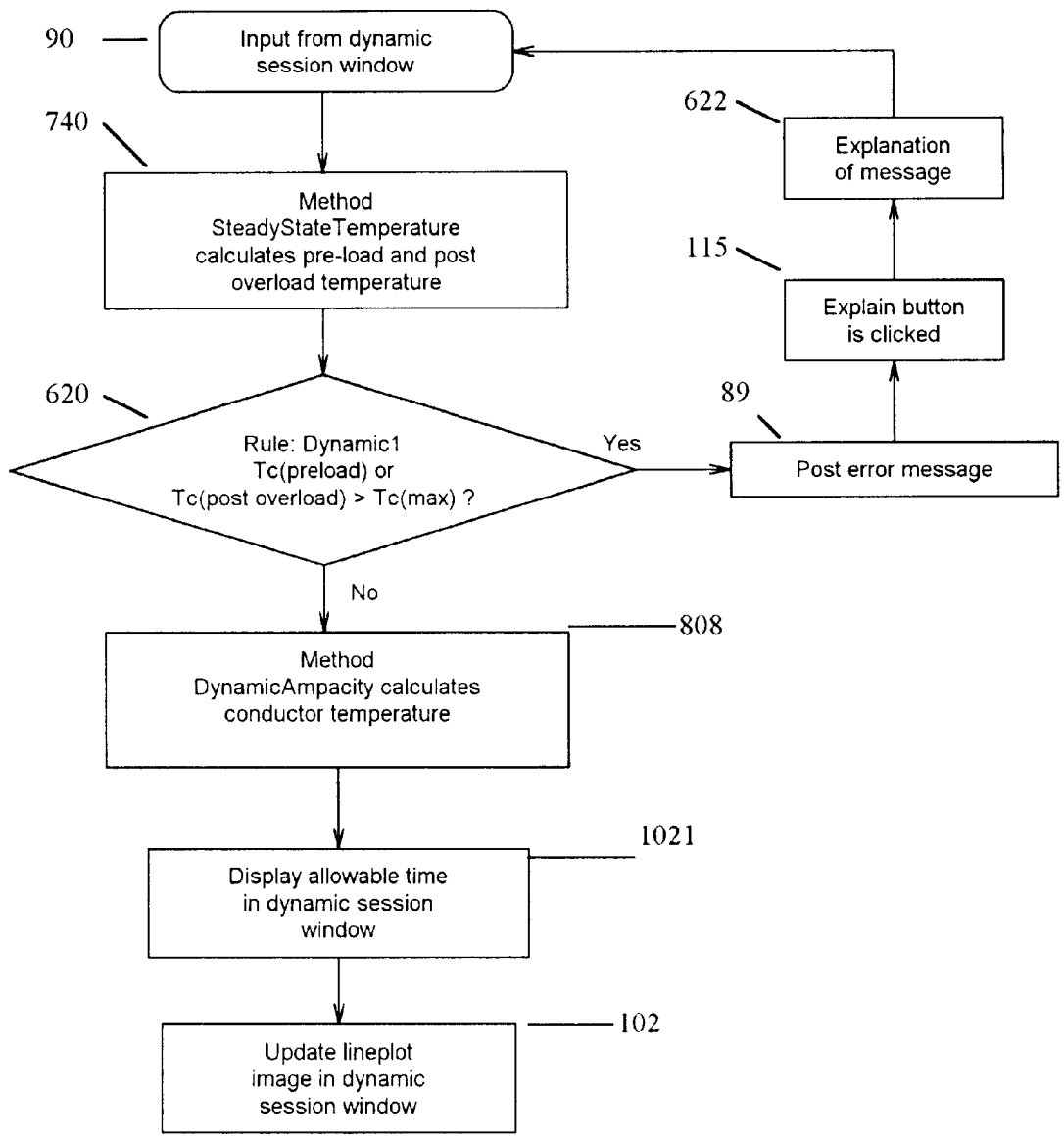
Fig. 30. Dynamic analysis flowchart.

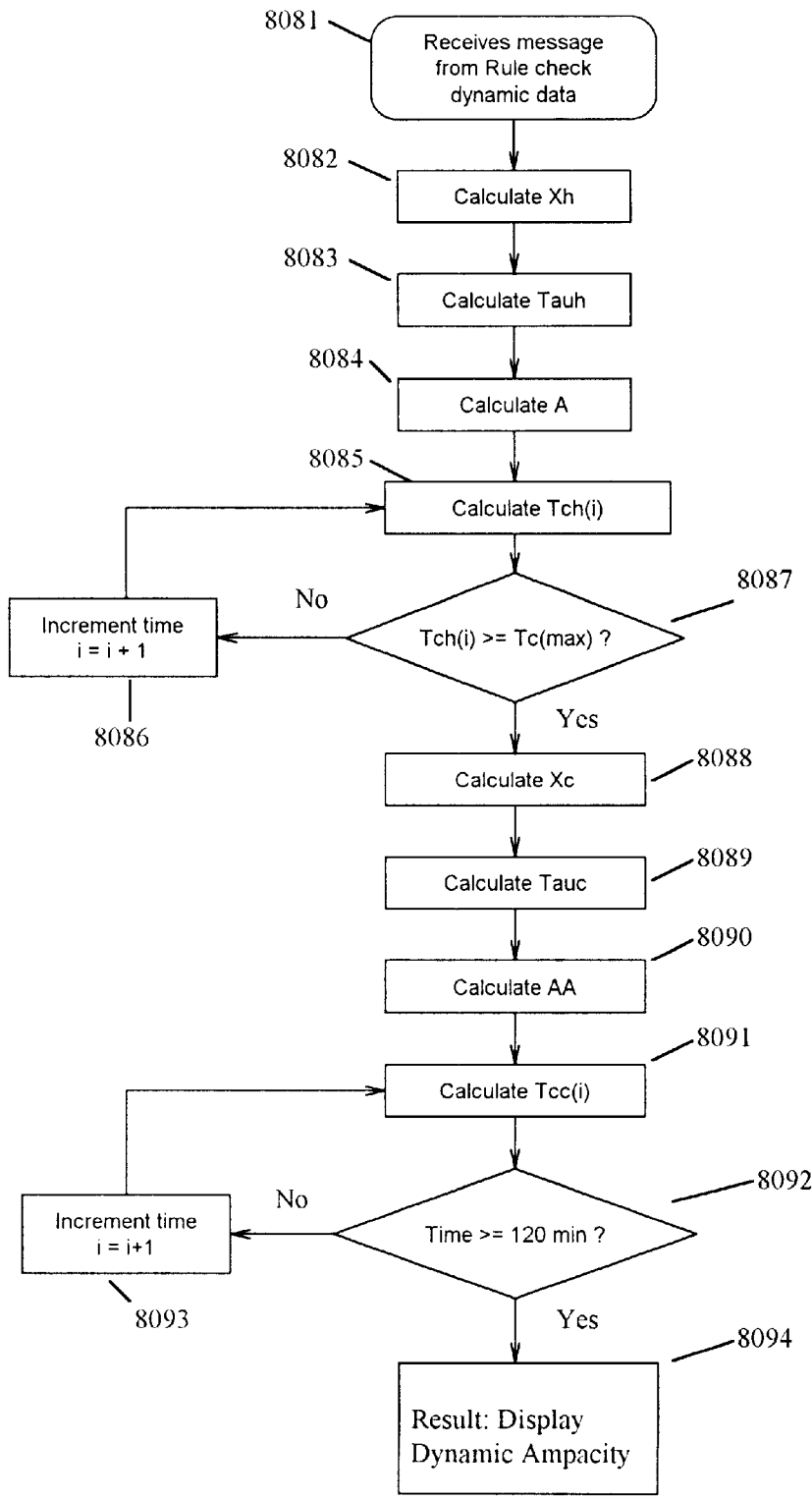
Fig. 31.    Flowchart of DynamicAmpacity method

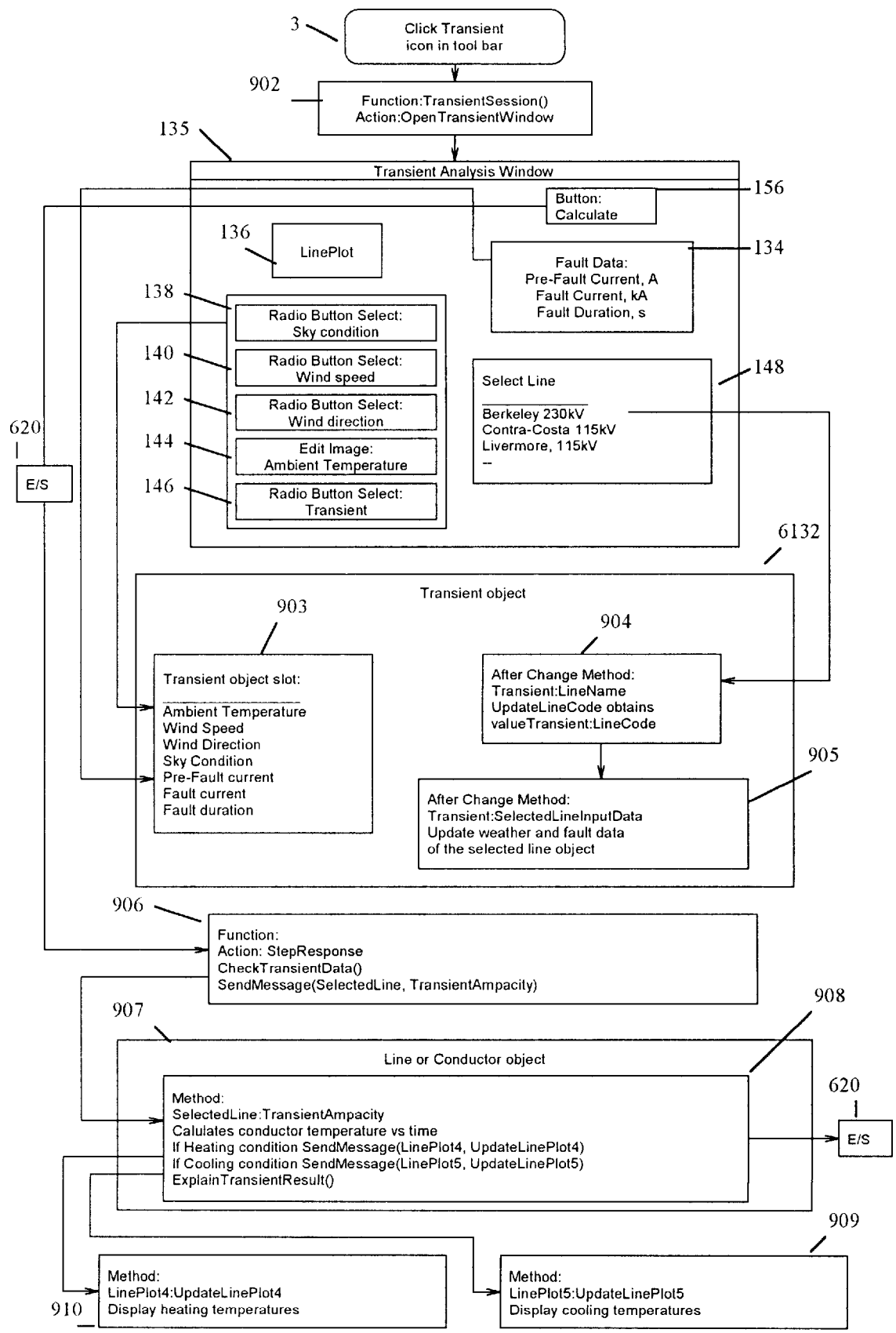
Fig. 32. Objects and dataflow diagram of transient analysis.

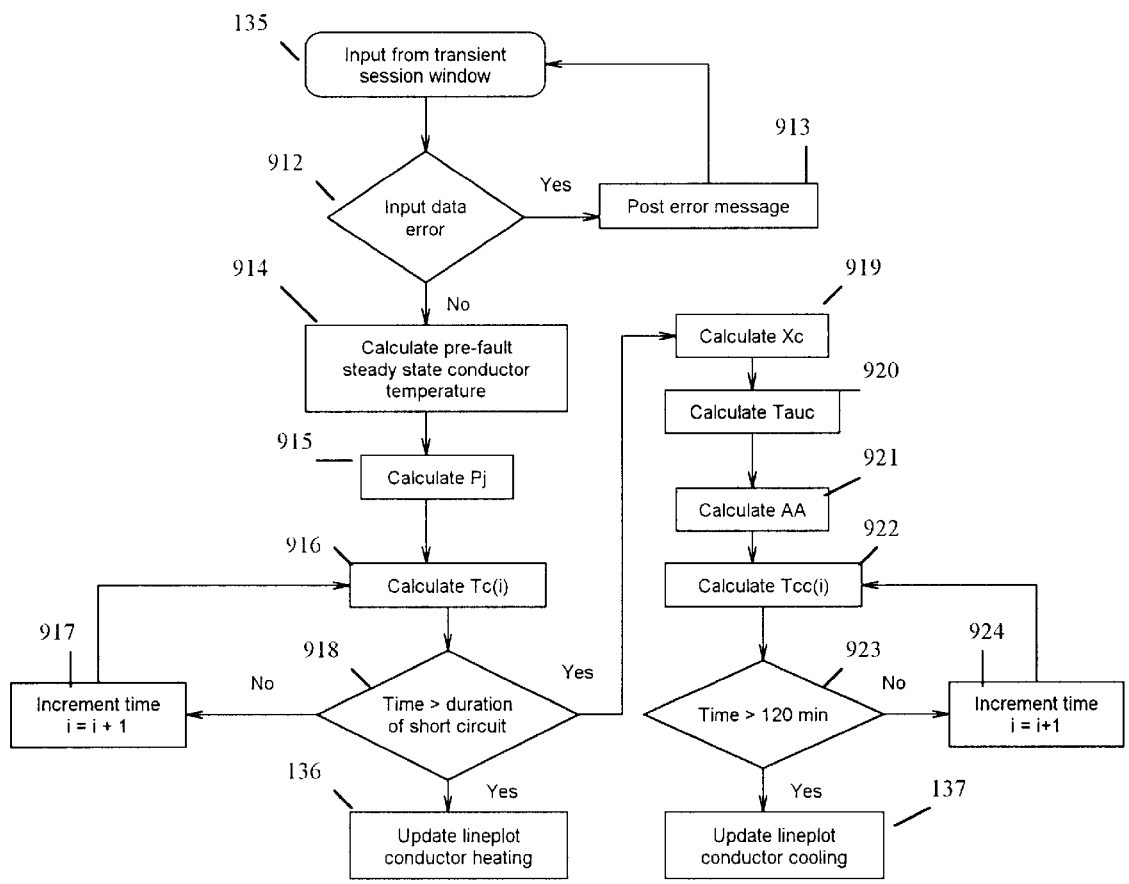
Fig. 33. Flowchart of TransientAmpacity method.

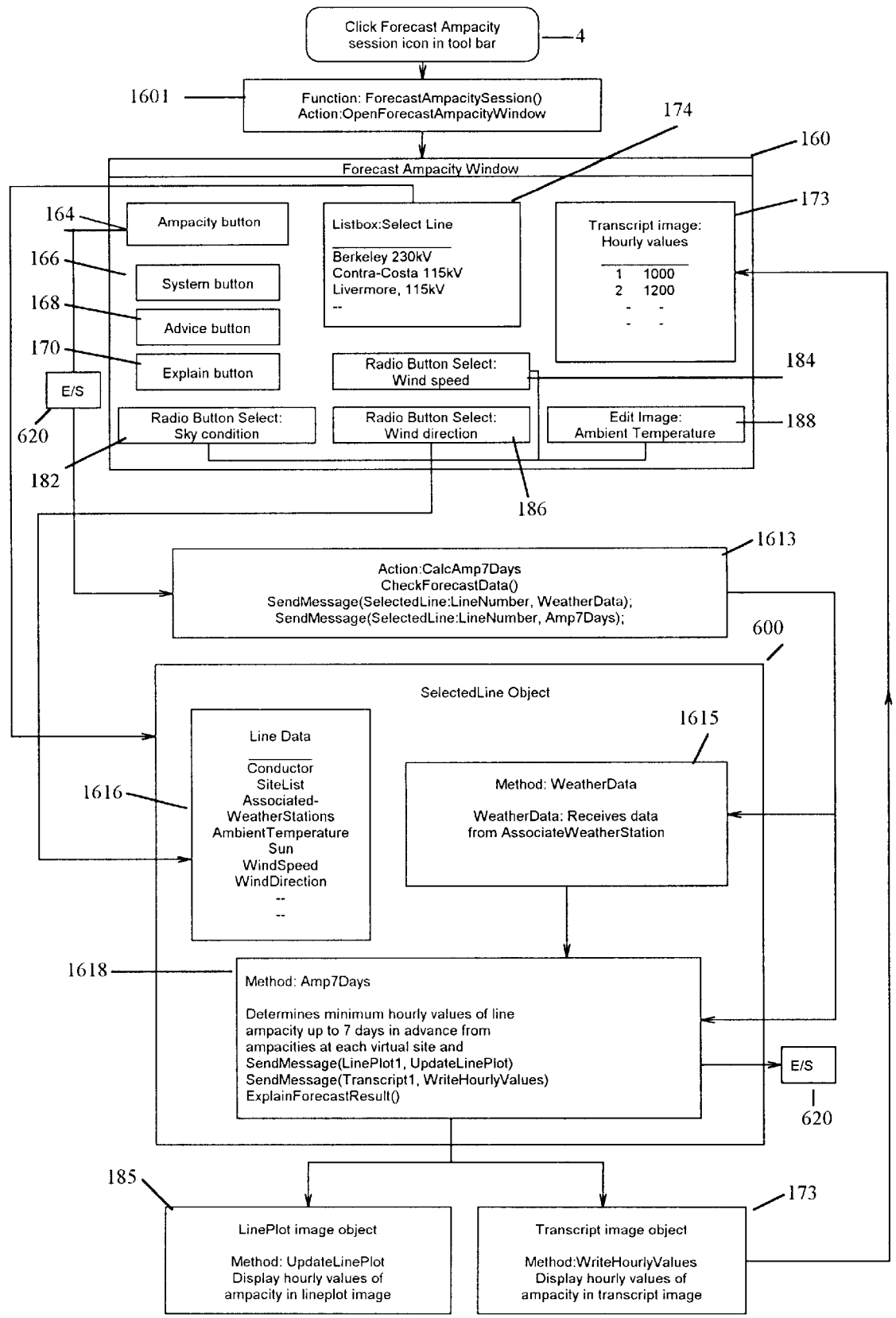
Fig. 34.  Objects and dataflow diagram of the ampacity forecast session.

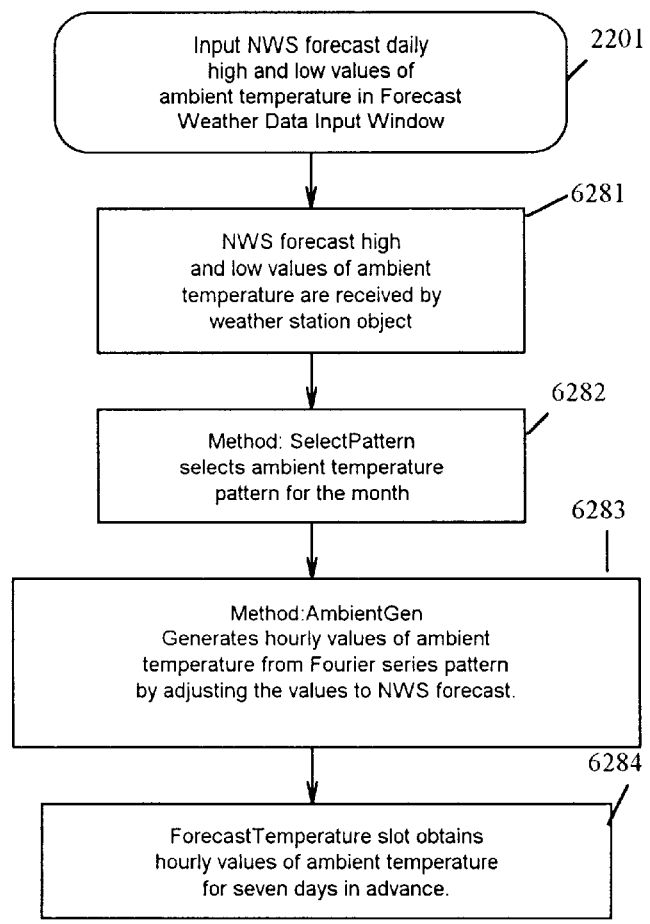
Fig. 35.   Self generation of hourly values of ambient temperature by a weather station object.

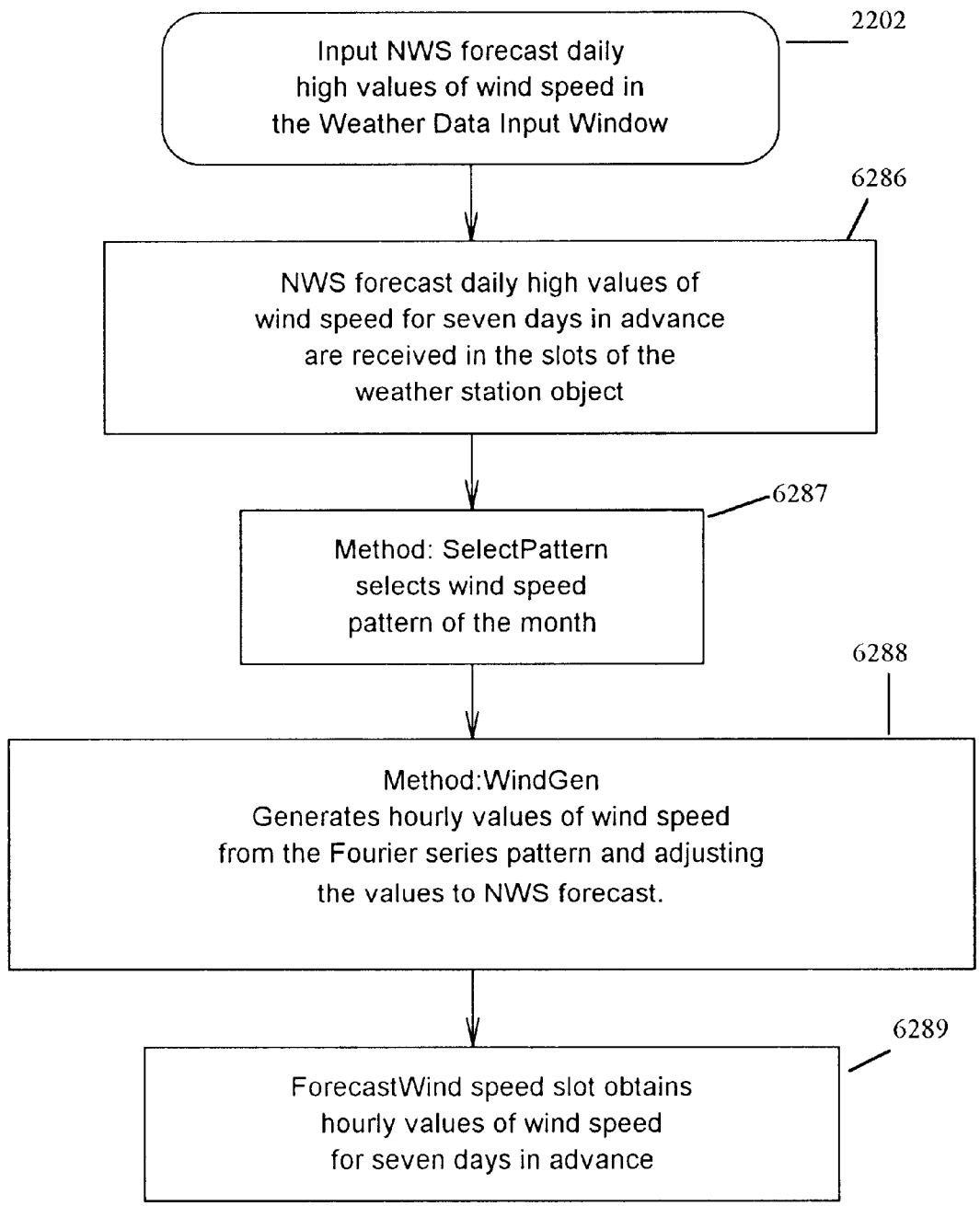
Fig. 36. Wind speed generator.

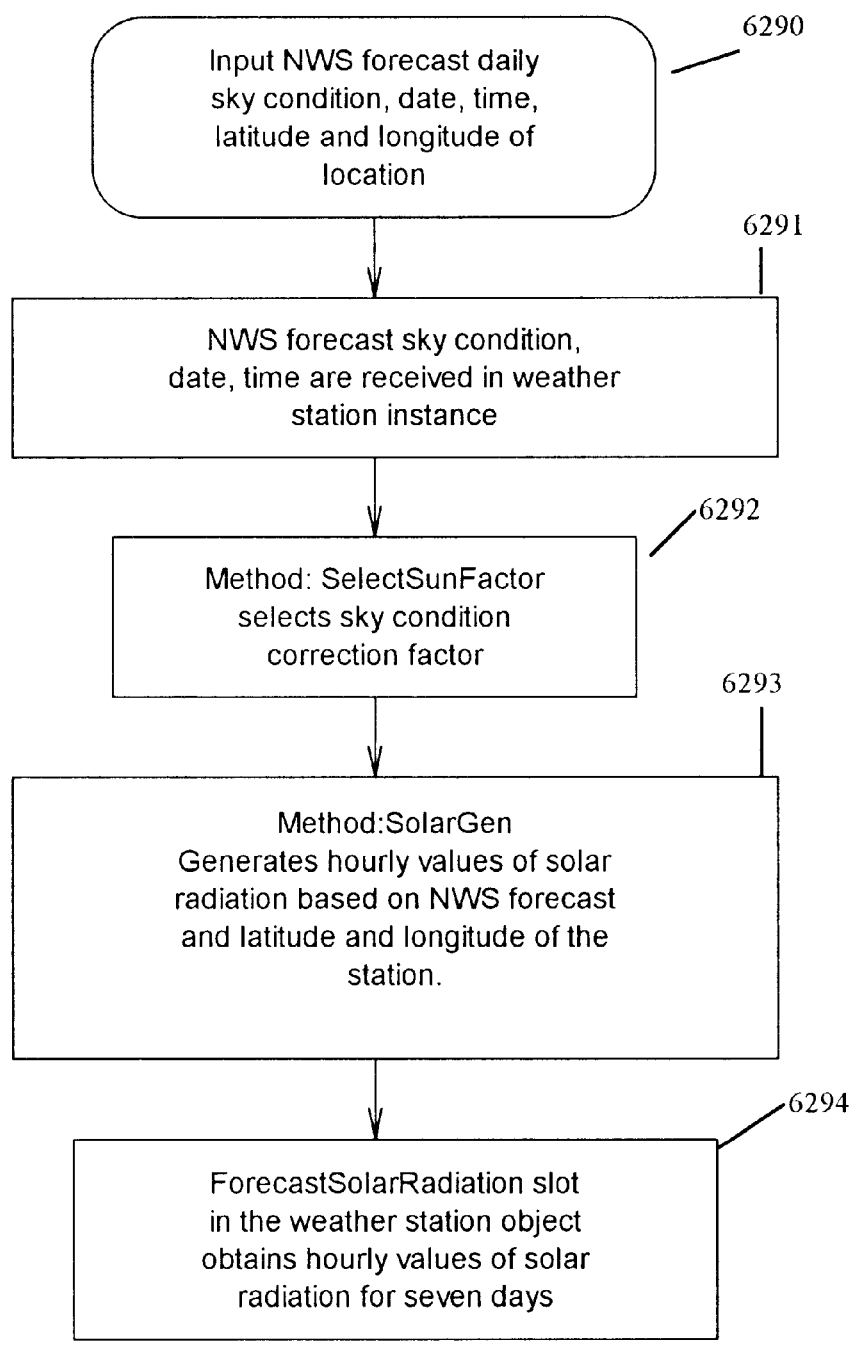
Fig. 37. Self generation of solar radiation.

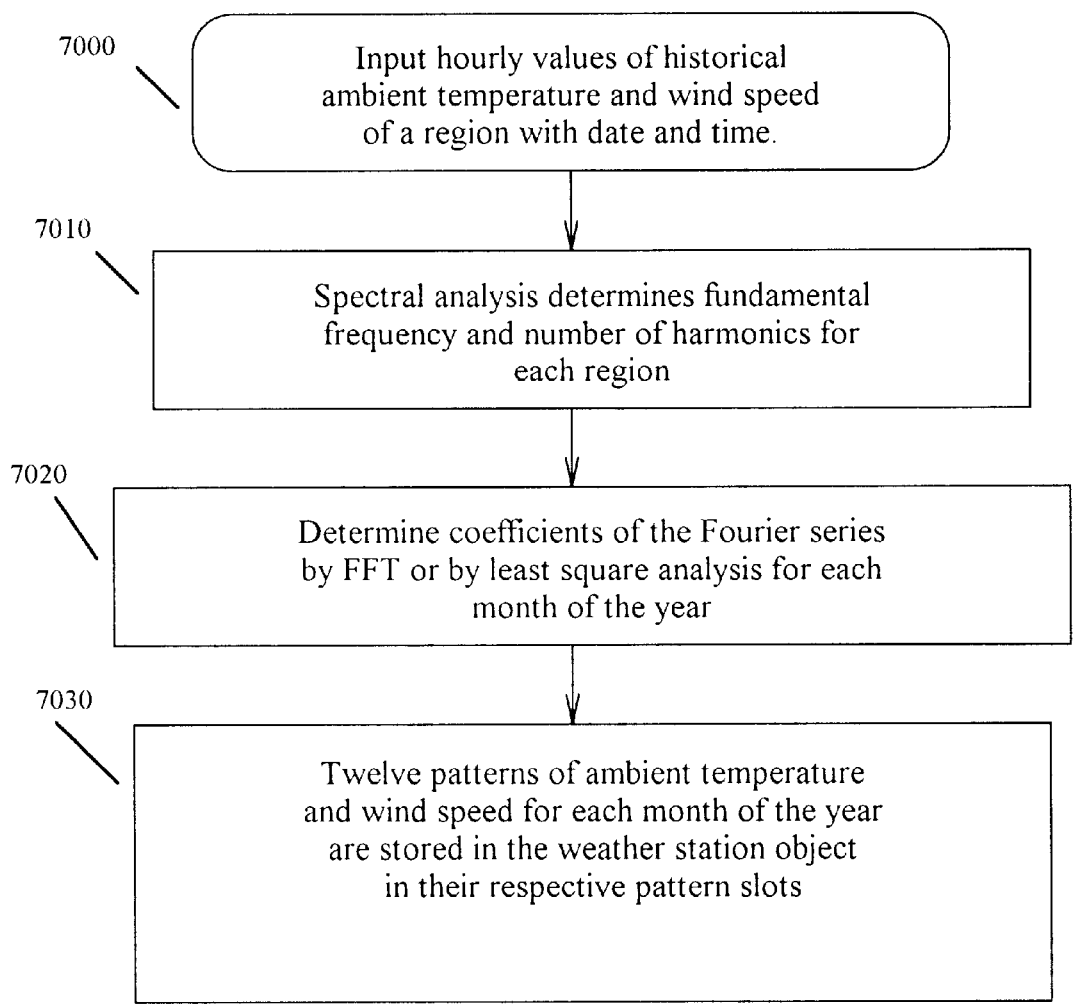
Fig. 38. Pattern selection method.

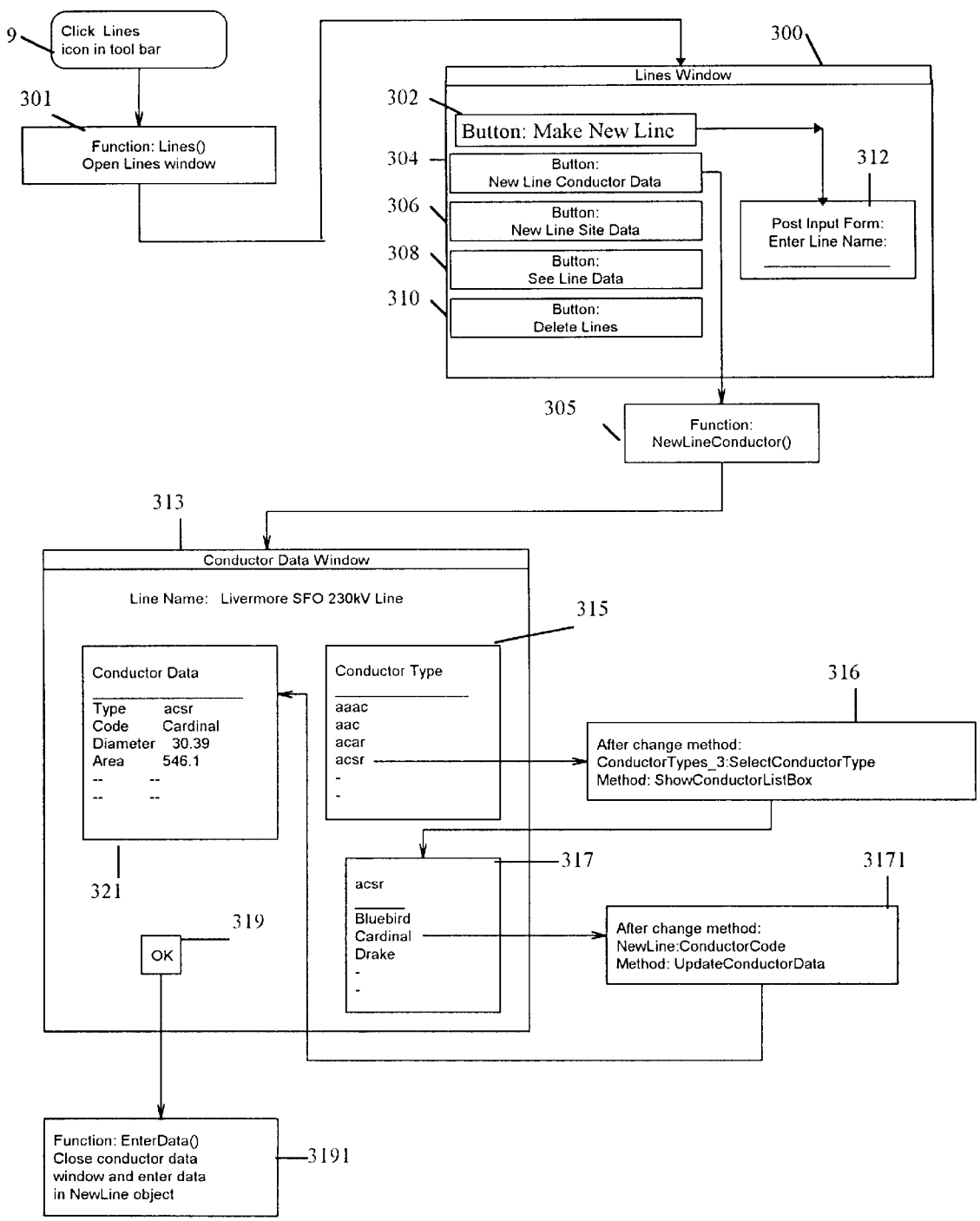
Fig. 39.   New line conductor.

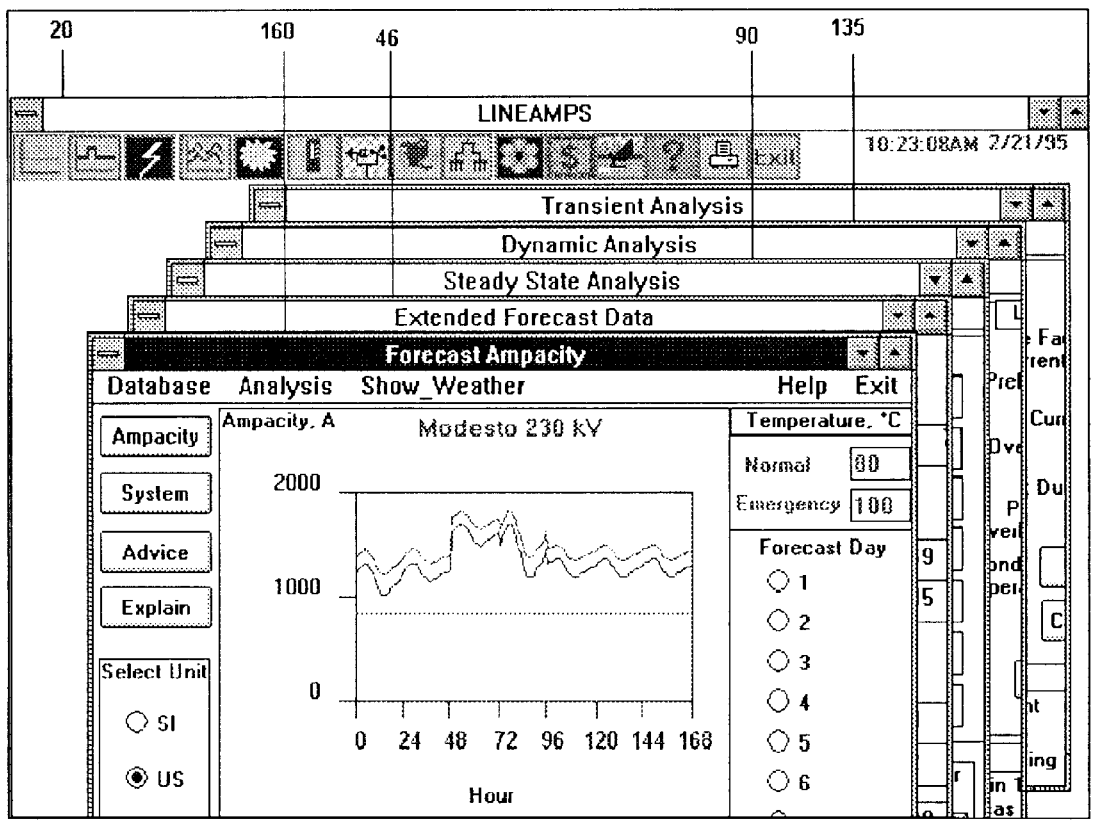
Fig. 40. Multiple session windows.

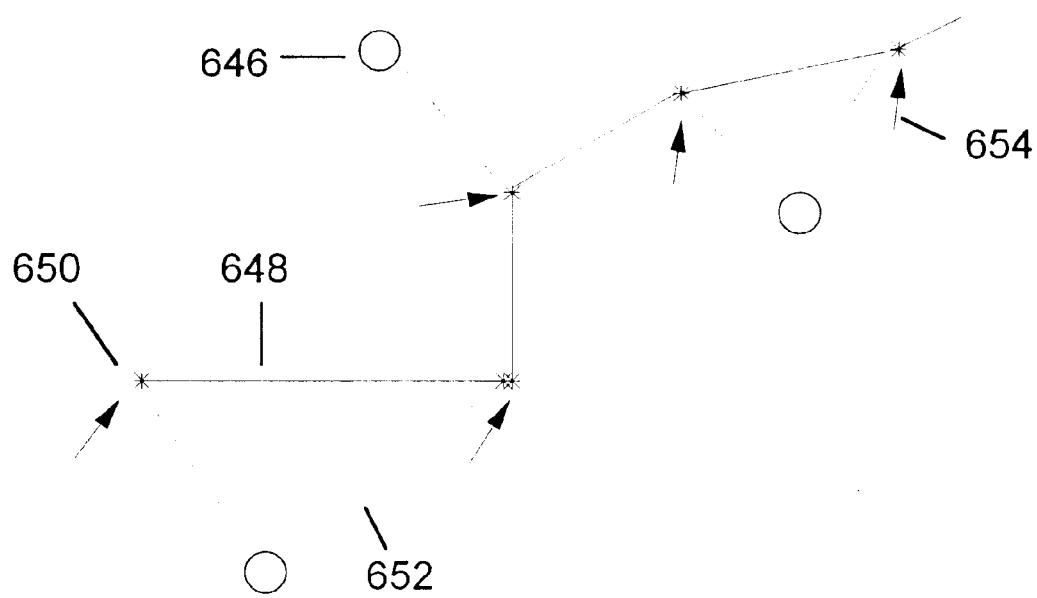
Fig. 41.  Power line, weather stations, virtual sites.

OBJECT ORIENTED EXPERT POWER LINE AMPACITY SYSTEM

BACKGROUND OF THE INVENTION

1. Field of Invention

This invention relates to a self generating power line ampacity system by object oriented modeling and expert rules of the power line environment.

2. Description of Related Art

Line ampacity system

Electric power companies generally determine the current carrying capacity of overhead power lines based upon conservative assumptions of ambient temperature, wind speed and solar radiation for a maximum allowable conductor temperature. Most common assumptions are: ambient temperature=40° C., wind speed=1 m/s, solar radiation= 1000 W/m$^2$, maximum conductor temperature=80° C. During favorable weather conditions when ambient temperature is lower than the assumed maximum or when wind speed is higher than the assumed minimum or during cloudy sky conditions higher ampacity is possible without exceeding the allowed maximum temperature of the power line conductor.

For the above reasons many utilities have started adapting line ratings to actual weather conditions as an inexpensive way to increase line capacity. Dynamic line rating systems are also proposed that take into account the heat storage capacity of the conductors. Ampacity systems that adjust line capacity depending upon measured conductor temperature or actual weather conditions require continuous input of data by the installation of line temperature sensors, meteorological sensors and/or on-line connection to a weather bureau. Sometimes elaborate telecommunication systems are also required to bring data from remote sensor locations to a host computer where line ampacity is evaluated. Real time line ampacity systems are therefore expensive to install, cumbersome to operate and maintain. The self generating line ampacity system hereafter called LINEAMPS provides an alternative method of obtaining line ampacity which does not require real time conductor temperature measurements or continuous input of meteorological data. It is a self generating line ampacity system because power line ampacity is estimated by weather station objects in the program that have data and methods to generate hourly values of ambient temperature, wind speed, wind direction and solar radiation. The system is therefore realized more economically and can be easily implemented in any region.

Another subject of recent interest is the development of forecasting models to determine power line ampacity several hours ahead into the future. Power system planners have load forecasting tools and also require advance knowledge of transmission and distribution line capacity. LINEAMPS is a tool that can be used by power system operators or anyone who is interested to know present and future power line capacity for the efficient operation of electric power system.

Electric power companies are also interested in new ways of operating power lines to maximize capacity utilization so that they may defer capital investment required for the construction of new lines. Delaying the construction of new lines is also beneficial to the environment. With the advent of newer technology, delaying the construction of new lines may eventually lead to their cancellation thereby saving large investments. LINEAMPS is a software tool enabling increased utilization of existing lines which can delay the construction of new lines and therefore has the potential to save large investments.

Estimation of power line ampacity by the application of object oriented modeling and expert rules was first presented by Deb in the following IEEE reference:

"Object oriented expert system estimates power line ampacity", by Anjan K. Deb, IEEE Computer Application in Power, volume 8, number 3, 1995.

Deb's line ampacity system has power line object, weather station object and conductor object. Power line objects contain data and methods which eliminates the need to read line data from external data files. Line ampacity results are also stored in the power line object data base slots. Thus the power line object not only offer methods required to calculate ampacity, it is also a convenient repository for the storage of line data and its ampacity that can be easily retrieved and presented on the screen. Deb's object oriented power line ampacity system also provides greater user facility to input data, management of power line, weather and conductor data, and for the presentation of results.

Previously Deb developed time series stochastic and deterministic models that are given in the following references:

"Le système ATLAS de PG&E d'évaluation dynamique de la capacité thermique d'une ligne de transport," by L. Cibulka, W. J. Steeley, A. K. Deb, Conférence Internationale des Grands Réseaux Électriques, Paris, France, Aug. 30 to Sep. 5, 1992.

"Ambient temperature corrected dynamic transmission line ratings at two PG&E locations", by W. J. Steeley, B. L. Norris, A. K. Deb, IEEE Transactions on Power Delivery, Volume 6, Number 3, July 1991, pages 1234–1242.

"Dynamic thermal rating of transmission lines independent of critical span analysis," by T. Paul Mauldin, William J. Steeley, A. K. Deb, International Conference on High Technology in the Power Industry, Phoenix, Ariz., USA, Mar. 1–4, 1988.

In the above references line ampacity was based on ambient temperature measurements only by assuming constant wind speed.

In the following reference:

"Prediction of overhead transmission line ampacity by stochastic and deterministic models," by J. F. Hall and A. K. Deb, published in the IEEE Transactions on Power Delivery, Vol. 3, No. 2, April 1988, pages 789–800, Deb presented a stochastic model to forecast wind speed also. A limitation of these models are that they require hourly measurement of meteorological data on a continuous basis to calculate stochastic variables Z(t–1), Z(t–2) shown below, $$Ta(t)=A_1+A_2\cdot\text{Sin }(2\omega t)+A_3\cdot\text{Sin }(2\omega t)+A_4\cdot\text{Cos }(\omega t)+A_5\cdot\text{Cos }(2\omega t)+A_6\cdot Z(t-1)+A_7\cdot Z(t-2)$$

where,

Z(t–1), Z(t–2)=difference in measured and predicted temperature at time (t–1) and (t–2) respectively.

$A_1, A_2, A_3, A_4, A_5, A_6, A_7$ are the coefficients of the model $\omega=2p/T=$fundamental frequency T=24 hour=period In my LINEAMPS stochastic variables are not required and extended Fourier series models of ambient temperature and wind speed are used to generate weather data which eliminates the need for real time measurements. Another limitation of the stochastic model is that it is unsuitable for the predictions of hourly values of ambient temperature for more than twenty-four hours in advance. This is to be expected, as the time series statistical model does not consider a physical model of the atmosphere, as the national weather service does for long-term weather predictions.

A weather dependent line rating method was proposed in the following reference:

"Weather-dependent versus static thermal line ratings," by Dale A. Douglass, IEEE Power Engineering Society, Transmission and Distribution Meeting, Anaheim, Calif., Sep. 14–19, 1986, paper 86 T&D 503–7.

Douglas's method also required hourly input of weather data from a weather bureau on a continuous basis. Moreover, the proposed method did not recognize the diurnal weather patterns of the region for the prediction of line ampacity. The existence of daily and seasonal cyclical weather patterns are well known and their usefulness to forecast power line ampacity has been recognized in the following references:

"Prediction of overhead transmission line ampacity by stochastic and deterministic models," by J. F. Hall, A. K. Deb. IEEE Transactions on Power Delivery, Vol. 3, No. 2, April 1988, pages 789–800.

"Higher service current in overhead lines," by A. K. Deb, S. N. Singh, T. K. Ghoshal, CIGRE Brussels Symposium on High Currents in Electric Network under Normal and Emergency Conditions, June 1985, Brussels, Belgium.

"Dynamic line rating in the operating environment," by Stephen D. Foss, Robert A. Maraio (IEEE Transmission and Distribution Conference paper # 89 TD 431–8 PWRD 1989).

In LINEAMPS the periodic cyclical pattern of wind speed and ambient temperature are considered in a unique manner to forecast power line ampacity. Weather patterns of a region are stored by Fourier series in each weather station object. A method in each of the weather station objects generates hourly values of meteorological data from this series. The power line object have plurality of virtual weather sites that receive their data from plurality of weather station objects and a method in each power line object determines the minimum hourly values of line ampacity up to seven days in advance. The number of virtual weather stations that can be accommodated in a power line is limited only by the computer processing speed and memory whereas installing unlimited number of line temperature sensors is not economical. Due to these reasons LINEAMPS is unique and expected to be more reliable and more accurate than systems utilizing real time measurements from limited number of locations.

Dynamic line rating system

A real time dynamic line rating model was proposed in the following reference:

"Real-time ampacity model for overhead lines," by W. Z. Black, W. R. Byrd, IEEE transactions on power apparatus and systems, Vol. PAS-102, No. 7, July 1983.

In Black and Byrd's method, line ampacity is predicted accurately by real time numerical solution of conductor temperature differential equation at a location. The system requires real time conductor temperature and meteorological data on a continuous basis and does not have weather models to forecast line ampacity up to seven days in advance. LINEAMPS is an integrated line ampacity having weather models to forecast line ampacity up to seven days in advance. LINEAMPS has provision for steady state ratings, dynamic line ratings, and transient ratings that are based upon user input and a direct solutions of the conductor temperature differential equation is used to obtain dynamic line ratings.

U.S. Pat. No. 5,140,257

U.S. Pat. No. 5,140,257 was issued to M. Davis for a transmission line rating system that calculates the current carrying capacity of one or more power lines by the measurement of conductor temperature and meteorological conditions on the line. Line ampacity is calculated by the solution of conductor heat balance equation. Davis's system requires the installation of conductor temperature sensors as well as meteorological sensors at several locations along power lines. Real time conductor temperature, meteorological data and line current are continuous input to a computer system where line ampacity is calculated. The computer system requires specialized hardware and software for data acquisition from remote sensor locations via special telecommunication networks. Because of these requirements the system could not be applied or commercialized in a wide scale. LINEAMPS does not require real time continuous input of meteorological data, line current or conductor temperature measurements from the power line. Power line and conductor ampacity is estimated by LINEAMPS from user input and by synthetic generation of weather data from self generating weather stations objects in the program.

Synthetic generation of weather data

An important contribution of this invention is the ability to self generate hourly values of weather data from statistical and analytical models eliminating the need for real time continuous input of data. Deb has previously developed algorithms for synthetic generation of weather data by time series analysis in the above mentioned references. The idea of self generation, synthetic generation, or artificial generation of meteorological data by Fourier series of ambient temperature and wind speed of a region has evolved from these developments.

OBJECT AND ADVANTAGE OF LINEAMPS

Object of Invention

The object of the LINEAMPS invention is to provide a complete system of rating overhead power lines with expert system capability that is simple to use and suitable for steady state, dynamic and transient conditions that also provides hourly values of power line ampacity up to seven days in advance without requiring continuous input of real time measurements. The integrated line ampacity system comprise of power line and conductor databases that are modeled as objects in the program. In addition, there are weather station objects which receive user input of forecast weather data and have methods to generate hourly values of weather data. Power line, conductor and weather station objects are created by the user. These features make the program useful for the operation, planning and design of power lines at all voltages in all geographic regions.

The system is realized economically because it does not require real time meteorological data, conductor temperature measurements, conductor sag, conductor tension or any other real time data from external devices or systems on a continuous basis. The program generates its own weather data by using key weather information from general purpose National Weather Service forecast that are input by the user. From these data and previously stored weather patterns of the region present and future line ratings are calculated by program. It is not the objective of the program to provide line ratings with great precision at any given point of the line because it recognizes the fact that power lines traverse variable meteorological conditions and terrain. The program estimates line ratings based on user input that are applicable to the entire length of the line with minimum risk of exceeding allowable maximum conductor temperatures.

Another object of the present invention is to provide an expert line rating system by object oriented modeling and expert rules of the power line environment to enable greater user facility and for wider application in any region of world. Results are also stored in object databases for future analysis and display. Expert knowledge pertaining to power line ampacity during different operating conditions, conductor properties and weather conditions are written as rules in the program. Rules enable to check user input data, if data is incorrect or inconsistent messages are posted on the screen to indicate the type of problem. Detailed explanation of rule generated messages are provided by the explanation and advice facility. Rules may be easily modified and expanded as new rules are learnt about specific utility systems.

In the following reference:

"Economic evaluation of dynamic thermal rating by adaptive forecasting," by J. F. Hall and A. K. Deb, IEEE Transactions on Power Delivery, Vol. 3, No. 4, October 1988, pages 2048–2055, Deb has carried out a cost benefit analysis of the line ampacity system to demonstrate power system operational and capital cost savings by economical energy transfer and by the deferment of capital investment required to construct new lines. The program is also beneficial to the environment as fewer lines are required.

Principal Advantages of Invention

The principal advantages of the invention are summarized as follows:

Integrated power line ampacity system suitable for steady state, dynamic state and transients in all geographic regions and all voltage levels.

Uses object oriented modeling and expert rules of the power line environment which results in more efficient code, greater user facility, expert system capability, easy to operate, easy to maintain, expand and upgrade.

Unlimited number of virtual weather sites may be created by the user for greater accuracy in ampacity predictions.

Provides present and future line ampacity up to seven days in advance by synthetic generation of weather data.

Reduction in mathematical complexity for hourly ampacity predictions, as fewer calculations are performed in real time.

Provides automatic mapping of transmission line and ambient temperature in a cartogram.

Provides user configurable power line objects.

Provides user configurable conductor objects.

Provides user configurable weather station objects.

Does not require real time meteorological data, conductor temperature or line current data and runs in a standard PC. Therefore it is less expensive and easy to maintain.

Cost saving by economic energy transfer and deferment of capital investment required to construct new lines.

The features and advantages of the LINEAMPS program shall become apparent from the following detailed description of the invention and the accompanying figures.

SUMMARY OF THE INVENTION

Integrated Line Ampacity System

LINEAMPS is an integrated line ampacity system software implemented in a IBM PC Windows operating system that provides power line ampacity in the steady state, dynamic state and transient conditions. Power lines, weather stations and conductors are objects in the program that are created by the user. The system also provides hourly values of line ampacity up to seven days in advance. The program has been developed by object oriented modeling and expert rules of the power line environment which provides an alternative method of obtaining line ampacity without requiring continuous input of real time data from external device or systems. Line ampacity is predicted by the solution of conductor temperature differential equations and by using synthetic generation of meteorological data from weather objects in the program. By eliminating the need for continuous input of real time data from external devices or systems an economical power line ampacity system is realized for easy implementation in any geographic region.

Expert System and Object Oriented Model

The program uses object orientation and expert system technology which provides greater facility to users. Power lines, weather stations and the different types of conductors are objects in the program that are created by the user. The program is written in the Kappa-PC programming language. Objects are represented graphically in the Kappa-PC object oriented development environment which makes the task of interpretation and examination of data intuitive and simple. Expert rules of power line ampacity provide user facility by checking user input, giving explanation of rule generated messages.

Line Ampacity by Self Generation of Meteorological Data

In my LINEAMPS wind speed and ambient temperature patterns of a given geographic region are stored in the weather station objects of the program. These patterns are obtained by analysis of historical weather data of the region by fitting Fourier series using Fast Fourier Transformation (FFT) and by least square analysis. Key weather variables comprising of ambient temperature, wind speed and sky condition forecast by the National Weather Service (NWS) are input by the user and the program generates hourly values of required meteorological data from the weather station objects by fitting the Fourier series patterns to NWS data. Weather station objects from several locations along the power line send messages of hourly values of self generated weather data to plurality of virtual sites located along the route of the power line object. Meteorological data received at the virtual sites are further adjusted at each virtual site depending upon the specific conditions of the terrain. A method in the power line object then determines minimum hourly values of line ampacity up to seven days in advance from the ampacities calculated at each virtual site. Hourly values of forecast line ampacity are stored in the power line object for future analysis and are displayed in the LINEAMPS: Ampacity Forecast session window.

BRIEF DESCRIPTION OF DRAWINGS

FIG. 1 shows LINEAMPS Control Panel and Welcome window.

FIG. 2 shows icons in the LINEAMPS Control Panel window

FIG. 3-(A, B, C, D, E, F), describe the steady state session window and its various parts.

FIG. 4-A, FIG. 4-B, FIG. 4-C, FIG. 4-D, describe the dynamic analysis window and its various parts.

FIG. 5-A, FIG. 5-B, FIG. 5-C describe the transient analysis window and its various parts.

FIG. 6-A, FIG. 6-B, FIG. 6-C, FIG. 6-D, FIG. 6-E, describe the ampacity forecast session window and its various parts.

FIG. 7-A, FIG. 7-B, shows daily weather data input window and its part.

FIG. 8 shows the extended weather data input window.

FIG. 9 shows the weather stations object model.

FIG. 10 is the cartogram window.

FIG. 11 shows the ambient temperature modeling window.

FIG. 12 shows the wind speed modeling window.

FIG. 13 is the lines window.

FIG. 14 is the make new line window

FIG. 15 is the new line conductor window.

FIG. 16 is the new line site data window.

FIG. 17 is the see line data window.

FIG. 18 is the delete lines window.

FIG. 19 shows the conductor window.

FIG. 20 is the energy delivery cost window.

FIG. 21 shows the on-line help window.

FIG. 22 shows the object model of the line ampacity system.

FIG. 23 shows main objects and data flow diagram of LINEAMPS.

FIG. 24 show object and data flow in steady state analysis.

FIG. 25 is a flowchart of steady state current.

FIG. 26 is flowchart of CalcSteadyCurrent method.

FIG. 27 is a flowchart of steady state conductor temperature.

FIG. 28 is a flowchart of CalcSteadyTemperature method.

FIG. 29 is object and data flow diagram of dynamic analysis.

FIG. 30 is a dynamic analysis flowchart.

FIG. 31 is a flowchart of dynamic ampacity method.

FIG. 32 is object and data flow diagram of transient analysis.

FIG. 33 is a flowchart of the transient ampacity method.

FIG. 34 is object and data flow diagram of the ampacity forecast session.

FIG. 35 is a flowchart of ambient temperature generator method.

FIG. 36 is a flowchart of the wind speed generator method.

FIG. 37 is a flowchart of the solar radiation generator method.

FIG. 38 is a flowchart of pattern selection method.

FIG. 39 is a flowchart to select new line conductor.

FIG. 40 shows multiple session windows.

FIG. 41 is an illustration of a power line, associated weather stations and virtual sites.

DETAILED DESCRIPTION OF THE INVENTION

Overview

In this section first a detailed description of the structure of the invention is provided followed by a description of the operation of the system. The structure of the program describe how the principal functions of the invention are realized by object oriented modeling and expert rules of the power line environment. The detailed description of operations explain how these functions are achieved by the user.

Principal Functions

The principal functions of the invention comprise:

(a) Steady state analysis of power line conductor (b) Dynamic state analysis of power line conductor (c) Transient state analysis of power line conductor (d) Forecasting ampacity of power line conductor The graphical user interface of the program in the PC Windows environment provides the means to receive user input and presentation of results in independent session windows for the realization of the functions (a),(b),(c),(d). These functions are realized within the objects of the program by the solution of the conductor temperature differential equations. The algorithms are given in the detailed description of operation. Function (d) is also realized by weather modeling given in the flowcharts of FIG. 37 to FIG. 38 and algorithms presented in the detailed description of operation.

Program Structure

Computer System Configuration

The minimum configuration of the computer system comprise:

IBM-PC compatible 386 system (or better) with math coprocessor

4 MB RAM

80 MB hard disc

VGA color monitor

Operating System: MS Windows

Components of the Program

The program comprise a system of objects shown in the FIG. 22. In addition to objects, the program also comprise a system of rules where expert knowledge pertaining to power line ampacity are defined by rules and goal. Examples of rules are given in the detailed description of operations. The program also comprise functions that perform specific tasks of the program. These functions are used with methods in the objects and by the rules of the expert system. The Kappa-PC programming environment was used to model objects that comprise data and methods, rules, goals and functions.

Even though this program is presently implemented in a PC in the Windows environment, LINEAMPS may be easily implemented by those skilled in this art in any computer system under any operating system. Moreover, other object oriented and expert system programming languages may be used to implement the specifications of this invention. Therefore patent protection is desired for all computer based implementations of this invention.

Objects

From the object model of the line ampacity FIG. 22, it is seen that objects have class, subclass and instances. For example, the power line object class 600 comprise Transmission 602 and Distribution subclasses 604, voltage subclasses 606 and line instances 608. Objects contain data and methods. Data are stored in slots and methods contain a set of instructions to perform a specific task of the program. LINEAMPS comprise the following system of objects shown in the FIG. 22:

Power line objects, Lines 600.

Weather station objects, Weather 626.

Conductor objects, Conductor 610.

Expert System 620.

Session window objects, KWindow 638.

Menu objects, Menu 642.

Image objects, Image 640 comprise: buttons, list box, edit image, radio buttons, drawing image, bitmap image, combo box, slider image, line plot image and transcript images.

The functions and features of the objects are described below.

Line Object

The Line object class 600 is shown in the FIG. 22. The Line object class is divided into subclasses of line voltages defined by the user. Example: Transmission, 500 kV, 345 kV, 230 kV, Distribution, 15 kV, 480V and line instances created by the user. The line object has data and methods pertaining to the overhead line that are necessary for the evaluation of power line ampacity. Data are stored in slots and methods perform the action of evaluating ampacity. Following is a list of slots in the line object:

Line Object Slots:
LineName
LineVoltage
LineLength
ConductorCodeName
ConductorType
ConductorDiameter
ConductorArea
ConductorAlpha
ResistanceAtTemperature
ConductorDC Resistance
ConductorEmissivity
ConductorAbsorbtivity
ConductorSpecificHeat
ConductorMass
ConductorAluminumMass
ConductorSteelMass
NumberOfSites
SiteList (List)
AssociatedWeatherSites(List)
Site#x(List), where x=1,2 . . . NumberOfSites
AmbientTemperatureSite#x(List)
WindSpeedSite#x(List)
WindDirectionSite#x(List)
SkyConditionSite#x(List)
NormalAmpacityOneDay(List)
NormalAmpacitySevenDays(List)
EmergencyAmpacityOneDay(List)
EmergencyAmpacitySevenDays(List)
TimeOfDayEnergyPrice(List)

Each Site#x comprise the following list of values: elevation, slope, latitude, longitude, standard longitude, line orientation at the location and terrain.

Line object comprise the following methods:

| Method: | Function: |
| --- | --- |
| Amp7Days | Calculates hourly values of line ampacity up to seven days in advance. |
| SteadyStateCurrent | Calculates steady state current. |
| SteadyStateTemperature | Calculates steady state temperature. |
| DynamicAmpacity | Calculates conductor temperature response due to step change in line current. |
| TransientAmpacity | Calculates conductor temperature response due to short circuit and lightning current. |
| DrawSelf | Draws the line in the cartogram window. |
| CheckInput | Verifies the correctness of input data. |
| WeatherData | Obtains data from the associated weather stations. |
| AdjustWeather | Weather data is adjusted in AmbientTemperatureSite#x slot and WindSpeedSite#x slot based on terrain in Site#x slot. |
| MakeNewLine | Makes an instance of a new line. |
| UpdateLineList | Updates the list of lines when a new line is created. |
| MakeSiteData | Makes virtual weather sites along the route of the line. |
| EnergyDeliveryCost | Calculates hourly values of energy delivery cost based on time of day energy price and forecast ampacity. |

Weather Object

The weather object is seen in the FIG. 22. It is comprised of Stations subclass 628 and WeatherModel subclass 630. A detailed view of the weather stations object is shown in FIG. 9. Weather stations object is comprised of subclasses of regions, region types and instances of weather stations. Instances of weather stations belong to region type subclass. Instances of wind, sun and ambient model belong to the subclass of weather model. Station objects have meteorological data and geographic information required to calculate transmission line ampacity. The weather station object hierarchy is shown in FIG. 9 and comprised of:

i) Sub Class of regions. Example: Region1, Region2 . . . Region#x. Region1 6282 is an example of a region.

ii) Sub Class of region types. Example: Coastal, Interior, Mountain, Desert. Coastall 6284 is an example of a region type iii) Instances of weather stations. Example: San Francisco, Oakland, Livermore . . . San Francisco 6286 is an example of an instance of a weather station.

Weather station objects have the following slots.
Weather station object slots
StationName
AmbientMax(List)
AmbientMin(List)
HourAmbientMax
HourAmbientMin
AmbientPattern#x(List), where x=1,2 . . . 12 months
WindSpeedMax(List)
WindSpeedMin(List)
HourWindSpeedMax
HourWindSpeedMin
WindSpeedPattern#x(List), where x=1,2 . . . 12 months
WindDirection(List)
SkyCondition(List)
ForecastTemperature(List)
ForecastWind(List)
ForecastSolarRadiation(List)
Latitude Longitude The parameter List inside parentheses is used to indicate that the slot has a list of values. Weather station object comprise the following methods:

| Method | Function |
| --- | --- |
| AmbientGen | Generates hourly values of ambient temperature, FIG. 35 |
| WindGen | Generates hourly values of wind speed, FIG. 36 |
| SolarGen | Generates hourly values of solar radiation, FIG. 37 |
| SelectPattern | Selects ambient temperature and wind speed pattern of the month, FIG. 38. |
| DisplayAmbient | Display ambient temperature in a line plot 262 and a transcript image 254, FIG. 11. |
| DisplayWind | Display wind speed in a line plot 276 and a transcript image 268, FIG. 12. |
| OnLineData | Reads weather data downloaded from America-On-Line. |
| MakeNewStation | Makes an instance of a new weather station. |

Conductor Object

The conductor object class is shown in FIG. 22 and comprise a subclass CData 614, which has the following sub classes of conductor types 616: aaac, aac, acar, acsr, acsr_aw, cu, ssac. Each of the conductor types have plurality of conductor instances 618. The conductor class has another subclass CModel 612 and comprise the following instances 613: Steady, Dynamic Transient. Other subclasses of conductor types 616 may be created by the user. The conductor subclass CData comprise the following data:

CData Slots:
Conductor code name
Conductor type
Conductor diameter
Conductor area
DC resistance of conductor
Emissivity of conductor
Absorptivity of conductor
Specific heat of conductor
Conductor mass
Aluminum mass
Steel mass The conductor subclass comprise the following methods:

| CData Methods: | Function |
| --- | --- |
| SpecificHeat | Calculates the specific heat of conductor |
| SteadyStateCurrent | Calculates steady state current |
| SteadyStateTemperature | Calculates steady state temperature |
| DynamicAmpacity | Calculates conductor temperature versus time in the dynamic state. |
| TransientAmpacity | Calculates conductor temperature versus time in the transient state. |
| MakeNewConductor | Makes an instance of a new conductor |

CModel Object

The CModel object is a subclass of conductor class and comprise the following instances 613:
 i) Steady
 ii) Dynamic
 iii) Transient These instances receive user input data from their respective session windows to carry out ampacity evaluations.

The Steady instance comprise the following slots:
Ambient temperature
Wind speed
Wind direction
Conductor temperature
Conductor current
Sky condition
LineName
Conductor type
Conductor code
Conductor diameter
DC resistance
Emissivity
Absorbtivity
Latitude
Longitude The above slots receive their values from the steady state session window FIG. 3-A.

Figure 4:
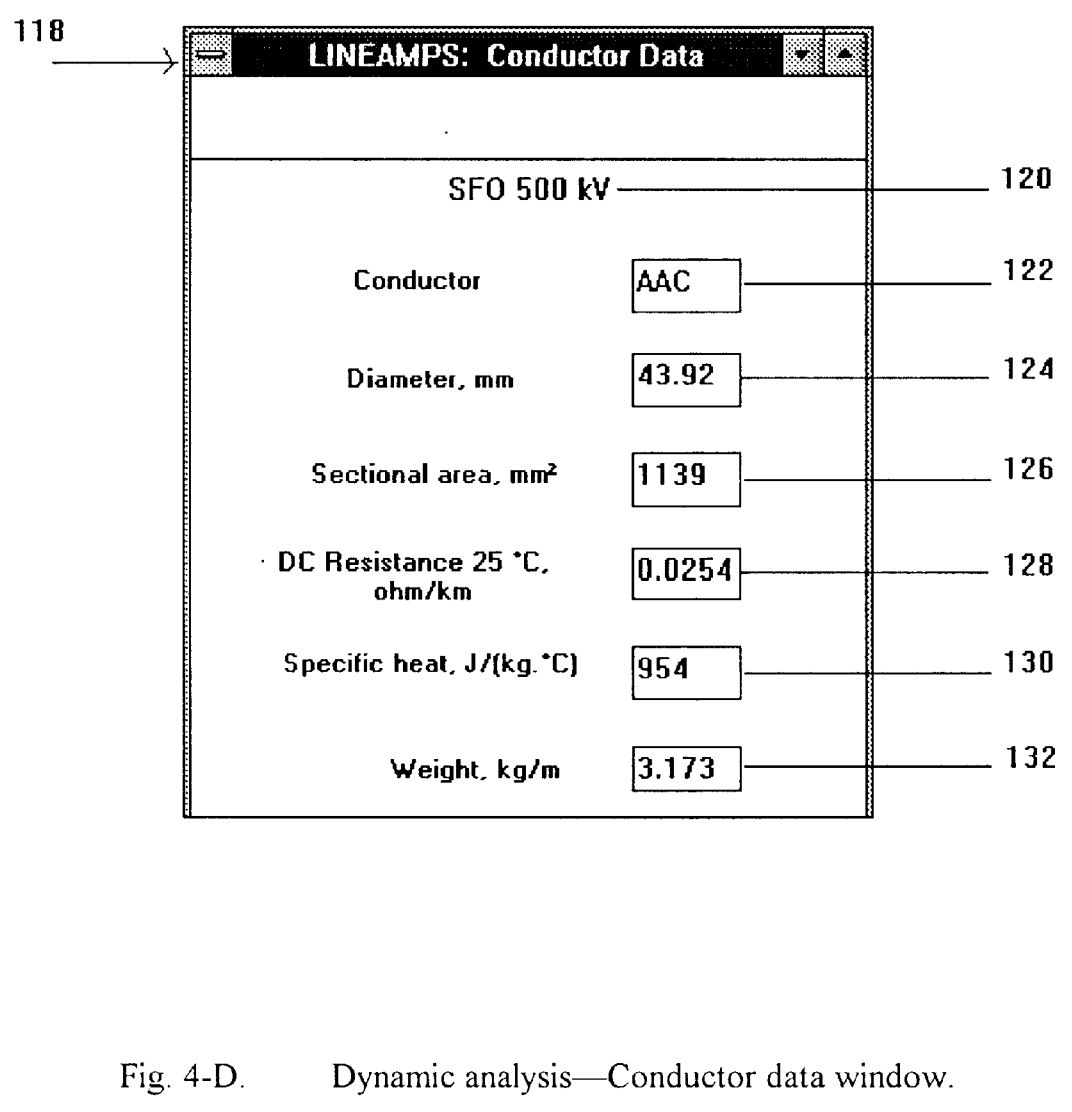

The Dynamic instance of conductor class comprise the following slots:
Ambient temperature
Wind speed
Wind direction
Sky condition
Preload current
Overload current
Post overload current
Conductor temperature
LineName
Conductor type
Conductor code
Conductor diameter
DC resistance
Specific heat
Conductor weight
Emissivity
Absorptivity
Latitude
Longitude The above slots receive their values from the dynamic state session window FIG. 4-A.

The transient instance of conductor subclass CModel comprise the following slots:
Ambient temperature
Wind speed
Wind direction
Sky condition
Pre-Fault current
Fault current
Fault duration
LineName
Conductor type
Conductor code
Conductor diameter
DC resistance
Specific heat
Conductor weight
Emissivity Absorptivity
Latitude
Longitude The above slots receive their values from the transient state session window FIG. 5-A.

CModel Methods:

| Method | Function |
| --- | --- |
| UpdateLineCode | Updates the value of the slot LineCode |
| UpdateConductorData | Obtains data from conductor database |
| UpdateLineData | Obtains data from line database |
| CalcSteadyCurrent | Calculates steady state current given conductor temperature |
| CalcSteadyTemperature | Calculates steady state temperature given conductor current |
| DynamicAmpacity | Calculate conductor temperature response versus time during heating and cooling in the dynamic state. |
| TransientAmpacity | Calculate conductor temperature response versus time during heating and cooling in the transient state. |
| UpdateDataImage | Changes conductor text to line or conductor |

Session Window Objects

Session window objects provide the means to interface with the user, to receive user input and for the presentation of results. Each function of the program is carried out in independent session windows. Multiple windows can exist on the screen at the same time as seen in the FIG. 40 so that result from one session window can be easily transferred to another session window. The program comprise the following session windows.

1. Welcome window, FIG. 1.
2. LINEAMPS icon window, FIG. 2.
3. Steady state analysis window, FIG. 3-A.
4. Dynamic analysis window, FIG. 4-A.
5. Transient analysis window, FIG. 5-A.
6. Forecast ampacity window, FIG. 6-A.
7. Daily weather forecast data input window, FIG. 7-A.
8. Extended weather forecast data input window FIG. 8.
9. Cartogram window FIG. 10.
10. Ambient temperature modeling window, FIG. 11.
11. Wind speed modeling window, FIG. 12.
12. Lines window, FIG. 13.
13. Make new line window, FIG. 14.
14. New line conductor window, FIG. 15.
15. New line site data window, FIG. 16.
16. See line site data window, FIG. 17.
17. Delete lines window, FIG. 18.
18. Conductor window, FIG. 19.
19. Energy delivery cost window, FIG. 20.
20. On-line Help window, FIG. 21.

The above mentioned plurality of session windows take full advantage of the MS Windows operating system. Like any windows application LINEAMPS windows are scrollable, resizable, may be minimized into an icon or maximized for full display and may be put in the background for future recall. Thus a unique system of evaluating power line ampacity has been created to receive user input, to display result and for the efficient manipulation of data from one session window to another. The features and functions of each of the above mentioned session window objects are described later on in the description of operations.

Menu Objects

The Menu Class comprise the following subclasses: MenuForecastAmpacity, MenuSteady, MenuDynamic, MenuTransient.

Forecast Ampacity Menu

The forecast ampacity session window comprise the following system of menus and sub-menus:

| Menu | Sub-Menu |
| --- | --- |
| Database | Lines, Conductor |
| Analysis | SteadyState, Dynamic, Transient |
| Show_Weather | ShowTemperature, ShowWind Speed, DailyWeatherForecast ExtendedWeatherForecast, OnLineWeather, ShowCartogram MakeNewStation |
| Help | On_LineManual |
| Exit | Close LINEAMPS |

Steady State Analysis Window Menus

The steady state analysis session window menu bar comprise following main menus and sub-menus.

| Main Menu | Sub-Menus |
| --- | --- |
| ConductorData | ConductorDatabase, LineDatabase |

Dynamic State Session Window Menus

The dynamic state analysis session window menu bar comprise following main menus and sub-menus.

| Main Menu | Sub-Menus |
| --- | --- |
| Data | ConductorDatabase, LineDatabase |

Expert System Object

The expert system class 620 has two instances, explanation 622 and advice 624 as shown in the object model FIG. 22. The expert system object serves as a blackboard where the rules can write data to a slot. When a rule fires the problem is written to a slot in this object. The explanation and advice objects have methods which are activated by rules to display messages on the screen to the user.

Expert System Rules

The expert system knowledge base is comprised of the above mentioned system of objects and the following rules. Rules provide expert advice to users in the event of erroneous or conflicting data, or to caution the user under specific operating conditions.

Rule 1. If ambient temperature is greater than conductor temperature then advise user.

Rule 2. If the temperature of the selected conductor is greater than the allowable maximum for the conductor type then advice user.

Rule 3. If user input is low 2 or 4 ft/s wind speed and National Weather Service Forecast is high wind speed then advice user.

Rule 4. In the dynamic state if pre-load current result in higher than maximum allowable conductor temperature then advice user.

Rule 5. In the dynamic state if post overload current result in higher than maximum allowable conductor temperature then advice user.

Rule 6. In the dynamic state if the user specified pre-load current result in conductor temperature that is higher than the allowable maximum then advice user.

Rule 7. In the transient state if the duration of transient current is greater than the specified maximum then advice user.

Rule 8. If the age of the conductor is old and the conductor temperature is high then advice user.

Rule 9. If the age of the conductor is old or line passes through areas of industrial pollution and the coefficient of solar absorbtivity is low and/or emissivity of the conductor is high then advice user.

Rule 10. In the transient state if the transient current is high and the line is old then advice user.

Rule 11. If the line passes through urban areas with high rise buildings or where wind flow is restricted by tall structures or trees and line ampacity is high then advice user.

Rule 12. If the value of conductor emissivity is less than or equal to 0 or greater than 1 then advice user.

Rule 13. If the value of conductor absorbtivity is less than or equal to 0 or greater than 1 then advice user.

Examples of LINEAMPS Rules implemented in the Kappa-PC language is shown hereunder.

LINEAMPS RULES

```
/*************************************************/
/**      EXAMPLE OF RULES        **/
/*************************************************/
    /***********************************
    **** RULE: ConductorRule1
    **** If conductor temperature is greater than the allowed maximum
    ****   for the conductor type then the value of current should be
    ****   lowered.
    *********************************/
MakeRule( ConductorRule1, [],
    Steady:ConductorTemperature>
SelectedConductor:ConductorType:MaxTemperature,
    {
    PostMessage( "The selected conductor type is ", SelectedConductor:ConductorType,
     ".
The recommended maximum temperature of this type of conductor is",
        SelectedConductor:ConductorType:MaxTemperature, "° C.");
    SetValue( ExpertSystem:Problem, HighConductorTemperature);
    });
SetRuleComment( ConductorRule1, "If conductor temperature is greater than the allowed
maximum for the conductor type then the value of current should be lowered.");
    /***********************************
    **** RULE: InputData
    **** If the value of SelectedLine:Input data is equal to error
    **** then input data must be checked. The error may be due to
    **** the value of SelectedLine:InputTaData is too high.
    ****
    *********************************/
MakeRule( InputData, [],
    SelectedLine:InputData #=Error,
    SelectedLine:Status = Check);
SetRuleComment( InputData, "If the value of SelectedLine:Input data is equal to error
then input data must be checked. The error may be due to
the value of SeledtedLine:InputTaData is too high.
");
    /***********************************
    **** RULE: TemperatureHigh
    **** If the value of ambient temperature is greater than the allowable
    **** maximum value of conductor temperature then the input
    **** value of ambient temperature is too high.
    *********************************/
MakeRule( TemperatureHigh, [],
    SelectedLine:TaHiC>=SelectedLine:LineNumber:Tmax,
    SelectedLine:InputTaData = High);
SetRuleComment( TemperatureHigh, "If the value of ambient temperature is greater than
the allowable maximum value of conductor temperature then the input
value of ambient temperature is too high.");
    /***********************************
    **** RULE: InputTaData
    **** If ambient temperature is high then there is error in the data.
    *********************************/
Make Rule( InputTaData, [],
    SelectedLine:InputTaData #=High,
    SelectedLine:InputData = Error);
SetRuleComment( InputTaData, "If ambient temperature is high then there is error in the
data.");
    /***********************************
    **** RULE: SteadyStateCurrent
    **** Conductor temperature must be higher than ambient
```

```
       **** temperature.
       ***********************************/
MakeRule( SteadyStateCurrent, [],
   ExpertSystem:SessionName #= SteadyState And ExpertSystem:SessionFunction
      #= CalculateCurrent And Steady:ConductorTemperature <
      Steady:AmbientTemperature,
   {
   ExpertSystem:Problem = Temperature;
   PostMessage( "Check temperature");
   });
SetRuleComment( SteadyStateCurrent, "Conductor temperature must be higher than
ambient temperature.");
       /**********************************
       **** RULE: SteadyStateTemperature
       **** To avoid numerical stability problems LINEAMPS requires
       **** positive conductor current.
       ***********************************/
MakeRule( SteadyStateTemperature, [],
   Expert System:SessionName #=SteadyState And ExpertSystem: SessionFunction
      #=CalculateTemperature And Steady:ConductorCurrent <
      0,
   {
   ExpertSystem:Problem = NegativeCurrent;
   PostMessage("Check current");
   });
SetRuleComment( SteadyStateTemperature, "To avoid numerical stability problems
LINEAMPS requires
positive conductor current.");
       /**********************************
       **** RULE: SteadyStateWindSpeed
       **** Only positive values of Wind Speed are acceptable.
       ***********************************/
MakeRule( SteadyStateWindSpeed, [],
   Steady:WindSpeed <0,
   ExpertSystem:Problem = NegativeWindSpeed);
SetRuleComment( SteadyStateWindSpeed, "Only positive values of Wind Speed are
acceptable."
       /**********************************
       **** RULE: SteadyStateWindDirection
       **** The acceptable range of Wind Direction data is between
       **** 0 and 360 degree. Only positive values in this range are
       **** considered.
       ***********************************/
MakeRule( SteadyStateWindDirection, [],
   Steady:WindDirection < 0 Or Steady:WindDirection > 360,
   ExpertSystem:Problem = InvalidWindDirection);
SetRuleComment( SteadyStateWindDirection, "The acceptable range of Wind Direction
data is between 0 and 360 degree. Only positive values in this range are
considered.");
       /**********************************
       **** RULE: RuleAbsorbtivity
       **** The absorbtivity of the conductor must be in the range of
       **** 0 and 1. Only positive values in this range are accepted.
       ***********************************/
MakeRule( RuleAbsorbtivity, [],
   Steady:SunAbsorb <0 Or Steady:SunAbsorb > 1,
   ExpertSystem:Problem = InvalidAbsorbtivity);
SetRuleComment( RuleAbsorbtivity, "The absorbtivity of the conductor must be in the
range of
0 and 1: Only positive values in this range are accepted.");
       /**********************************
       **** RULE: RuleEmissivity
       **** The Emissivity of the conductor must be in the range of
       **** 0 and 1. Only positive values in this range are accepted.
       ***********************************/
MakeRule( RuleEmissivity, [],
   Steady:Emissivity <0 Or Steady:Emissivity > 1,
   ExpertSystem:Problem = InvalidEmissivity);
SetRuleComment( RuleEmissivity, "The Emissivity of the conductor must be in the range
of 0 and 1. Only positive values in this range are accepted.");
```

Description of Operations

Overview

The program is operated through the graphical user interface offered by the Windows environment. User interaction with the program is carried out by a system of windows called Sessions in the Kappa-PC environment. Each session is designed to accomplish a specific function of the program. Sessions windows are designed to facilitate interaction with the user, to receive input, and for the presentation of result using graphics, numeric data, and descriptive text. Since ampacity evaluations are carried out in multiple session windows, results from one session can be easily utilized in another session. Detailed description of operation within each session window are given below.

Steady State Analysis Session

User action in the steady state analysis window

The steady state analysis session window is shown in the FIG. 3-(A through F). The window is opened by clicking the steady state icon 1 of FIG. 2 in the LINEAMPS Control Panel window 20, or by clicking on the Steady State Analysis button 30 in the Welcome window 22. Steady state analysis may be performed on a line or a conductor. A conductor is selected first by selecting a conductor type from the list box 62 which opens a list box 64 of conductors. Select a conductor from the list box 62 and the data of the selected conductor appears in the Conductor Data enclosure 60 of FIG. 3-A. If steady state analysis is required for a line, the conductor data of that line is obtained by selecting the line from the Select Line list box 58 and conductor data appears inside the Line Data enclosure 61 shown in the FIG. 3-D.

In the Operation Data enclosure 56 of FIG. 3-B, enter the value of ambient temperature in the edit image 66, wind speed in the edit image 68, wind direction in the edit image 70, conductor temperature in the edit image 72, and conductor current in the edit image 74. To evaluate conductor current, enter a value of conductor temperature in the edit image 72, and click the Current button 48. The value of current appears in a message window, and the edit image 74 is also updated. To evaluate conductor temperature, click the Temperature button 50, and the value of conductor temperature appears in the edit image 72. Output data is also displayed by a brief text message and by a numeric value in a LINEAMPS message box.. If there are errors in the input data or data is inconsistent a message is displayed to the user. Explanation of message may be obtained by clicking the Explain button 52.

Program Operation in Steady State

The following steps explain the operation of the program in steady state analysis.

A. Select and view line data:
1. Select a line from the select line list box 58, FIG. 3A.
2. The name of the selected line becomes the value of a slot Steady:LineName where LineName is a slot in the Steady instance 613, FIG. 22.
3. An after change monitor UpdateLineCode in the slot Steady:LineName sets a new value to a slot LineCode by finding the line object corresponding to the selected line.
4. The after change monitor UpdateLineData associated with the slot Steady:LineCode sets the value of all the conductor data from the selected line. After receiving data it sends a message to an UpdateDataImage method in the Steady instance.
5. In the UpdateDataImage method a text image title 60 is changed to Line Data and conductor data of the selected line appears in the edit images, 76, 78, 80, 82, 84, 86, 88, FIG. 3C.

B. Select and view conductor data:
1. Select a conductor from a Select Conductor Type list box 62, FIG. 3A.
2. The selected conductor type becomes the value of a slot SelectedConductorType in a instance ConductorTypes of a class SingleListBox in the image class 640, FIG. 22.
3. An after change monitor ShowConductorListBox of the slot SelectedConductorType then shows a conductor list box list box image 64, FIG. 3A.
4. Select a conductor from the conductor list box 64. The code name of the conductor becomes the value of a slot Steady:ConductorCode 613, FIG. 22.
5. An after change monitor UpdateConductorData of the slot ConductorCode sets the value of the conductor data slots from the selected conductor object data slots. After entering new values of conductor data in the steady state object it sends a message to the method UpdateDataImage and a message to UpdateConductorData.
6. The UpdateData Image method changes the text image title 60 to Conductor Data and the selected conductor data appears in the edit images, 76, 78, 80, 82, 84, 86, 88, FIG. 3C.

C. Select solar radiation data:
1. The selected value of the solar radiation radio button group 54 becomes the value of a slot Steady:SkyCondition in the object 613, FIG. 22.

D. Calculate current:
1. Click the Current button image 48, FIG. 3A. A button action function GenerateExpertStatus1 is activated. SteadyStateRules are verified and if there are no problems then a message is sent to the method CalcSteadyCurrent 746 described in the flowchart of FIG. 24, 25, 26.
2. In CalcSteadyCurrent method the value of current is obtained by declaring a Fortran Dynamic Link Library (DLL) and executing a Fortran function in the library. The value of the current returned by the Fortran function becomes the value of the ConductorCurrent slot in the Steady instance. A message is posted in the steady state analysis window with the value of conductor ampacity.

The steps carried out to calculate steady state current in the flowchart of FIG. 25 are as follows:
 (i) Users enter conductor and weather data in steady state window 46, FIG. 3A.
 (ii) Current button is clicked 48.
 (iii) Expert system object 620, FIG. 22 checks input data
 (iv) If there is input data error 621 FIG. 25, post error message 89 FIG. 3E. Click Explain button 52 FIG. 3A. Explanation is displayed 90 FIG. 3F. Else
 (v) Calculate current by steady state method 746, FIG. 25.
 (vi) Edit image 74 FIG. 3B is updated with the new value of current.
 (vii) Result is displayed in a message window 750 FIG. 25.

The steps in CalcSteadyCurrent method are shown in the flowchart of FIG. 26 as follows.
 (i) Receive data from steady state session window 7461.
 (ii) Calculate heat gain by solar radiation Psun 7462
 (iii) Calculate joule heat gain Pj 7463
 (iv) Calculate radiation heat loss Prad 7464
 (v) Calculate convection heat loss Pcon 7465
 (vi) Calculate ampacity I 7466.

Equations for steps (ii) to (vi) are given in Steady State Algorithm of this section.

E. Calculate temperature:
A flowchart for steady state temperature is given in FIG. 27.
1. Conductor and weather data is entered in steady state window 38, FIG. 3A.

2. Click temperature button image 50 which activates a function GenerateExpertStatus2.
3. Steady State Rules rules are verified 620, FIG. 22, 27.
4. If Steady State Rules detects a problem 622 an error message is posted on the screen 89 as shown in the FIG. 3-E.
5. Click Explain button 52.
6. Display explanation of error message 90 as seen in FIG. 3-F.
7. If no errors are detected then CalcSteadyTemperature method 740, FIG. 27 calculates temperature. In this method conductor temperature is calculated by declaring a Fortran DLL and by executing a Fortran function in the library. The steps in the Fortran function are described in the flowchart of FIG. 28.
8. ConductorTemperature slot in Steady instance is updated by the value of calculated conductor temperature and result appears by updating edit image 72, FIG. 3B.
9. Result is also displayed by posting a message on the steady state window with the value of conductor temperature 751, FIG. 27.
10. A function ExplainSteadyStateResult is then executed. The function fires a rule ConductorRule1 and posts a message with result: "If conductor temperature is greater than the maximum value allowed for the conductor type then post a message and display the allowed temperature".

Steps in CalcSteadyTemperature FIG. 28 are as follows:
(i) Receive data from steady state session window 7401
(ii) Assume initial conductor temperature equal to ambient temperature 7402
(iii) Calculate heat gain by solar radiation Psun 7462
(iv) Calculate joule heat gain Pj 7463
(v) Calculate radiation heat loss Prad 7464
(vi) Calculate convection heat loss Pcon 7465
(vii) Calculate error in heat balance equation 7403
(viii) If the absolute value of error is greater than 0.01 W/m then go to step (iv) and repeat 7405.
(ix) If the absolute value of error is less than or equal to 0.01 W/m then display temperature result 7406.

Objects and Data Flow Diagram in Steady State Analysis

When Steady State icon I in FIG. 2 is clicked it activates a function SteadyStateSession( ) 702 FIG. 24, that performs the action of opening the steady state window 38 FIG. 3A. Operation data 56 FIG. 3A is entered by user, Conductor data 60, and Sky Condition 54, is sent to the Steady State Object 613 FIG. 22 updating Steady State Object Slots 728 FIG. 24. From Steady State Object Slots data is sent to Lines 600 or Conductor Object 610 of FIG. 22 which is shown in item 742 of FIG. 24.

A transmission line is selected from the list box 58 shown in FIG. 3A, 24A which triggers an after change method 730 and updates conductor data 60 in steady state window 38.

A conductor type is selected from the list box 62 and after change method ShowConductorListBox 734 of slot Conductor Type opens the list box 64 having a set of conductor sizes of the selected type. When a conductor size is selected an after change method 736 updates conductor data in Steady State Window 38.

Current button 48 is clicked, data is checked by expert system (E/S) 738 and CalcSteadyCurrent method 746 calculates ampacity.

Temperature button 50 is clicked, data is checked by expert system (E/S) 746 and CalcSteadyTemperature method 740 calculates conductor temperature.

If there is any error message 89 (FIG. 3-E) click Explain button 52 for explanation 90.

The steady state ampacity algorithm is presented hereunder.

STEADY STATE ALGORITHM

Algorithm

During steady state condition the differential equation, $$S \cdot M_c \cdot c \cdot \frac{dT_c}{dt} = P_j + P_{sun} - P_{rad} - P_{con} \quad (1)$$

has, $$\frac{dT_c}{dt} = 0$$

which leads to the following steady state heat balance equation, $$P_j + P_{sun} = P_{rad} + P_{con} \quad (2)$$

where, $$P_j = I^2 R_{ac} = R_{dc} k_{ac} [1 + \alpha_o (T_c - T_0)] \quad (3)$$

and steady state ampacity I is obtained by, $$I = \sqrt{\frac{P_{sun} - P_{rad} - P_{con}}{R_{ac}}} \quad (4)$$

Description of Symbols

I=ampacity, A
$R_{ac}$=ac resistance of conductor, ohm/m
$R_{dc}$=dc resistance of conductor, ohm/m
$k_{ac}$=ac resistance multiplier
$a_0$=temperature coefficient of resistance,/°C.
$T_c$=conductor temperature, °C.
$T_o$=reference conductor temperature, °C.
$P_{sun}$=heat gains by solar radiation, W/m $$P_{sun} = \alpha_s D (S_b + S_d) \quad (5)$$

$a_s$=solar absorbtion coefficient of conductor
D=conductor diameter, m
$S_b$=beamed solar radiation, W/m$^2$
$S_d$=diffused solar radiation, W/m$^2$ $$S_b = S_{ext} \tau_b \cos(\theta) \quad (6)$$

$$S_d = S_{ext} \tau_d \cos(\theta) \quad (7)$$

$S_{ext}$=1353 W/m$^2$, normal component of the extra terrestrial solar radiation measured outside the earth's atmosphere.
$t_b$=atmospheric transmittance of beamed radiation
$t_d$=atmospheric transmittance of diffused radiation z=zenith angle
q=angle of beamed radiation with respect to conductor axis, degree
$P_{rad}$=heat loss by radiation, W/m $$P_{rad} = \sigma \epsilon \pi D \{(T_c+273)^4 - (T_a+273)^4\} \quad (8)$$

$T_a$=ambient temperature, °C.
s=5.67E-8, Stephan Boltzman constant, (W/m$^2$ K$^4$)
e=emissivity of conductor
$P_{con}$=heat loss by convection, W/m $$P_{con} = h \cdot \pi \cdot D(T_c - T_a) \quad (9)$$

h=coefficient of heat transfer from conductor surface to ambient air, W/(m$^{2 \cdot}$ °C.)

$$h = \lambda \cdot Nu \cdot k_{wd}/D \quad (10)$$

l=thermal conductivity of ambient air, W/(m$^x$ °C.)
Nu=Nusselt number, dimensionless $$Nu = 0.64 \, Re^{0.2} + 0.2 \, Re^{0.61} \quad (11)$$

Re=Reynolds number, dimensionless $$Re = D \cdot w_s/v_f \quad (12)$$

$w_s$=wind speed, m/s
$v_f$=kinematic viscosity of air, m$^2$/s
$k_{wd}$=wind direction correction factor $$k_{wd} = 1.194 - \sin(\omega) - 0.194 \cos(2\omega) + 0.364 \sin(2\omega) \quad (13)$$

w=wind direction with respect to conductor normal, degree

The above description of operation of the LINEAMPS program in the steady state clearly demonstrate that this invention has eliminated the need for automatic input of real time data from external devices or systems for power line ampacity evaluation in the steady state.

Dynamic Analysis Session

Dynamic analysis is carried out to calculate the temperature of a transmission line conductor due to a step change in current. Dynamic conditions arise when there is step change in line current due to line energization, sudden changes in load, and during line outages conditions when the load of the faulted line is transferred to the adjacent healthy line.

The dynamic analysis window and its various components are shown in FIG. 4(A–D). Object and data flow diagram in dynamic analysis is shown in FIG. 29, the dynamic analysis flowchart is shown in FIG. 30 and the dynamic ampacity method flowchart is shown in FIG. 31.

User action in dynamic window

The dynamic session window is opened by clicking dynamic state icon 2 in the LINEAMPS window 20 or by clicking Dynamic State Analysis button 32 in Welcome window 22.

Conductor data for dynamic analysis is obtained by selecting a line from the Select Line list box 106. The value of pre-load current is entered in the edit image 108, overload current in the edit image 110, post overload current in the edit image 112, and conductor temperature in the edit image 114 shown in Loading Data group 94. Conductor temperature response is displayed on the screen 102 by clicking on the Calculate button 116.

Meteorological data for dynamic analysis is obtained automatically from weather station objects for a particular time of day. Meteorological data may be also input by the user by selecting appropriate sky condition from the Solar Radiation group of radio buttons 96, by selecting air speed from the radio button group 98, by selecting wind direction by the radio button group 100, and by entering the value of ambient temperature 104.

Program operation in dynamic state

The following steps explain the operation of the program in dynamic session.

A. Open Dynamic Session Window

When dynamic analysis icon 2 is clicked an OpenDynamicWindow 802 function opens the dynamic session window 90.

B. Select and view line data:
1. Select a line by scrolling through the list of lines in the Select Line list box 106.
2. The name of the line becomes the value of the slot Dynamic:LineName 803 in the Dynamic object 6132.
3. The after change monitor 804 associated with the slot Dynamic:LineName sets a new value to slot Dynamic:LineCode 803 by finding the line object having the name of the selected line.
4. The after change monitor SelectedLineInputData 804 associated with the slot Dynamic:LineCode sets the value of all the conductor data for the selected line to the corresponding slots in the dynamic object.
5. Conductor data of the selected line can be viewed in the LINEAMPS: Conductor Data window 118 by selection from the Data menu 92.
6. Conductor data can be modified by entering new values in LINEAMPS: Conductor Data window 118.

C. Enter weather data:
1. Select sky condition by clicking radio button group 96. Selected value becomes the value of the slot SkyCondition 803 in the dynamic object 6132.
2. Select wind speed by clicking radio button group 98. Selected value becomes the value of the slot Wind Speed 803 in the dynamic object 6132.
3. Select wind Direction by clicking radio button group 100. Selected value becomes the value of the slot Wind Direction 803 in the dynamic object 6132.
4. Enter Ambient Temperature in the edit image 104 and the value of ambient temperature slot 803 is updated in the dynamic object 6132.

D. Enter load current data

Load current data comprising of Pre-load current 108, Overload current 110, Post overload current 112 and maximum conductor temperature 114 is entered by user in edit image group 94.

E. Calculate:
1. By clicking Calculate button 116 an action function CheckDynamicData( ) 806 calls expert system 620 to verify the correctness of the input data. If no problems are detected a message is sent to the DynamicAmpacity method 808. If there are problems an error message is posted on the screen.
2. DynamicAmpacity method is shown in FIG. 29–31. This method calls a Fortran DLL to calculate dynamic temperature response of the selected power line conductor for a period of 120 minutes. The steps in the DynamicAmpacity method are as follows, FIG. 31:
   (i) Receive data from Dynamic Analysis window 8081
   (ii) Calculate coefficient of heat transfer Xh 8082
   (iii) Calculate heating time constant Tauh (iv) Calculate A factor 8084
(v) Calculate conductor temperature due to heating Tch(i) at interval i 8085
(vi) Check if Tch(i) greater than or equal to maximum conductor temperature Tc(max)
(vii) If Tch(i) less than Tc(max) then increment time i 8086 and go to step (vi) Else:
(viii) Calculate coefficient of heat transfer due to cooling
(ix) Calculate cooling time constant Tauc 8089
(x) Calculate AA factor 8090
(xi) Calculate conductor temperature Tcc(i) 8091
(xii) Check if elapsed time greater than 120 min 8092
(xiii) If elapsed time less than 120 min increment time i go to step (xii), 8093
(xiv) If elapsed time greater than or equal to 120 min display dynamic ampacity result and update LinePlot image 102 of dynamic session window 90, 8094.

3. Minutely values of conductor temperature are stored in Dynamic:ConductorTemperature slot 803, FIG. 29.
4. The DynamicAmpacity method sends a message to a Line Plot 102 image object method UpdateLinePlot 809 where the lineplot image is updated and displayed in the dynamic session window. The values of Dynamic Ampacity and maximum conductor temperature are also displayed.
5. The DynamicAmpacity method also executes a function ExplainDynamicResult( ) where a system of DynamicOutputRules 620 generates an explanation of result.
6. Since the values of dynamic conductor temperature response are stored in the Dynamic:ConductorTemperature 803 slot they can be displayed at any time by opening the Dynamic session window.

The dynamic analysis flowchart is presented in FIG. 30. The steps in dynamic analysis are explained in the following steps:

(i) Input data from dynamic session window 90 is sent to SteadyStateTemperature method 740.
(ii) SteadyStateTemperature method 740 calculate preload and post overload temperature.
(iii) Expert system 620 rule Dynamic1 checks if preload and post overload conductor temperatures are greater than maximum conductor temperature.
(iv) If maximum conductor temperature is exceeded then:
 a) Post an error message 89.
 b) Explain button is clicked 115.
 c) Explanation of message is given 622 that enables the user to correct input data in Dynamic session window 90.
 d) Steps (i)–(iii) are repeated until conductor temperature is less than or equal to maximum conductor temperature.
(v) If maximum conductor temperature is not exceeded then:
 a) Dynamic ampacity method calculates conductor temperature 808
 b) Allowable time to reach maximum temperature is displayed 1021
 c) Lineplot image 102 in dynamic session window is updated.

DYNAMIC AMPACITY ALGORITHM

Algorithm

In the dynamic state conductor temperature response due to a step change in line current is obtained from the following differential equation, $$S \cdot M_c \cdot c \cdot \frac{dT_c}{dt} = P_j + P_{sun} - P_{rad} - P_{con} \tag{1}$$

which has for solution, $$T_{ch(i)} = A - (A - T_{ch(i-1)}) \cdot \exp(-\Delta t/\text{Tauh}) \tag{2}$$

$$T_{cc(i)} = AA - (AA - T_{cc(i-1)}) \cdot \exp(-\Delta t/\text{Tauc}) \tag{3}$$

where,
$T_{ch(i)}$ = conductor temperature during heating
$T_{cc(i)}$ = conductor temperature during cooling $$A = \frac{R_{ac} I_1^2 (1 - \alpha_0 T_{ref}) + D(P_{sun} + \pi X_h T_a)}{\pi D X_h - \alpha_0 R_{ac} I_1^2} \tag{4}$$

$$AA = \frac{R_{ac} I_2^2 (1 - \alpha_0 T_{ref}) + D(P_{sun} + \pi X_c T_a)}{\pi D X_c - \alpha_0 R_{ac} I_2^2} \tag{5}$$

$$Tauh = \frac{S \cdot M_c \cdot c}{\pi D X_h - \alpha_0 R_0 I_1^2} \tag{6}$$
= heating time constant $$Tauc = \frac{S \cdot M_c \cdot c}{\pi D X_c - \alpha_0 R_0 I_2^2} \tag{7}$$
= cooling time constant $$X_h = \frac{P_{j1} + P_{sun}}{\pi D \Delta T_{c1}} \tag{8}$$
= coefficient of heat transfer during heating $$X_h = \frac{P_{j2} + P_{sun}}{\pi D \Delta T_{c2}} \tag{9}$$
= coefficient of heat transfer during cooling $$P_{j1} = I_1^2 R_{ac} \tag{10}$$

$$P_{j2} = I_2^2 R_{ac} \tag{11}$$

$I_1$ = Overload current
$I_2$ = Post overload current
$P_{sun}$ = solar heating $$\Delta T_{c1} = T_{c1} - T_a \tag{12}$$

$$\Delta T_{c2} = T_{c2} - T_a \tag{13}$$

$T_{c1}$ = steady state pre-load conductor temperature
$T_{c2}$ = steady state over-load conductor temperature
Dt = time interval $t_i - t_{i-1}$
S = sectional area of conductor, m$^2$
$P_j$ = Joule heat gain, W/m
$P_{sun}$ = Heat gain by sun, W/m
$P_{rad}$ = Heat loss by radiation, W/m
$P_{con}$ = Heat loss by convection, W/m
D = Diameter of conductor, m
$a_0$ = temperature coefficient of resistance,/°C.
$R_0$ = dc resistance of conductor at reference temperature $T_{ref}$, ohm/m
$T_{ref}$ = reference temperature generally 20° C. or 25° C.
$T_a$ = ambient temperature, °C.
$R_{ac}$ = ac resistance of conductor, ohm/m
$M_c$ = conductor density, kg/m$^3$
c = specific heat of conductor, (J/kg$^x$K)

The above description of operation of the LINEAMPS program in the dynamic state clearly demonstrate that this invention has eliminated the need for automatic input of real time data from external devices or systems for power line ampacity evaluation in the dynamic state.

Transient Analysis Session

The transient analysis session window allows user to calculate transmission line conductor temperatures and ampacity during transient conditions. Transient conditions arise when there is a fault current through the conductor due to short circuit or lightning current.

Transient analysis session window and its various components are shown in FIG. 5(A–C). Object and data flow diagram in transient analysis is shown in FIG. 32–33. User action and program operation in the transient session are described in this section.

User action in transient session window

The transient analysis session window 135 FIG. 5-A, is opened by clicking on transient state icon 3 located in the LINEAMPS Control Panel window 20 or by clicking on Transient State Analysis button 34 in the Welcome window 22 in FIG. 1.

Conductor data of the line for transient analysis is obtained by selecting a line from the Select Line list box 148, FIG. 5-A. The value of the pre-load current is entered in the edit image 150, the value of the fault current is entered in the edit field image 152 and the value of the fault duration is entered in the edit field image 154 in the Fault Data 134 group of objects in the transient session window.

Conductor temperature response is displayed on the screen by clicking on the Calculate button 156. When Heating is selected in the Transient radio button group 146 the conductor temperature response during heating condition is displayed in the lineplot image 136. If Cooling is selected in the Transient radio button group the conductor temperature response during cooling condition is displayed in the lineplot image 137.

Meteorological data for transient analysis of the selected line and time of day are obtained automatically from the weather station objects. Meteorological data may be also input by the user in the transient window. Appropriate sky condition may be selected from the Solar Radiation group of radio buttons 138, air speed from the radio button group 140, wind direction from the radio button 142, and ambient temperature from the edit image 144. To display heating or cooling temperature response it is selected from the transient radio button group 146.

Program operation in transient state

The following steps explain program operation in transient session FIG. 5(A–C), and by the flowcharts of FIG. 32–33.

A. Select and view line data:
1 Select a line by scrolling through the list of lines in the Select Line list box 148.
2 The name of the line becomes the value of the slot Transient:LineName 903.
3 The after change monitor associated with the slot Transient:LineName 904 sets a new value to slot Transient:LineCode by finding the line object having the name of the selected line.
4 The after change monitor SelectedLineInputData 905 associated with the slot Transient:LineCode sets the value of all the conductor data of the selected line in the corresponding slots of the transient object.
5 The conductor data of the selected line can be viewed in the LINEAMPS: Conductor Data window 118 by clicking the conductor icon 39 from the LINEAMPS window 20 or by clicking the Conductor Data button 158.

B. Select solar radiation data:
1. The selected value of the solar radiation radio button group 138 becomes the value of the slot SkyCondition 903 in the transient object 6132.

C. Calculate:
1. By clicking the Calculate button 156 an action function CheckTransientData is activated that fires a set of rules TransientInputRules in the expert system object 620. If errors are detected messages are posted on the screen otherwise a message is sent to the TransientAmpacity 908 method.
2. In the TransientAmpacity method shown in FIG. 33, a Fortran DLL is declared which calculates the transient conductor temperature response of the selected power line conductor for a period of 120 minutes.
3. Minutely values of conductor temperature are stored in the Transient:ConductorTemperature slot 903.
4. If the Heating condition is selected in the Transient radio button group 146 in FIG. 5-A the TransientAmpacity method sends a message to a LinePlot image object 136 method UpdateLinePlot4 910 to display the transient conductor temperature during heating condition.
5. If the Cooling condition is selected in the Transient radio button group 146 the TransientAmpacity method sends a message to the lineplot image object 137 UpdateLinePlot5 method to display the transient conductor temperature during Cooling condition.
6. The TransientAmpacity method also executes a function ExplainTransientResult( ) where a system of TransientOutputRules in the expert system object 620 generates explanation of result.
7. Conductor temperature response during heating and cooling conditions are stored in the Transient:ConductorTemperature slot 903 and can be displayed at any time in the transient session window by selecting the Heating or Cooling condition from the radio buttons 146.

Transient ampacity method flowchart is given in FIG. 33 and described in this section.
1. Input is received from transient session window 135.
2. Expert system checks input data error 912.
3. If input data error is detected then a message is posted on the screen 913 and returns to step 135.
4. If there are no errors detected then calculate pre-fault steady state conductor temperature 914.
5. Calculate joule heat gain Pj 915.
6. Calculate initial conductor temperature Tc(i) 916.
7. If elapsed time exceeds fault duration then:
   i) Calculate coefficient of heat transfer Xc during cooling 919.
   ii) Calculate cooling time constant Tauc 920.
   iii) Calculate coefficient AA 921.
   iii) Calculate conductor temperature during cooling Tcc(i) 922.
   iv) If elapsed time is less than 120 min 923 then increment time and repeat steps v) to iv). Else display result by updating lineplot image 136 for heating and lineplot image 137 for cooling.

The transient ampacity algorithm is presented hereunder.

TRANSIENT AMPACITY ALGORITHM

Algorithm

Transient conductor temperature response due to short circuit current is obtained from the solution of the following differential equation:

$$S \cdot M_c \cdot c \cdot \frac{dT_c}{dt} = P_j \quad (1)$$

where, $$P_j = I_{sc}^2 R_0 [1 + a_0)(T_c - T_0)] \quad (2)$$

during adiabatic condition there is no heat exchange with the exterior therefore, $P_{sun} = 0$
$P_{rad} = 0$
$P_{con} = 0$ The solution of the differential equation is given by, $$T_c(i-1) + \left(T_o - \frac{1}{\alpha_0}\right)\left[1 - \exp\left(\frac{\alpha_0 R_0 I_{sc}^2 t}{S M_c c}\right)\right] \quad (3)$$

where, $T_c(i)$=conductor temperature at time interval i
t=time, sec
To=reference temperature, °C.
$a_o$=temperature coefficient of dc resistance of conductor,/°C.
$R_o$=dc resistance of conductor at reference temperature $T_o$, ohm/m
$I_{sc}$=short circuit current, A
S=sectional area of the conductor, m$^2$
$M_c$=conductor density, kg/m$^3$
c=specific heat of conductor, J/Kg °K.

Equation (2) provides the temperature of the conductor during heating by a short circuit current. The temperature during cooling of conductor is obtained from the dynamic equation.

The above description of operation of the LINEAMPS program in the transient state clearly demonstrate that this invention has eliminated the need for automatic input of real time data from external devices or systems for power line ampacity evaluation in the transient state.

Ampacity Forecast Session

Hourly values of transmission line ampacity up to seven days in advance are given in the Ampacity Forecast session window 160. Forecasting of transmission line ampacity is beneficial for economic energy transfer, to provide relief during generation and transmission outages and for maintenance planning. In this session user enters forecast weather conditions of the region and obtains ampacity of selected transmission line.

The forecast ampacity window and its various components are shown in FIG. 6(A–E). Object and data flow diagram in forecast session is shown in FIG. 34. Flowchart of ambient temperature generator, wind speed generator and solar radiation generator are given in FIG. 35–37. Weather pattern selection method flowchart is given in the FIG. 38. Description of user action, program operation and algorithms used in the forecast session are given in this section.

User action in the ampacity forecast session window

FIG. 6-A is an example of the ampacity forecast session window. The window is opened by clicking the Forecast Ampacity icon 4 of FIG. 2 in the LINEAMPS window 20 or by clicking the Forecast Ampacity button 36 in the Welcome window 22. In the ampacity forecast session hourly values of line ampacity up to seven days in advance are displayed graphically in a line plot 185 and textual display in a transcript image 173, FIG. 6-B. In this session user performs the following action:

Select a power line from the Select Line list box 174.

Select Forecast Day from the radio button group 180. Forecast Day numbers correspond to the day for which ampacity forecast is required. Example, Day1 is equal to next day, Day2 is equal to the following day and so on.

Select the type of unit US or SI from the Select Unit radio button group 172.

Weather data for the selected day, I=1 . . . 7 are entered by making selections from the following radio button groups: Sun 182, Wind speed 184, Wind Direction 186. Daily maximum and minimum value of ambient temperatures are entered in the edit images 188.

All of the above weather related radio buttons and ambient temperature edit images may be minimized or maximized by double clicking their respective images as shown in figures FIG. 6-A and FIG. 6-B respectively.

When the Forecast Day is set to All then forecast weather data for each of the seven days are required to be entered. These are input by clicking the Weather icon 5 in the LINEAMPS window shown in the FIG. 2 and by entering the data in a spreadsheet like window shown in the FIG. 8.

Select DailyWeatherForecast from Show_Weather menu options to enter station daily forecast weather data in a spreadsheet like window FIG. 7-A.

Select ExtendedWeatherForecast from Show_Weather menu options to enter seven day regional weather forecast data FIG. 8.

Click the System button 166 and expert system will determine appropriate meteorological condition for the selected line from weather station objects 628.

Click the Ampacity button 164 to obtain hourly values of line ampacity of the selected day. Hourly values are displayed in a line plot 178. Textual values of normal and emergency ampacities are also displayed in the Hourly Values transcript image 173 shown in the FIG. 6-B. Hourly values of line ampacity up to seven days in advance are stored in the selected line object and can be displayed at any time in the future.

If input data errors are detected by the expert system error messages are posted on the screen before forecasting ampacity.

Click the Explain button 170 to receive an explanation of the rule generated message.

Click the Advice button 168 to receive advice on remedial action.

Click the Print icon 14 to obtain hard copy of output.

Program operation in the forecast ampacity session

The following steps explain the operation of the program in the ampacity forecast session.

A. Open Window

When Forecast Ampacity icon 4 in tool bar is clicked the Forecast Ampacity session window 160 FIG. 6-A is opened by a function called ForecastAmpacitySession 1601 in FIG. 34.

B. Select Line:

There is an instance SelectedLine 600 FIG. 34 in the Lines object that receives user input data from the Forecast session window.

1. Select a line whose ampacities are required by scrolling through the list of lines in the Select Line list box 174 shown in FIG. 6-A and FIG. 34. If the Select Line list box is minimized double click to open the list box. The name of the selected line becomes the value of the slot SelectedLine:LineName 1616 in the SelectedLine object.

2. The after change method of SelectedLine:LineName determines the line number of the selected line. The line number is the selected line instance in the Lines class.

C. Input Data:

1. Select a Day from the radio button group 180 FIG. 6-A. The selected day becomes the value of a slot SelectedLine:ForecastDayNumber 1616. An after change method UpdateForecastDay associated with this slot sets the value of the ForecastDayNumber in the selected line instance of class lines.

2. Select the unit in which data is to be entered from the radio buttons 172 FIG. 6-A. The after change method ChangeUnit of the SelectedLine:Unit updates wind speed radio button 184 and the ambient temperature edit images 188.

3. To enter weather data for that day from the keyboard select appropriate weather conditions by selecting radio button images 182, 184, 186, 188 and by entering the daily maximum and minimum values of ambient temperature in the edit images 188. The SelectedLine object receives these data in its weather slots 1616.

4. To enter weather data automatically click the System button 166. The System button activates the function WeatherData and sends a message to the method WeatherData 1615 in the selected line object to obtain data from the associated weather stations.

5. Normal and Emergency temperature of the line are displayed in this window and new values may be entered if desired. The values are linked to the slots SelectedLine:NormalTemperature and SelectedLine:EmergencyTemperature 1616. The after change methods associated with these slots modify the corresponding values in the selected line instance.

D. Calculate Ampacity:

1. Click the Ampacity button 164. An action function CalcAmp7Days 1613 FIG. 34 is activated and input data is verified by the expert system.

2. The CalcAmp7Days function sends a message to a method WeatherData 1615 in the selected line instance.

3. WeatherData method sends messages to AmbientGen, WindGen and SolarGen methods of the associated weather station objects 628 FIG. 22 to calculate hourly values of weather data up to seven days in advance. The method of generating hourly values of ambient temperature, wind speed and solar radiation is given in the flowchart of FIG. 35, FIG. 36, and FIG. 37 respectively.

4. If System button was clicked before Ampacity button then WeatherData method will obtain data from the associated weather stations.

5. If System button was not clicked and data was entered from the keyboard in the screen objects 182, 184, 186, 188 then the WeatherData method will use only these values to calculate ampacity.

6. You can override the use of manual input data anytime by clicking the System button and the system generated data will appear in the images 182, 184, 185, 186, 188, FIG. 6-A and FIG. 34.

7. CalcAmp7Days function sends another message to the Amp7Days 1618 method in the selected line object where a Fortran DLL is declared for the computation of hourly values of line ampacity up to seven days in advance. The Fortran DLL calculates hourly values of normal and emergency line ampacity at each of the virtual sites shown in the FIG. 41 that are situated along the route of the line. The location of each virtual site is specified in the Site#x data slot of the line object. The minimum hourly values of normal ampacity of all sites determines normal line ampacity. Likewise, minimum hourly values of emergency ampacity of all sites determines emergency line ampacity.

E. Explanation:

1. Click the Explain button 170 to receive an explanation of the most recent error message. Explanations are displayed 190 in the FIG. 6-C and FIG. 6-D.

2. Click OK to close the explanation window.

F. Advice:

1. Click the advice button 168 which activates an Advice-Ampacity function and suggestions to remedy the error is displayed in the advice window 196 in FIG. 6-E.

G. Result

1. Hourly values for 168 hours are displayed in a line graph in a lineplot image object 185 and textual values of hourly ampacities from 1 to 168 hours in advance appear in a transcript image object 173.

Weather Data Input Session

Daily weather data input window

The forecast weather data input window is shown in the FIG. 7-A. This window is opened by selecting DailyWeatherForecast from the Show_Weather menu in the Forecast Ampacity window menu bar 162 in FIG. 6-A. Weather forecast data is required to be entered in the table of FIG. 7-B on a daily basis after obtaining weather service forecast data and can be input at any time of the day. Typically meteorological data is entered in the morning from the weather section of the daily newspaper or from any on-line service. After selecting a weather station from the Select Weather Station list box 204 the name of the selected weather station appears on top of the first column of the table 202. Enter the values of daily high 208 and low 210 ambient temperature, daily high 212 and low 214 wind speed, wind direction 216, and Sky condition 218, in the table 162 shown in the FIG. 7-B. Weather data is entered in the weather station object slots 628 FIG. 22: AmbientTempMax, AmbientTempMin, WindSpeedMax, WindDirection and SkyCondition by clicking the UpdateStationData button 206.

Extended weather data input window

A seven day extended forecast data window 220 is shown in the FIG. 8. It is opened by clicking on the weather station icon 5 in the LINEAMPS window 20 shown in FIG. 2. Select a region from the select region list box 238 and enter the region's weather forecast data in the spreadsheet like table in the rows 222 through 234. The regions weather data are entered in the weather station data slots: AmbientMax (List), AmbientMin(List), WindSpeedMax(List), WindSpeedMin(List), WindDirection(List) and SkyCondition(List).

On-line weather data

By selecting OnLineWeather from the Show_Weather menu in the ForecastAmpacity window menu bar 162 in FIG. 6-A, a message is sent to the OnLineData method of weather stations object. The method obtains data from a file which was previously downloaded from America-On-Line.

The above description of operation of the LINEAMPS program in the forecast ampacity session clearly demonstrate that this invention has eliminated the need for automatic continuous input of real time data from external devices or systems to forecast hourly values of power line ampacity up to seven days in advance.

Ambient Temperature Modeling Window

Program operation

The ambient temperature modeling window is shown in the FIG. 11. It is opened by clicking the ambient temperature icon 6 in the LINEAMPS window 20 in FIG. 2, by activating a ShowTemperatureSession action function. A plot of the days ambient temperature is calculated by the AmbientGen method 6283 FIG. 35 and is displayed in a LinePlot2 image 262 and the textual values are also displayed in the transcript image 254 in FIG. 11. Select a temperature pattern from the Temperature Pattern list box 256, enter new values of high and low ambient temperature in the edit images 258 and 260 respectively and click the Calculate button 252 to see new values of ambient temperatures displayed in the line plot image 262 and the transcript image 254.

A flowchart for generating hourly values of ambient temperatures up to seven days in advance is given in the FIG. 35. The steps in this flowchart are as follows.

i). Forecast weather data is entered in Extended Forecast Weather Data 2201 window.

ii) Weather data is received by weather station object 6281.

iii) SelectPattern 6282 method in weather station object selects ambient temperature pattern for the month.

iv) AmbientGen 6283 method in weather station object generates hourly values of ambient temperature up to seven days in advance.

v) ForecastTemperature slot 6284 in the weather station object is updated with new values of ambient temperature.

Wind Speed Modeling Window

Program operation

The wind speed modeling window is shown in the FIG. 12. It is opened by clicking the wind speed icon 7 in the LINEAMPS window 20 in FIG. 2, by activating an action function ShowWindSession. A plot of hourly values of wind speed calculated by the WindGen 6288 method FIG. 36, is shown in a line plot image 276 and the textual values are displayed in a transcript image 268. Select a wind pattern from a wind pattern list box 274, enter new value of daily maximum value of wind speed in the slider image 280, and the time of maximum and minimum wind in the edit images 270 and 272 respectively. Click the Calculate button 266 to see new values of wind speed displayed in the line plot image 276 and the transcript image 268.

A flowchart for generating hourly values of wind speed up to seven days in advance is given in the FIG. 36. The steps in this flowchart are as follows.

i). Forecast weather data is entered in Extended Forecast Weather Data window 2202.

ii) Weather data is received by weather station object 6286.

iii) SelectPattern 6287 method in weather station object selects wind speed pattern for the month.

iv) WindGen 6288 method in weather station object generates hourly values of wind speed up to seven days in advance.

v) ForecastWind speed slot 6289 in the weather station object is updated with new values of wind speed.

A flowchart of the ambient temperature and wind speed pattern selection method mentioned in step iii) above is presented in the FIG. 38. It is comprised of the following steps:

i) Input hourly values of historical weather data consisting of ambient temperature and wind speed of a region with date and time 7000.

ii) Perform spectral analysis of hourly values of ambient temperature and wind speed to determine fundamental frequency and number of harmonics for each region 7010.

iii) Determine the coefficients of Fourier series of ambient temperature and wind speed for each month of the year by performing FFT or by the method of least squares 7020.

iv) Twelve patterns each of ambient temperature and wind speed that are calculated in step iii) for each month of the year are stored in their respective slots in the weather station object 7030.

The ambient temperature and wind speed generator algorithm is presented hereunder.

AMBIENT TEMPERATURE AND WIND SPEED GENERATOR ALGORITHM

Hourly values of ambient temperature (Ta) and wind speed ($w_s$) at time (t) are generated by AmbientGen and WindGen method in the weather station object by fitting Fourier series to historical weather data of the region. The Fourier series model is given by, $$Y(t) = A_0 + k \sum_{i=1}^{n} C_i \mathrm{Sin}(\omega_i t) + \sum_{i=1}^{n} B_i \mathrm{Cos}(\omega_i t) \quad (1)$$

Description of symbols $$Y(t) = \epsilon\{Ta(t), w_s(t)\} \quad (2)$$

$A_0$, $A_i$, $B_i$ for i=1 . . . n are coefficients of the model
w=fundamental frequency
k=factor used to adjust Fourier series to National Weather Service forecast. It is calculated by, $$k = \frac{Y_f(t_{\max}) - Y_f(t_{\min})}{F(t_{\max}) - F(t_{\min})} \quad (3)$$

$Y_f(t_{max})$=daily maximum value of ambient temperature or wind speedforecast by the National Weather Service
$Y_f(t_{min})$=daily minimum value of ambient temperature or wind speed forecast by the National Weather Service
$F(t_{max})$ and $F(t_{min})$ are found from the Fourier series, $$F(t) = A_0 + \sum_{i=1}^{n} A_i \mathrm{Sin}(\omega_i t) + \sum_{i=1}^{n} B_i \mathrm{Cos}(\omega_i t) \quad (4)$$

when $t=t_{max}$ and $t=t_{min}$ respectively.

Solar Radiation Model

Solar radiation is forecast by an analytical model based on sun position at the time of day, day of year, latitude and longitude of the line location and sky conditions. It is calculated by a method SolarGen 6293 FIG. 37, in the weather station object 628 FIG. 22. The solar model is stored in the instance Sun 634 in the WeatherModel object 630 FIG. 22 and comprise the following algorithm.

$$S(t)=Sb(t)+Sd(t), W/m2 \quad (1)$$

S(t) is the total solar radiation at time interval t.

Sb(t) and Sd(t) are the beamed and diffused solar radiation respectively and calculated by, $$Sb(t)=Se(b)\cdot Cos(z), W/m2 \quad (2)$$

$$Sd(t)=Se(d)\cdot Cos(b), W/m2 \quad (3)$$

where,

Se=1353 W/m2, value of the normal component of the extraterrestrial solar radiation measured outside the earth's atmosphere.

b=atmospheric transmittance of beamed radiation
d=atmospheric transmittance of diffused radiation
Cos(z)=cosine of zenith angle
Cos(b)=cosine of angle of incidence of beamed radiation The angle of incidence is a function of the geographic location of the power line given by the latitude and longitude of the line, line direction and conductor sag. The values calculated by LINEAMPS are based on power line data input by the user. A flowchart for generating hourly values of solar radiation is given in the FIG. 37. It is comprised of the following steps:

i) Input forecast sky condition 54 FIG. 3-A, 96 FIG. 4-A, 138 FIG. 5-A, 182 FIG. 6-A, and 234 FIG. 8, from session windows with date and time 6290.

ii) Forecast data is received in weather station instance 6291.

iii) A method SelectSunFactor 6292 in weather station object selects a sun correction factor.

iv) Method SolarGen 6293 in weather station object generates hourly values of solar radiation.

v) Hourly values of solar radiation are stored 6294 in a ForecastSolarRadiation slot in weather station object.

Cartogram Window

Program operation

A cartogram window 240 is shown in the FIG. 10. It is opened by clicking the cartogram icon 8 in the LINEAMPS window FIG. 2 or by selecting ShowCartogram menu from Show_Weather menu options in the Forecast Ampacity window menu bar 162 FIG. 6-A. The Cartogram window has a drawing image with a draw function named DrawMap. The DrawMap function draws the geographic map of the region and displays the high and low values of ambient temperature at the geographic locations of each weather station in the cartogram. The coordinates of each weather station are obtained from the weather station object Latitude and Longitude slots. DrawMap sends a message to a DrawSelf method in the selected line object to draw itself on the map. The method DrawSelf uses Latitude and Longitude values of the virtual sites 654 that are situated along the route of the line 648 as shown in the FIG. 41. These values are stored in the Site#x slots of the line object and are used to draw the line.

Lines Session

User operation in Lines session

The Lines session window 300 is shown in the FIG. 13. It is opened by clicking the Lines icon 9 in LINEAMPS Control Panel window 20, FIG. 2. In this session user performs the following actions:

Make new line
Enter new line conductor data
Enter new line site data
See existing line data
Delete lines Make New Line:

Click the Make New Line button 302 and a form 312 is presented on the screen as shown in the FIG. 14. After entering the name and length of the line click the OK button. A new line instance is created in the class Lines.

New Line Conductor:

Click the New Line Conductor button 304, LINEAMPS: Conductor Data window 313 appears on the screen as seen in the FIG. 15. User may enter their own conductor data in the table 321 or select a conductor from the database. To select a conductor from the database first select a conductor type from the Select Conductor Type listbox 315. A list of conductors of this type appears in the conductor type (ACSR in this example) list box 317. Select a conductor (Bluebird in this example) and the data of the selected conductor appears in the table 321. Click the OK button 319, conductor data is now entered in the new line object and the window is closed.

New Line Site Data:

Click the New Line Site Data button 306 and its window appears on the screen as seen in the FIG. 16. Create as many virtual sites necessary to represent the line accurately. A new virtual site is created after entering data for one site and by clicking the NextSite button 344. The new site will appear inside the SiteList listbox 322 every time the NextSite button is clicked. The following data are required of each site:

A weather station is associated with a site by selecting a station from the list of stations in the Associated Weather Station ComboBox 326.

Enter the latitude of the location of the site in the edit image 328.

Enter the longitude of the location of the site in the edit image 330.

Enter Line Direction at the location of the site in degree in the edit image 332

Enter conductor slope at the location of the site in the edit image 334.

Enter the elevation of the site in meter in the edit image 336.

Select the type of terrain at the location of the site from a list of terrain types from the Terrain ComboBox 338.

A site may be removed from the site list by clicking the Delete Site button 340. To see site data select the site and click the Show Site Data button 342, the data appears in the respective edit fields. Specification of sites for the new line are completed by clicking the End button 346, New Line Site Data window is then closed and site data are entered in the new line object slots Site#x.

See Line Data:

Click the See Line Data button 308, Line Site Data window appears on the screen as seen in the FIG. 17. Select a line from the Select Line listbox 350, the list of sites associated with this line appears in the Select Site listbox 370 and the name of the line appears in the line name edit field 352. Select a site from this list, the following site data appears in their respective edit fields:

Selected site number 354.
Associated weather site 356
Latitude 358

Longitude 360
Line Orientation 362
Elevation 364
Slope 366
Terrain 368

You may edit the data fields and also select new associated weather station and terrain if necessary. Update line Site#x data by clicking the UpdateSiteData button 372.

Delete Lines:

Delete Lines window 374 is opened by clicking the Delete Lines button 310 as seen in the FIG. 18. Select the line or lines you wish to remove from the database of lines 380 and click the OK Delete button 376. The selected lines are removed from the list box. You may also deselect the lines by clicking the Cancel Delete button 378.

Program operation in the Lines session

FIG. 13–19, FIG. 39 and FIG. 41 illustrate program operation in the Lines session.

Open Lines session window:

By clicking the Lines icon 9, an action function Lines 301 opens the Lines session window 300. There are five button images in this window:

Make New Line

By clicking the Make New Line button 302 an action function MakeNewLine presents an input form 312. The input form is completed by entering line name and length and by clicking the OK button. NewLine is an instance of class Lines and is used for the purpose of storing line data until a permanent new line is created in the Lines class. The line name entered in the form 312 becomes the value of the slot NewLine:LineName and line length becomes the value of the slot NewLine:LineLength.

New Line Conductor:

By clicking the New Line Conductor button 304 an action function NewLineConductor 305 opens a LINEAMPS: Conductor Data window 313. When a conductor type is selected from the Select Conductor Type list box 315 the selected conductor type becomes the value of a slot NewLine:ConductorType. An after change method associated with this slot shows a list box of conductors 317 of this type. When a conductor is selected from this list box the selected conductor becomes the value of a slot NewLine:ConductorCodeName. An after change method 316 associated with this slot presents this conductor data to the edit fields of table 321. By clicking the OK button 319 an action function EnterData 3191 enters all of the conductor data from table 321 to the corresponding slots in the NewLine object and the window 313 is closed.

New Line Site Data:

By clicking New Line Site Data button 306 an action function EnterSiteData opens the New Line Site Data window 314 in FIG. 16 and sends a message to a method MakeSiteData in the NewLine object. MakeSiteData makes a new Site in the line object every time the NextSite button 3151 is clicked and enters the values of associated weather station 3142, latitude 3143, longitude 3144, line direction 3145, slope 3146, elevation 3147, terrain 3148 into this Site. The Site appears in the SiteList listbox 3141 as the method MakeSiteData appends the new Site to the list of values in the NewLine:SiteList slot.

Show Site Data:

By selecting a Site from the SiteList list box 3141 and clicking the Show Site Data button 3150 the action function ShowSiteData retrieves all of the site data from the slot NewLine:Site#x which are displayed in the edit images, 3140, 3142, 3143, 3144, 3145, 3146, 3147, 3148 in the New Line Site Data Window 314, FIG. 16.

Delete Site:

By clicking the Delete Site button 3149 the selected site is removed from the SiteList slot in the NewLine object by an action function DeleteSiteData.

See Line Data:

A Line Site Data window 348 is shown in the FIG. 17. It is opened by clicking See Line Data button 308 by a SeeLineData action function. When a line is selected from the Select Line list box 350 the selected line becomes the value of the slot NewLine:SelectedLine and its after change method ShowLineSiteList displays a Select Site list box 370. The Select Site list box shows a list of sites that are associated with the line. By selecting a Site from the list box 370 the selected site becomes the value of the slot NewLine:SelectedSite and its after change method retrieves the data of the site from the selected line object and the value of the site's associated weather station is displayed in the image 356, latitude in image 358, longitude in image 360, line direction in image 362, elevation in image 364, slope in image 366 and terrain in image 368.

Update Site Data:

When edit images values are modified Site data is updated by clicking the UpdateSiteData button 372 which activates an function UpdateSiteData to enter new values of site data.

FIG. 41 is an illustration of a power line route 648 having associated weather stations 646 virtual weather sites 650, and sending of messages from weather station to virtual sites 652. The arrow 654 indicates wind direction.

Conductor Window

Operation

A conductor window 500 is shown in FIG. 19. It is opened by clicking icon 10 in the LINEAMPS Control Panel window 20 shown in the FIG. 2. To view conductor data a conductor type is selected from the list box 510 and a list of conductors of this type appears in the list box 512. When a conductor is selected from the list box 512 the data appears in the table 520. Conductor data may be changed by entering new values in the edit images. By clicking a new conductor button 514 a message is sent to the conductor object where a method makes a new instance of the conductor. By clicking the delete conductor button 516 a message is sent to the conductor class where a method removes the selected conductor object. The conductor window is closed by clicking the ok button 518.

Energy Delivery Cost Window

Operation

A power line energy delivery cost window 522 is shown in the FIG. 20. It is opened by clicking icon 11 in the LINEAMPS window 20, FIG. 2. Hourly energy delivery costs for seven days in advance are displayed in a table in a transcript image 526. These costs are based on time of day energy pricing given in the Rate(c) column 524. Hourly values of energy delivery cost of the selected power line are based on normal ampacities predicted for the hour.

Welcome and Navigation Window

Operation

A welcome or navigation window 22 is shown in the FIG. 1. It is the first window that is opened automatically after starting the LINEAMPS program. It may be opened from any other window by clicking icon 12. The welcome window comprise a drawing image of the globe 24 that is capable of animation. One side of the globe appears in the foreground every 10 seconds. The LINEAMPS logo is displayed on the globe. The full name of the program LINE AMPACITY SYSTEM appears in a text image 26. There are four button images on this window for quick access to the important functions of this program. By clicking the steady state analysis button 30 the steady state session window of FIG. 3-A is opened. Similarly by clicking each of the buttons 32, 34, 36, their respective session windows are opened. Author's name, address and copyright notice are displayed in a transcript image 28.

Help Window

Operation

The on-line help window 384 is shown in the FIG. 21. It is opened by clicking icon 13 in the LINEAMPS window 20 shown in the FIG. 2. The help window comprise the following table of contents that are displayed in a transcript image 417:

| | |
|---|---|
| a) | Guide to on-line user's manual 396 |
| b) | Session windows 398 |
| c) | Ampacity predictions 400 |
| d) | Temperature predictions 402 |
| e) | Steady state analysis 404 |
| f) | Dynamic state analysis 406 |
| g) | Transient analysis 408 |
| h) | Weather 410 |
| i) | Database: Transmission lines 412 |
| j) | Database: Conductors 414 |
| k) | About LINEAMPS 416 |

The above table of contents provide the means to receive help by clicking on the topic whose text is written in green and underlined. The table of contents is displayed anytime in this window by clicking the contents button 418. Help is also available by clicking the index button 420 which displays a combo box having a list of items. Help on a item is available by selecting the item.

CONCLUSION, RAMIFICATIONS AND SCOPE OF INVENTION

LINEAMPS is an integrated line ampacity system comprising of power line objects, conductor objects, weather station objects, and a system of window objects.

The power line objects provide the means for storage of transmission line data which includes transmission line route, terrain, associated weather stations, conductor data and hourly values of normal and emergency line ampacity. The power line objects provide the means for selecting a line from a database and have methods to calculate ampacity in steady state, dynamic and transient state and for the prediction of line ampacity up to seven days in advance. The power line object also provides the means for the creation of new transmission line objects by user and for drawing itself in a map.

Conductor objects provide the means for storing conductor data, selecting a conductor from a database and for the creation of new conductors. The conductor objects have methods to calculate electrical and mechanical properties of conductor from user input and have methods to calculate ampacity in steady state, dynamic and transient state.

Weather station objects provide the means for the input and storage of weather data and for providing hourly values of weather data up to seven days in advance. The weather station objects have methods to generate hourly values of ambient temperature, wind speed and solar radiation for seven days in advance. Weather station object also provides the means for user to create new weather stations objects and for drawing itself in a map.

The system of window objects provide the means for user input in a user friendly graphical interface and for the presentation of results by LINEAMPS.

Reliable estimates of power line ampacity are obtained from the program by taking into consideration meteorological conditions and terrain at different sites. Every power line object has plurality of virtual weather sites situated along the line. Each of these sites are associated with a weather station object from where they receive weather data. The power line object has a method that calculates the minimum hourly values of normal and emergency line ampacity for seven days in advance from the ampacities calculated at each of the virtual sites. Users have the ability to create new lines, to make new conductors, new weather stations and virtual sites.

LINEAMPS is capable of responding to all kinds of weather and line loading condition. It receives data by interaction with the user and does require continuous input of real time data from meteorological sensors or on line conductor temperature and tension monitoring devices. During steady state conditions conductor temperature or current is calculated in the steady state session window. Conductor temperatures due to short duration overloads under any type of weather condition are obtained from the dynamic session window. During severe weather conditions, conductor temperatures due to lightning or short circuit currents and high wind speeds are obtained in the transient session window.

The program is useful to calculate hourly power flow thermal limits in an interconnected power system that are necessary to achieve the most economic operation of the electric power system. Economy energy transfers are possible by higher line ratings and cost savings are realized by better transmission planning. Higher than static line ratings are made possible by this program because line ampacities are adjusted to forecast weather conditions of a region. Therefore, electric power companies can achieve higher capacity on existing power lines and can defer capital expenditure for the construction of new lines.

Energy conservation is also possible by the application of this invention by enabling greater exchange of economical energy from one region to another through the existing interconnected network. By giving system operators the knowledge of power line capacity for seven days in advance, greater economy is realized by better generation and transmission system planning. Advance knowledge of power line ampacity allows sufficient lead time to arrange economy purchase and sale of electricity with neighboring utilities. The program is also useful for the planning of line maintenance and during emergency conditions when adjacent lines are required to carry loads in excess of their rated capacity for short duration.

LINEAMPS is an economical line ampacity system that runs in a standard PC in the windows environment. It does not require on-line temperature sensors, or other types of line monitoring devices or continuous input of real time meteorological data or line current data.

The description of my line ampacity system as detailed in this specification is a preferred realization of this invention. The following alternative realizations are also possible by those skilled in the art and are therefore considered to be within the scope of this invention:

1. LINEAMPS can be implemented in any computer system: a standalone computer system or a multi-computer environment in a network.

2. In a multi-computer network my LINEAMPS may reside in a host computer that may be a mainframe computer, UNIX or PC server.

3. My LINEAMPS may reside in the above mentioned host computer and may be operated by any remote computer terminal having a means of communication with the said host computer. On-line services such as Compuserve, America On-line, Internet, or other similar services may be possible alternative means of communication with the said host computer.

4. Other object oriented programming languages such as C++, Smalltalk, Nexpert Object, Gensym and equivalents may be used to develop the object oriented model described in this specification. Also other expert system programming languages may be used to implement rules stated in this specification of the line ampacity system.

5. If on-line access to weather data is available the required weather data may be automatically input to LINEAMPS.

6. LINEAMPS may be integrated to an energy management system for economic operation of interconnected power system.

7. LINEAMPS may be used in a multi-area power brokerage service to determine hourly values of safe power line transfer limits for the advance purchase or sale of electricity.

8. Enhancement to the weather generating methods may be possible by the application of Fuzzy logic or neural network or other expert rules or a combination of these techniques to determine more accurately wind speed and ambient temperature patterns of a region.

9. The drawing image 24 of the globe shown in the FIG. 1 may be made active so that users may obtain line ratings in any region of the world by clicking on that region.

10. Power line ampacity for periods greater than one week in advance may be possible in the future. A power line ampacity system computer program called LINEAMPS implemented in a IBM PC under the Windows operating system for the evaluation of overhead power line ampacity in the steady state, dynamic state and transient state and for the prediction of hourly values of line ampacity up to seven days in advance by object oriented modeling and expert rules comprising of:

I claim:

1. A computer system for evaluating line ampacity in an overhead power transmission line system by object oriented modeling comprising:

means for acquiring and storing power line conductor, power line design parameter, power line geographic location, weather station, and meteorological forecast data;

means for implementing rules derived from an expert system knowledgebase to provide advisory information indicating errors or conflicts in the acquired data;

means for performing an analysis of said power transmission line system based upon the acquired data, wherein said power transmission line system is analyzed during steady state, dynamic state, and transient conditions; and means for predicting hourly values of power line ampacity of said power transmission line system up to seven days in advance, using results obtained from said analysis.

2. The computer system of claim 1, wherein said means for performing an analysis further comprises means for calculating, based on said acquired data, steady state conductor current, steady state conductor temperature, conductor temperature responses versus time in the dynamic state by closed form solution of a conductor temperature differential equation, and conductor temperature response versus time in the transient state by closed form solution of a conductor temperature differential equation.

3. The computer system of claim 1, wherein said means for performing an analysis further comprises means for generating hourly values of ambient temperature, wind speed, and solar radiation up to seven days in advance.

4. The computer system of claim 1, further comprising session window means for user data entry and result display.

5. The computer system of claim 4, wherein said seesion window means for data entry and display further comprise steady state analysis, dynamic analysis, transient analysis, ampacity forecast, temperature modeling, wind speed modeling, weather data forecast, extended weather forecast data, cartogram, energy delivery cost, and conductor data session windows.

6. The computer system of claim 5, wherein said steady state analysis session window further comprises means for receiving user input data from a group consisting of ambient temperature, wind speed, wind direction, conductor temperature, and conductor current.

7. The computer system of claim 5, wherein said dynamic analysis session window further comprises:

means for graphically displaying conductor dynamic temperature response versus time in a line plot image and a text image of allowable time to reach maximum temperature;

means for entering line loading data including pre-load current, overload current, post overload current and conductor temperature;

means for entering sky condition, wind speed, ambient temperature; and means for selecting a power line for dynamic analysis by making a selection from a plurality of lines that are displayed by list.

8. The computer system of claim 5, wherein said transient analysis session window further comprises:

means for displaying conductor transient temperature response versus time in a line plot image during heating condition;

means for graphically displaying conductor transient temperature response as a function of time in a line plot image during cooling condition;

means for entering sky condition, wind speed, wind direction, ambient temperature, and means for selecting a power line for transient analysis by making a selection from a plurality of power lines that are displayed by list.

9. The computer system of claim 5, wherein said forecast session window further comprises:

means for graphically displaying hourly values of line ampacity up to seven days in advance;

means for obtaining system generated weather data; and means for explaining said advisory information generated from said expert system knowledgebase.

10. The computer system of claim 5, wherein said temperature modeling session window further comprises:

means for graphically displaying daily ambient temperature in a line plot;

means for numerically displaying twenty-four hour values of ambient temperature;

means to select a pattern of ambient temperature from a list of temperature patterns, each said temperature pattern corresponding to a month of the year;

means for entering daily high and low values of ambient temperature; and means for obtaining hourly values of ambient temperature.

11. The computer system of claim 5, wherein said wind speed modeling session window further comprises:

means for graphically displaying daily wind speed in a line plot;

means for numerically displaying twenty-four hour values of wind speed;

means for selecting a pattern of wind speed from a list of wind speed patterns, each said wind speed pattern corresponding to a month of the year;

means for selecting wind direction from a list; and means for obtaining hourly values of wind speed.

12. The computer system of claim 5, wherein said forecast weather data session window further comprises:

means for selecting a weather station from a list;

means for viewing existing weather data of the selected weather station or to enter new data;

means for manually updating user entered weather station data; and means for entering and storing extended forecast weather data for seven days in a region.

13. The computer system of claim 5, wherein said cartogram session window further comprises:

means for composing an outline drawing of a geographic map of a region wherein the daily high and low values of ambient temperature and code name of each weather station are displayed at their respective locations on the map; and means for tracing a selected power line on the geographic map.

14. The computer system of claim 5, wherein said energy delivery cost session window further comprises:

means for displaying hourly energy delivery cost by a user selected power line based on time of day pricing of electricity and forecast ampacity.

15. The computer system of claim 5, wherein said conductor data session window further comprises:

means to view conductor data; and means to enter new conductor data.

\* \* \* \* \*